US011532219B2

(12) United States Patent
Siminoff et al.

(10) Patent No.: US 11,532,219 B2
(45) Date of Patent: Dec. 20, 2022

(54) PARCEL THEFT DETERRENCE FOR A/V RECORDING AND COMMUNICATION DEVICES

(71) Applicant: Amazon Technologies, Inc., Seattle, WA (US)

(72) Inventors: James Siminoff, Pacific Palisades, CA (US); Joshua Roth, Pacific Palisades, CA (US); John Modestine, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/726,564

(22) Filed: Dec. 24, 2019

(65) Prior Publication Data

US 2020/0134996 A1 Apr. 30, 2020

Related U.S. Application Data

(63) Continuation of application No. 15/967,097, filed on Apr. 30, 2018, now Pat. No. 10,650,650, which is a (Continued)

(51) Int. Cl.
*G08B 13/196* (2006.01)
*G08B 25/08* (2006.01)
*G06V 20/20* (2022.01)

(52) U.S. Cl.
CPC ....... *G08B 13/19613* (2013.01); *G06V 20/20* (2022.01); *G08B 13/19608* (2013.01); (Continued)

(58) Field of Classification Search
CPC .............. G08B 13/19613; G08B 25/08; G08B 13/19608; G08B 13/19684; G08B 13/19628; G06K 9/00671
See application file for complete search history.

(56) References Cited

U.S. PATENT DOCUMENTS

| 4,764,953 A | 8/1988 | Chern et al. |
| 5,428,388 A | 6/1995 | von Bauer et al. |

(Continued)

FOREIGN PATENT DOCUMENTS

| CN | 2585521 Y | 11/2003 |
| CN | 2792061 Y | 6/2006 |

(Continued)

OTHER PUBLICATIONS

International Search Report for PCT/US17/045538, in the name of Sung Gon Kim, dated Nov. 17, 2017, 11 pages.
(Continued)

*Primary Examiner* — Anthony Bantamoi
(74) *Attorney, Agent, or Firm* — Lee & Hayes, P.C.

(57) ABSTRACT

Parcel theft deterrence for audio/video (A/V) recording and communication devices, such as video doorbells and security cameras. When an A/V recording and communication device captures image data that includes a parcel, a parcel boundary may be created for monitoring the parcel within. In various embodiments, when the parcel is removed from the parcel boundary, a user alert may be generated to notify a user of a client device associated with the A/V recording and communication device that the parcel has been removed.

30 Claims, 37 Drawing Sheets

Related U.S. Application Data continuation-in-part of application No. PCT/US2017/045538, filed on Aug. 4, 2017, and a continuation-in-part of application No. PCT/US2017/045477, filed on Aug. 4, 2017, and a continuation-in-part of application No. 15/669,817, filed on Aug. 4, 2017, now Pat. No. 10,510,232, and a continuation-in-part of application No. 15/669,092, filed on Aug. 4, 2017, now Pat. No. 10,388,131, and a continuation-in-part of application No. 15/669,393, filed on Aug. 4, 2017, now Pat. No. 10,726,690, and a continuation-in-part of application No. 15/669,839, filed on Aug. 4, 2017, now Pat. No. 10,482,737, and a continuation-in-part of application No. PCT/US2017/045636, filed on Aug. 4, 2017.

(60) Provisional application No. 62/522,075, filed on Jun. 19, 2017, provisional application No. 62/479,060, filed on Mar. 30, 2017, provisional application No. 62/374,505, filed on Aug. 12, 2016.

(52) U.S. Cl.
CPC . *G08B 13/19628* (2013.01); *G08B 13/19684* (2013.01); *G08B 25/08* (2013.01)

(56) References Cited

U.S. PATENT DOCUMENTS

| | | |
|---|---|---|
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,055,202 B1 | 6/2015 | Scalisi et al. |
| 9,058,738 B1 | 6/2015 | Scalisi |
| 9,060,103 B2 | 6/2015 | Scalisi |
| 9,060,104 B2 | 6/2015 | Scalisi |
| 9,064,394 B1* | 6/2015 | Trundle ........... G08B 13/19684 |
| 9,065,987 B2 | 6/2015 | Kasmir et al. |
| 9,094,584 B2 | 7/2015 | Scalisi et al. |
| 9,109,378 B2 | 8/2015 | Scalisi |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,728,077 B1 | 8/2017 | Fu et al. |
| 9,736,284 B2 | 8/2017 | Scalisi et al. |
| 9,743,049 B2 | 8/2017 | Scalisi et al. |
| 9,754,334 B2 | 9/2017 | Pearcy et al. |
| 9,760,237 B2 | 9/2017 | Eraker et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 9,892,379 B1 | 2/2018 | Danyluk et al. |
| 2002/0008758 A1* | 1/2002 | Broemmelsick ......... H04N 7/18 |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2007/0217780 A1 | 9/2007 | Hirooka et al. |
| 2010/0202702 A1 | 8/2010 | Benos et al. |
| 2010/0225455 A1 | 9/2010 | Claiborne et al. |
| 2013/0033379 A1 | 2/2013 | Jentoft |
| 2013/0057695 A1 | 3/2013 | Huisking |
| 2013/0321670 A1* | 12/2013 | Zander ............... H04N 5/23296 |
| 2014/0267716 A1 | 9/2014 | Child et al. |
| 2015/0054949 A1* | 2/2015 | Scalisi ................... H04N 7/188 |
| 2015/0145643 A1* | 5/2015 | Fadell ................ G07C 9/00103 |
| 2015/0149946 A1 | 5/2015 | Benos et al. |
| 2015/0163463 A1 | 6/2015 | Hwang et al. |
| 2015/0310381 A1 | 10/2015 | Lyman et al. |
| 2016/0044287 A1* | 2/2016 | Scalisi ...................... H04N 7/18 |
| 2016/0105644 A1 | 4/2016 | Smith et al. |
| 2016/0121479 A1 | 5/2016 | Lin et al. |
| 2016/0171435 A1 | 6/2016 | Newton et al. |
| 2016/0180667 A1* | 6/2016 | Bunker ............ G08B 13/19613 |
| 2016/0189532 A1* | 6/2016 | Malhotra ............. G08B 29/185 |
| 2016/0212386 A1 | 7/2016 | Duffy et al. |
| 2016/0343220 A1* | 11/2016 | Grabham ........... G08B 13/1472 |
| 2017/0011605 A1 | 1/2017 | Grabham |
| 2017/0109984 A1* | 4/2017 | Child ........................ G08B 5/36 |
| 2017/0293301 A1 | 10/2017 | Myslinski |
| 2018/0047266 A1 | 2/2018 | Siminoff et al. |
| 2018/0047267 A1 | 2/2018 | Modestine |
| 2018/0047268 A1 | 2/2018 | Lemberger |
| 2018/0075718 A1 | 3/2018 | Modestine |
| 2018/0220104 A1 | 8/2018 | Hall et al. |
| 2018/0261060 A1 | 9/2018 | Siminoff et al. |

FOREIGN PATENT DOCUMENTS

| | | |
|---|---|---|
| EP | 0944883 | 6/1998 |
| EP | 1480462 | 11/2004 |

(56) References Cited

FOREIGN PATENT DOCUMENTS

| | | |
|---|---|---|
| GB | 2286283 | 8/1995 |
| GB | 2354394 | 3/2001 |
| GB | 2357387 A | 6/2001 |
| GB | 2400958 | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| KR | 10-2011-0109147 A | 10/2011 |
| KR | 10-2012-0057779 A | 6/2012 |
| KR | 10-2014-0115614 A | 10/2014 |
| KR | 10-2015-0055286 A1 | 5/2015 |
| KR | 10-1612745 B1 | 4/2016 |
| KR | 10-2016-0094597 A | 5/2016 |
| WO | WO1998039894 | 9/1998 |
| WO | WO2001013638 | 2/2001 |
| WO | WO2001093220 | 12/2001 |
| WO | WO2002085019 | 10/2002 |
| WO | WO2003028375 | 4/2003 |
| WO | WO2003096696 | 11/2003 |
| WO | WO2006038760 | 4/2006 |
| WO | WO2006067782 | 6/2006 |
| WO | WO2007125143 | 11/2007 |
| WO | WO2018031401 A1 | 2/2018 |
| WO | WO2018031412 A1 | 2/2018 |
| WO | WO2018031428 A1 | 2/2018 |

OTHER PUBLICATIONS

International Search Report for PCT/US17/045636, in the name of Sung Gon Kim, dated Nov. 17, 2017, 2 pages.
Office Action dated Oct. 16, 2018 for U.S. Appl. No. 15/669,817, Modestine et al., Parcel Theft Deterrence for A/V Recording and Communication Devices, 11 pages.
Office Action dated Nov. 7, 2018 for U.S. Appl. No. 15/669,839, Modestine et al., Parcel Theft Deterrence for A/V Recording and Communication Devices, 12 pages.
Office Action dated Feb. 22, 2018 from U.S. Appl. No. 15/669,393, Lemberger et al., " Parcel Theft Deterrence for Audio/Video Recording and Communication Devices," 10 pages.
Office Action for U.S. Appl. No. 15/967,097, dated May 15, 2019, Siminoff, "Parcel Theft Deterrence for A/V Recording and Communication Devices", 31 pages.
Office Action dated Aug. 28, 2018 from U.S. Appl. No. 15/669,393, Lemberger et al., "Parcel Theft Deterrence for Audio/Video Recording and Communication Devices," 13 pages.

\* cited by examiner

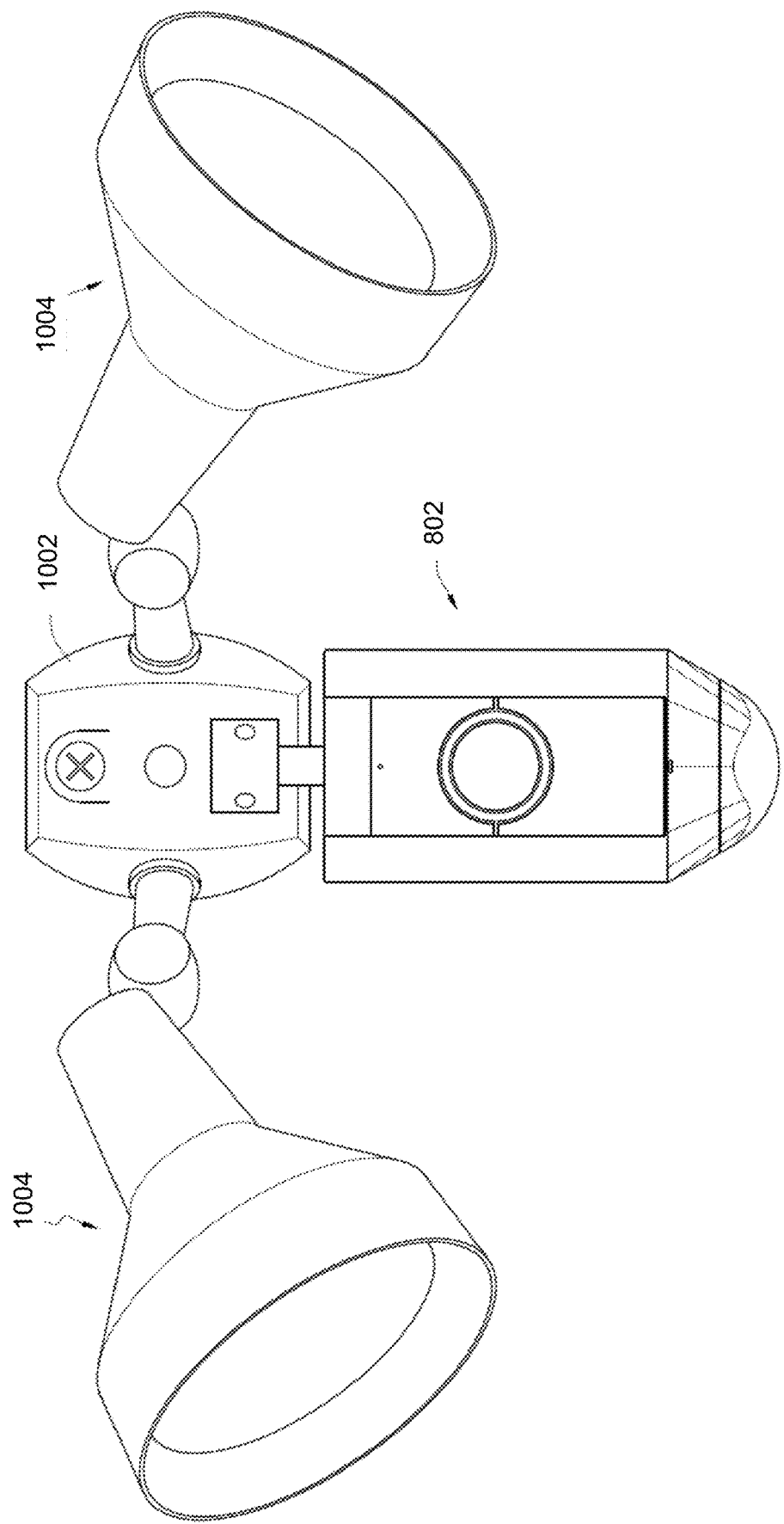

PARCEL THEFT DETERRENCE FOR A/V RECORDING AND COMMUNICATION DEVICES

CROSS-REFERENCE TO RELATED APPLICATIONS

This application claims priority to and is a continuation of U.S. patent application Ser. No. 15/967,097, filed on Apr. 30, 2018 which claims priority to and is a Continuation-In-Part of U.S. patent application Ser. No. 15/669,817 filed Aug. 4, 2017 which claims priority to U.S. provisional application No. 62/552,075 filed Jun. 19, 2017, U.S. provisional application No. 62/479,060 filed Mar. 30, 2017, and U.S. provisional application No. 62/374,505 filed Aug. 12, 2016; and is a Continuation-in-Part of U.S. patent application Ser. No. 15/669,839 filed Aug. 4, 2017, which claims priority to U.S. provisional application No. 62/552,075 filed Jun. 19, 2017, U.S. provisional application No. 62/479,060 filed Mar. 30, 2017, and U.S. provisional application No. 62/374,505 filed Aug. 12, 2016. This application is also a Continuation-In-Part of International patent application No. PCT/US17/45636 filed Aug. 4, 2017, which claims priority to U.S. provisional application No. 62/552,075 filed Jun. 19, 2017, U.S. provisional application No. 62/479,060 filed Mar. 30, 2017, and U.S. provisional application No. 62/374,505 filed Aug. 12, 2016. This application is also a Continuation-in-Part of U.S. patent application Ser. No. 15/669,393 filed Aug. 4, 2017, which claims priority to U.S. provisional application No. 62/479,060 filed Mar. 30, 2017, and U.S. provisional application No. 62/374,505 filed Aug. 12, 2016. This application is also a Continuation-In-Part of International patent application No. PCT/US17/45538 filed Aug. 4, 2017, which claims priority to U.S. provisional application No. 62/479,060 filed Mar. 30, 2017, and U.S. provisional application No. 62/374,505 filed Aug. 12, 2016. This application is also a Continuation-in-Part of U.S. patent application Ser. No. 15/669,092 filed Aug. 4, 2017, which claims priority to U.S. provisional application No. 62/479,060 filed Mar. 30, 2017 and U.S. provisional application No. 62/374,505 filed Aug. 12, 2016. This application is also a Continuation-In-Part of International patent application No. PCT/US17/45477 filed Aug. 4, 2017, which claims priority to U.S. provisional application No. 62/479,060 filed Mar. 30, 2017, and U.S. provisional application No. 62/374,505 filed Aug. 12, 2016. The entire contents of the priority applications are hereby incorporated by reference as if fully set forth.

TECHNICAL FIELD

The present embodiments relate to audio/video (A/V) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and may also aid in crime detection and prevention. For example, audio and/or video captured by an A/V recording and communication doorbell may be uploaded to the cloud and recorded on a remote server. Subsequent review of the A/V footage may aid law enforcement in capturing perpetrators of home burglaries and other crimes. Further, the presence of one or more an A/V recording and communication devices on the exterior of a home, such as a doorbell unit at the entrance of a home, acts as a powerful deterrent against would-be burglars.

SUMMARY

The various embodiments of the present parcel theft deterrence for audio/video (A/V) recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that parcel pilferage is a pernicious and persistent problem. Parcel carriers frequently leave parcels near the front door of a home when no one answers the door at the time of delivery. These parcels are vulnerable to theft, as they are often clearly visible from the street. This problem has only gotten worse with the proliferation of online commerce, and is particularly common around major holidays when many consumers do their holiday shopping online. It would be advantageous, therefore, if the functionality of A/V recording and communication devices could be leveraged to deter parcel theft and/or to identify and apprehend parcel thieves. It would also be advantageous if the functionality of A/V recording and communication devices could be enhanced in one or more ways to deter parcel theft and/or to identify and apprehend parcel thieves. The present embodiments provide these advantages and enhancements, as described below.

Another aspect of the present embodiments includes the realization that the rate at which parcel theft occurs, or the probability of parcel theft occurring, may be increased if the occupant is unavailable to retrieve the parcel in a relatively short time frame. The longer a parcel is at a delivery location, the probability that the parcel will be taken increases. It would be advantageous, therefore, if the functionality of a system associated with an A/V recording and communication device, as well as the A/V recording and communication device, could be used to determine the likelihood that the property is unoccupied or that the intended recipient of the parcel is otherwise unavailable.

In embodiments, if the parcel is delivered, a system associated with an A/V recording and communication device that detects the delivery of the parcel may determine if a security system associated with the parcel is armed. If the security system is disarmed, the security system data may be analyzed to determine whether the property has been unoccupied. If the property has been unoccupied, the system may transmit a request to a client device, where the request is to place the security system and/or the A/V recording and communication device in the package protection mode. The system may then receive a message from the client device, where the message indicates to place the security system and/or the A/V recording and communication device in the package protection mode. Based on receiving the message, the system may cause the security system and/or the A/V recording and communication device to operate in the package protection mode.

In a first aspect, a network device comprising one or more processors; a communication module; and a non-transitory machine-readable memory storing instructions that, when executed by the one or more processors, cause the one or more processors to perform operations comprising: receiving, using the communication module, image data from an audio/video (A/V) recording and communication device installed at a property; based at least in part on the image data, determining that a parcel has been delivered to a property; based at least in part on the parcel being delivered to the property, transmitting, using the communication module and to a client device, a first message indicating that the parcel has been delivered to the property; determining that a security system associated with the security system is disarmed; determining that the property has been unoccupied for a threshold period of time; based at least in part on the property being unoccupied for the threshold period of time, transmitting, using the communication module and to the client device, a request to place the A/V recording and communication device in a package protection mode; receiving, using the communication module and from the client device, a second message instructing the network device to place the security system in the package protection mode; and based at least in part on receiving the message, transmitting, using a communication module, a signal to the A/V recording and communication device, the signal configured to cause the A/V recording and communication device to operate in the package protection mode.

In an embodiment of the first aspect, determining that the parcel has been delivered to the property comprises: analyzing the image data; and based at least in part on the analyzing the image data, determining that the image data depicts the parcel.

In another embodiment of the first aspect, the image data is first image data, and the non-transitory machine-readable memory stores further instructions, that when executed by the one or more processors, cause the one or more processors to perform operations comprising receiving, using the communication module, second image data generated by the A/V recording and communication device, wherein determining that the property has been unoccupied for the threshold period of time comprises determining, using the second image data, that a person has left the property at a first time and a person has and has not entered the property between the first time and a second time.

In another embodiment of the first aspect, the non-transitory machine-readable memory stores further instructions, that when executed by the one or more processors, cause the one or more processors to perform operations comprising receiving, using the communication module, motion data generated by one or more sensors associated with the property; wherein determining that the property has been unoccupied for the threshold period of time comprises determining, using the motion data, that motion has not been detected within the property for the threshold period of time.

In another embodiment of the first aspect, the non-transitory machine-readable memory stores further instructions, that when executed by the one or more processors, cause the one or more processors to perform operations comprising receiving, using the communication module, audio data generated by one or more sensors associated with the property, wherein determining that the property has been unoccupied for the threshold period of time comprises determining, using the audio data, that an occupant is not present.

In another embodiment of the first aspect, the threshold period of time comprises a period of time after a last detection of movement indicating an exit of an occupant from the property.

In another embodiment of the first aspect, the signal is a first signal and the A/V recording and communication device is a first A/V recording and communication device, and the non-transitory machine-readable memory stores further instructions, that when executed by the one or more processors, cause the one or more processors to perform operations comprising, based at least in part on receiving the message, transmitting, using the communication module, a second signal to a second A/V recording and communication device, the second signal configured to cause the second A/V recording and communication device to operate in the package protection mode.

In another embodiment of the first aspect, the second A/V recording and communication device is associated with a second security system.

In another embodiment of the first aspect, the A/V recording and communication device is a first A/V recording and communication device and the image data is first image data, and the non-transitory machine-readable memory stores further instructions, that when executed by the one or more processors, cause the one or more processors to perform operations comprising transmitting, using the communication module, a query to determine occupancy to a second A/V recording and communication device; and receiving, using the communication module, at least one of motion data or image data from the second A/V recording and communication device, wherein determining that the property has been unoccupied for the threshold period of time comprises determining, based at least in part on the at least one of the motion data or the second image data, that the property has been unoccupied for the threshold period of time.

In another embodiment of the first aspect, the operations further comprising: determining that the parcel is not removed from a delivery location after a period of time, wherein transmitting the request to place the A/V recording and communication device in the package protection mode is further based on the parcel not being removed from the delivery location after the period of time.

In another embodiment of the first aspect, the request is first request and the client device is a first client device, and wherein the operations further comprise: determining that a predetermined period of time has elapsed since transmitting the request to the client device; and based at least in part on determining that the period of time having elapsed, transmitting, using the communication module, a second request to a second client device, the second request to place the A/V recording and communication device in the package protection mode.

In another embodiment of the first aspect, the network device is at least one of a hub device or a backend server.

In a second aspect, method for a network device, the network device including a processor and a communication module, the method comprising: receiving, by the processor and using the communication module, image data from an audio/video (A/V) recording and communication device; based at least in part on the image data, determining, by the processor, that a parcel has been delivered to a property; determining, by the processor, that a security system associated with the property is disarmed; determining, by the processor, that the property is unoccupied; based at least in part on the security system being disarmed and the property being unoccupied, transmitting, using the communication module, a request to a client device to place the A/V recording and communication device in a package protection mode; receiving, by the processor and using the communication module, a message instructing the network device to place the security system in the package protection mode; and based at least in part on receiving the message, transmitting, using a communication module, a signal to the A/V recording and communication device, the signal configured to cause the A/V recording and communication device to operate in the package protection mode.

In an embodiment of the second aspect, determining that the parcel has been delivered to the property comprises determining that the image data depicts the parcel.

In another embodiment of the second aspect, the image data is first image data, and wherein the method further comprises: receiving, by the processor and using the communication module, second image data generated by the A/V recording and communication device, wherein determining that the property has been unoccupied for the threshold period of time comprises determining, using the second image data, that a person has left the property and that, over the threshold period of time, a person has not entered the property since the person has left the property.

In another embodiment of the second aspect, the method further comprises receiving, by the processor and using the communication module, motion data generated by one or more sensors associated with the property; wherein determining that the property has been unoccupied for the threshold period of time comprises determining, using the motion data, that motion has not been detected within the property for the threshold period of time.

In another embodiment of the second aspect, the method further comprises receiving, by the processor and using the communication module, audio data generated by one or more sensors associated with the property, wherein determining that the property has been unoccupied for the threshold period of time comprises determining, using the audio data, that an occupant is not present for the threshold period of time.

In another embodiment of the second aspect, determining that the property is unoccupied comprises determining that an occupant exited the property and subsequently armed the security system.

In another embodiment of the second aspect, the A/V recording and communication device is a first A/V recording and communication device and the signal is a first signal, and wherein the method further comprises, based at least in part on receiving the message, transmitting, using a communication module, a second signal to a second A/V recording and communication device, the signal configured to cause the second A/V recording and communication device to operate in the package protection mode.

In another embodiment of the second aspect, the second A/V recording and communication device is associated with a second security system.

In another embodiment of the second aspect, the A/V recording and communication device is a first A/V recording and communication device and the image data is first image data, and wherein the method further comprises: transmitting, by the processor and using the communication module, a request for occupancy to a second A/V recording and communication device; and receiving, by the processor and using the communication module, at least one of motion data or second image data from the second A/V recording and communication device, wherein determining that the property is unoccupied is further based at least in part the at least one of the motion data or the second image data.

In another embodiment of the second aspect, the A/V recording and communication device is a first A/V recording and communication device and the request is a first request, and wherein the method further comprises: determining, before receiving the message, that a predetermined period of time has passed since transmitting the request; and transmitting, by the processor and using the communication module, a second request to a second client device, the second request to place the A/V recording and communication device in the package protection mode to a second client device.

In another embodiment of the second aspect, the network device is at least one of a hub device and a backend server.

In a third aspect, a network device comprising: one or more processors; a communication module; and a non-transitory machine-readable memory storing a program, the program executable by at least one of the processors, the program comprising sets of instructions for: determining that a parcel has been delivered to a property; determining that the property is unoccupied; based at least in part on the parcel being delivered to the property and the property being unoccupied, transmitting, using the communication module and to a client device, a request to place an A/V recording and communication device in a package protection mode; receiving, using the communication module, an instruction from the client device to place the A/V recording and communication device in the package protection mode; and transmitting, using the communication module, a signal configured to cause the A/V recording and communication device to operate in the package protection mode.

In an embodiment of the third aspect, the non-transitory machine-readable memory stores further instructions, that when executed by the one or more processors, cause the one or more processors to perform operations comprising receiving, using the communication module, a notification from a third-party server associated with a parcel delivery service, the notification indicating that the parcel has been delivered to the property, wherein determining that the parcel has been delivered to the property is based at least in part on the notification.

In another embodiment of the third aspect, the non-transitory machine-readable memory stores further instructions, that when executed by the one or more processors, cause the one or more processors to perform operations comprising receiving, using the communication module, image data generated by an audio/video (A/V) recording and communication device; and determining that the image data depicts the parcel, wherein determining that the parcel has been delivered to the property is based at least in part on the determining that the image data depicts the parcel.

In another embodiment of the third aspect, determining that the property is unoccupied comprises: receiving, using the communication module, image data from an audio/video (A/V) recording and communication device; and determining, using the image data, that an occupant is not located at the property.

In another embodiment of the third aspect, causing A/V recording and communication device to operate in the package protection mode comprises causing the A/V recording and communication device to increase a sensitivity of a sensor in at least one zone of the A/V recording and communication device.

In another embodiment of the third aspect, the A/V recording and communication device is a first A/V recording and communication device and the signal is a first signal, and the non-transitory machine-readable memory stores further instructions, that when executed by the one or more processors, cause the one or more processors to perform operations comprising transmitting, using the communication module, a second signal that is configured to cause a second A/V recording and communication device to operate in the package protection mode.

In another embodiment of the third aspect, determining that the property is unoccupied comprises analyzing image data to determine that a person has left the property and has not entered the property.

In another embodiment of the third aspect, determining that the property is unoccupied comprises analyzing motion data to determine that motion has not been detected inside the property for a threshold period of time.

In another embodiment of the third aspect, determining that the property is unoccupied comprises analyzing audio data to determine that a least one of first sounds inside the property or an absence of second sounds inside the property do not indicate a presence of an occupant.

In another embodiment of the third aspect, determining that the property is unoccupied comprises determining that an occupant armed a security system and subsequently exited the property.

In another embodiment of the third aspect, the signal is a first signal, and the non-transitory machine-readable memory stores further instructions, that when executed by the one or more processors, cause the one or more processors to perform operations comprising transmitting, using the communication module, a second signal to a device of a security system, the second signal configured to cause the device to operate in an activation mode.

In another embodiment of the third aspect, the request is a first request and the client device is a first client device, and the non-transitory machine-readable memory stores further instructions, that when executed by the one or more processors, cause the one or more processors to perform operations comprising determining that a period of time has elapsed since transmitting the first request; determining that the parcel still located at a delivery location; and transmitting, using the communication module and to a second client device, a second request to place the A/V recording and communication device in a package protection mode.

In another embodiment of the third aspect, the request is a first request and the client device is a first client device, and the non-transitory machine-readable memory stores further instructions, that when executed by the one or more processors, cause the one or more processors to perform operations comprising determining, before receiving the instruction, that a response from the client device has not been received for a threshold period of time since transmitting the request; and transmitting, using the communication module, a second request to a second client device, the second request to place the A/V recording and communication device in the package protection mode.

In another embodiment of the third aspect, the network device is at least one of a hub device, an application programming interface, a storage device, or a backend server.

In a fourth aspect, a method for a network device, the network device including a processor and a communication module, the method comprising: determining, by the processor, that a parcel has been delivered to a property; determining, by the processor, that the property is unoccupied; based at least in part on the determining that the parcel has been delivered to the property and the determining that the property is unoccupied, transmitting, by the processor and using the communication module, a request to a client device, the request to place an A/V recording and communication device in a package protection mode; receiving, by the processor and using the communication module, a message from the client device, the message including an indication to place the A/V recording and communication device in the package protection mode; and transmitting, using the communication module, a signal that causes the A/V recording and communication device to operate in the package protection mode.

In an embodiment of the fourth aspect, determining that the property is unoccupied comprises: analyzing, by the processor, image data; and determining, by the processor, that the image data depicts a person leaving the property.

In another embodiment of the fourth aspect, determining that the property is unoccupied comprises: analyzing, by the processor, image data; and determining, by the processor, that the image data does not depict a person located at the property.

In another embodiment of the fourth aspect, determining that the property has been unoccupied comprises: analyzing, by the processor, motion data; and determining, by the processor, that motion has not been detected inside of the property.

In another embodiment of the fourth aspect, determining that the property has been unoccupied comprises: analyzing, by the processor, audio data; and determining, by the processor, that the audio data is not indicative of any persons being present inside the property.

In another embodiment of the fourth aspect, determining that the property has been unoccupied comprises determining, by the processor, that an occupant exited the property and subsequently armed the security system.

In another embodiment of the fourth aspect, the request is a first request and the client device is a first client device, and wherein the method further comprises: determining, by the processor and before receiving the message, that a threshold period of time has elapsed since transmitting the request; and transmitting a second request to a second client device, the second request to place the device in the package protection mode.

In another embodiment of the fourth aspect, the network device is at least one of a hub device and a backend server.

In a fifth aspect, a non-transitory computer-readable media storing instructions that, when executed by one or more processors, cause the one or more processors to perform operations, the operations comprising: receiving a user alert from at least one of a network device or an audio/video (A/V) recording and communication device, the user alert indicating that a parcel has been delivered to a property; based at least in part on the user alert, causing the user alert to be displayed on a display; receiving a notification from the network device, the notification indicating that the property is unoccupied and that the A/V recording and communication device is not in a package protection mode; based at least in part on the notification, causing the notification to be displayed on the display; causing a user interface to be displayed on the display; receiving an input associated with placing the A/V recording and communication device in the package protection mode; and based at least in part on the input, transmitting data to at least one of the network device or the A/V recording and communication device, the data indicative of a request to place the A/V recording and communication device in the package protection mode.

In an embodiment of the fifth aspect, the operations further comprising receiving an indication from a delivery service that the parcel has been delivered to the property.

In another embodiment of the fifth aspect, the operations further comprising: receiving image data generated by the A/V recording and communication device, the image data depicting the parcel; and causing the image data to be displayed on the display.

In another embodiment of the fifth aspect, the operations further comprising causing a timer to be displayed on the display, the timer associated with causing the A/V recording and communication device to automatically be placed in the package protection mode after a time period has elapsed.

In another embodiment of the fifth aspect, the data is first data, and wherein the operations further comprise: determining that a period of time has elapsed since receiving the notification; and based at least in part on determining that the period of time has elapsed since receiving the notification, transmitting second data to at least one of the network device or the A/V recording and communication device, the second data representative of a command to place the A/V recording and communication device in the package protection mode.

In another embodiment of the fifth aspect, the data is first data and A/V recording and communication device is a first A/V recording and communication device, and wherein the operations further comprise, based at least in part on receiving the input, transmitting second data to the at least one of the network device or a second A/V recording and communication device, the second data indicating to place the second A/V recording and communication device in the package protection mode.

In another embodiment of the fifth aspect, the first A/V recording and communication device and the second A/V recording and communication device are associated with a security system.

In another embodiment of the fifth aspect, the network device is at least one of a hub device and a backend server.

In a sixth aspect, a method implemented by a client device that includes a display, a communication module, and a processor, the method comprising: transmitting, by the processor and using the communication module, location data to a network device, the location data indicating that the client device is outside of a property; receiving, by the processor and using the communication module, a user alert from at least one of the network device or an audio/video (A/V) recording and communication device, the user alert indicating that a parcel has been delivered to the property; based at least in part on receiving of the user alert, causing, by the processor, the user alert to be displayed on the display; receiving, by the processor and using the communication module, a notification indicating that the A/V recording and communication device is operating in mode other than a package protection mode; causing, by the processor, the notification to be displayed on the display; causing, by the processor, an option to be displayed on the display, the option for causing the A/V recording and communication device to operate in the package protection mode; receiving, by the processor, an input selecting the option for causing the A/V recording and communication device to operate in the package protection mode; and based at least in part on receiving of the input, transmitting by the processor and using the communication module, a message to the network device, the message indicating to place the A/V recording and communication device in the package protection mode.

In an embodiment of the sixth aspect, the method further comprises receiving, by the processor and using the communication module, image data generated by the A/V recording and communication device, the image data depicting at least the parcel; and causing, by the processor, the image data to be displayed on the display. In another embodiment of the sixth aspect, wherein the user alert further indicates that the property is unoccupied.

In another embodiment of the sixth aspect, the A/V recording and communication device is a first A/V recording and communication device and the message is a first message, and wherein the method further comprises, based at least in part on receiving the input, transmitting by the processor and using the communication module, a second message to the network device, the second message indicating to place a second A/V recording and communication device in the package protection mode.

In another embodiment of the sixth aspect, the network device is at least one of a hub device and a backend server.

In a seventh aspect, a non-transitory computer-readable media storing instructions that, when executed by one or more processors, cause the one or more processors to perform operations comprising: receiving a notification from a network device, the notification indicating that a parcel is present at the property and the property is unoccupied; based at least in part on receiving of the notification, causing a user interface to be displayed, the user interface configured to receive an input to cause an audio/video (A/V) recording and communication device to operate in a package protection mode; receiving the input to cause the A/V recording and communication device to operate in the package protection mode; and based at least in part on the input, transmitting data to at least one of the network device or the A/V recording and communication device, the data configured to cause the A/V recording and communication device to operate in the package protection mode.

In an embodiment of the seventh aspect, the operations further comprising receiving a notification from a third-party delivery service that delivered the parcel.

In another embodiment of the seventh aspect, the operations further comprising: receiving image data generated by the A/V recording and communication device, the image data depicting the parcel; and causing the image data to be displayed on the display.

In another embodiment of the seventh aspect, the input is a first input, and wherein the operations further comprise: receiving a second input associated with causing a security system to operate in a mode, wherein the data is further configured to cause the security system to operate in the mode.

In another embodiment of the seventh aspect, the A/V recording and communication device is a first A/V recording and communication device and the data is first data, and wherein the operations further comprise, based at least in part on the input, transmitting second data to at least one of the network device or a second A/V recording and communication device, the second data configured to cause the second A/V recording and communication device to operate in the package protection mode.

In another embodiment of the seventh aspect, the first A/V recording and communication device and the second A/V recording and communication device are associated with the security system.

In another embodiment of the seventh aspect, the first A/V recording and communication device is associated with the security system and the second A/V recording and communication device is associated with a second security system.

In another embodiment of the seventh aspect, the network device is at least one of a hub device, an application programming interface, a storage device, or a backend server.

In an eight aspect, a method implemented by a client device that includes a display, a communication module, and a processor, is provided, the method comprising: receiving, by the processor and using the communication module, a notification from a network device, the notification indicating that a parcel has been delivered to a property that is unoccupied; causing, by the processor, the notification to be displayed on the display; receiving, by the processor, an input to cause the A/V recording and communication device to operate in a package protection mode; and based at least in part on the input, transmitting, by the processor and using the communication module, a message to the network device, the message indicating to cause the A/V recording and communication device to operate in the package protection mode.

In an embodiment of the eighth aspect, causing the A/V recording and communication device to operate in the package protection mode comprises changing motion of the A/V recording and communication device.

In another embodiment of the eighth aspect, the method further comprises receiving, by the processor and using the communication module, image data generated by the A/V recording and communication device, the image data depicting the parcel; and causing, by the processor, the image data to be displayed on the display.

In another embodiment of the eighth aspect, the input is a first input, and wherein the method further comprises: receiving, by the processor, a second input associated with causing a security system to operate in a mode, the security system associated with the A/V recording and communication device, wherein the data is further configured to cause the security system to operate in the mode.

In another embodiment of the eighth aspect, the A/V recording and communication device is a first A/V recording and communication device and the data is first data, and wherein the method further comprises, based at least in part on the input, transmitting, by the processor and using the communication module, second data to the network device, the second data configured to cause a second A/V recording and communication device to operate in the package protection mode.

In another embodiment of the eighth aspect, the first A/V recording and communication device and the second A/V recording and communication device are associated with a security system In another embodiment of the eighth aspect, the first A/V recording and communication device is associated with a first security system and the second A/V recording and communication device is associated with a second security system.

In another embodiment of the eighth aspect, the network device is at least one of a hub device and a backend server.

BRIEF DESCRIPTION OF THE DRAWINGS

The various embodiments of the present parcel theft deterrence for audio/video (A/V) recording and communication devices now will be discussed in detail with an emphasis on highlighting the advantageous features. These embodiments depict the novel and non-obvious present parcel theft deterrence for A/V recording and communication devices shown in the accompanying drawings, which are for illustrative purposes only. These drawings include the following figures, in which like numerals indicate like parts:

FIG. 26 is a front elevation view of the example floodlight controller with A/V recording and communication features of FIG. 9 in combination with a floodlight device according to various aspects of the present disclosure;

DETAILED DESCRIPTION

Figure 1:
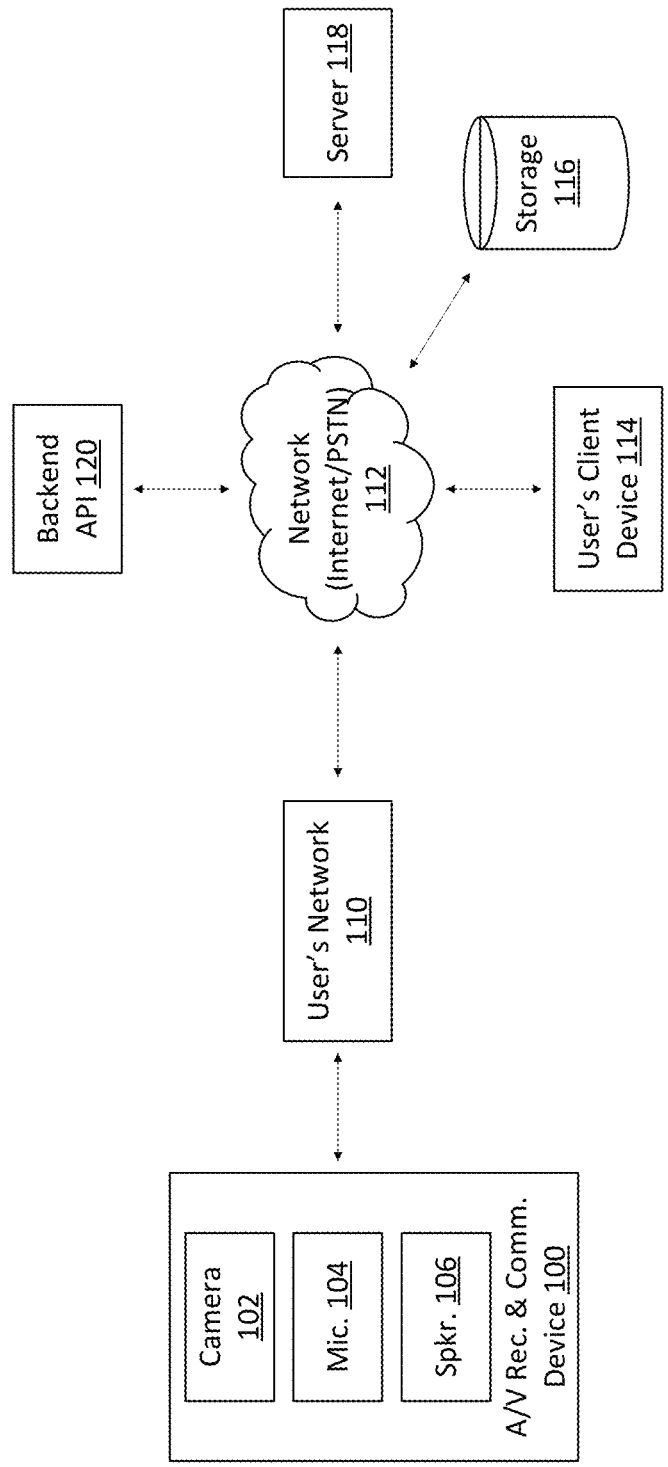
FIG. 1 is a functional block diagram illustrating a system for streaming and storing A/V content captured by an audio/video (A/V) recording and communication device according to various aspects of the present disclosure.

The present embodiments may be implemented in numerous ways, including as a process, an apparatus, a system, a computer program product embodied on a computer-readable storage medium, and/or a processor, such as a processor configured to execute instructions stored on and/or provided by a memory coupled to the processor. In this specification, these implementations may be referred to as techniques. In general, the order of the steps of disclosed processes may be altered within the scope of the present embodiments. Unless stated otherwise, a component such as a processor or a memory described as being configured to perform a task may be implemented as a general component that is temporarily configured to perform the task at a given time or a specific component that is manufactured to perform the task. As used herein, the term processor may comprise one or more devices, circuits, and/or processing cores configured to process data, such as computer program instructions.

The following detailed description describes the present embodiments with reference to the drawings. In the drawings, reference numbers label elements of the present embodiments. These reference numbers are reproduced below in connection with the discussion of the corresponding drawing features.

The embodiments of the present parcel theft deterrence for audio/video (A/V) recording and communication devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) recording and communication device 100, interchangeably referred to herein as an A/V recording and communication device 130. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbells described herein, but without the front button and related components.

The A/V recording and communication device 100 is typically located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 1080p or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN (e.g., RingNet), RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, Global Navigation Satellite System (GNSS), such as GPS, CDPD (cellular digital packet data), RIM (Research in Motion, Limited) duplex paging network, Bluetooth radio, or an IEEE 802.11-based radio frequency network. The network may further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V recording and communication device 100 may also capture audio through the microphone 104. The A/V recording and communication device 100 may detect the visitor's presence using a motion sensor, and/or by detecting that the visitor has depressed the button on the A/V recording and communication device 100.

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some of the present embodiments).

The video images captured by the camera 102 of the A/V recording and communication device 100 (and the audio captured by the microphone 104) may be uploaded to the cloud and recorded on the remote storage device 116 (FIG. 1). In some of the present embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some of the present embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API may ease the work of programming GUI components. For example, an API may facilitate integration of new features into existing applications (a so-called "plug-in API"). An API may also assist otherwise distinct applications with sharing data, which may help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components may both be run on the same machine. Clients and servers may have a user interface, and sometimes other hardware associated with them.

Figure 2:
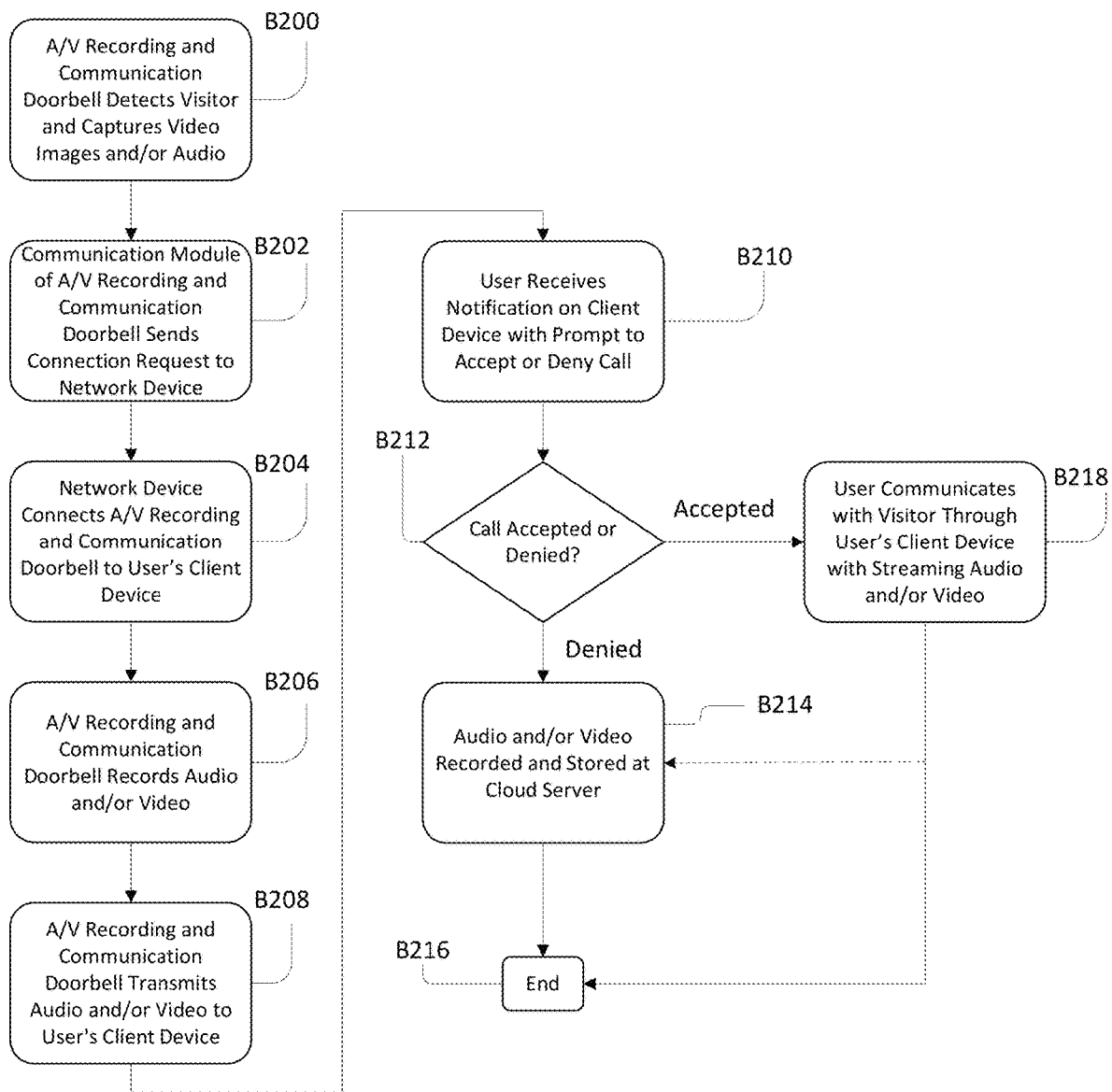
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 100 according to various aspects of the present disclosure. At block B260, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B262, a communication module of the A/V recording and communication device 100 sends a request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B264 the network device may connect the A/V recording and communication device 100 to the user's client device 114 through the user's network 110 and the network 112. At block B266, the A/V recording and communication device 100 may record available audio and/or video data using the camera 102, the microphone 104, and/or any other device/sensor available. At block B268, the audio and/or video data is transmitted (streamed) from the A/V recording and communication device 100 to the user's client device 114 via the user's network 110 and the network 112. At block B270, the user may receive a notification on his or her client device 114 with a prompt to either accept or deny the call.

At block B272, the process determines whether the user has accepted or denied the call. If the user denies the notification, then the process advances to block B274, where the audio and/or video data is recorded and stored at a cloud server. The session then ends at block B276 and the connection between the A/V recording and communication device 100 and the user's client device 114 is terminated. If, however, the user accepts the notification, then at block B278 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B276. In some of the present embodiments, the audio and/or video data may be recorded and stored at a cloud server (block B274) even if the user accepts the notification and communicates with the visitor through the user's client device 114.

Figure 3:
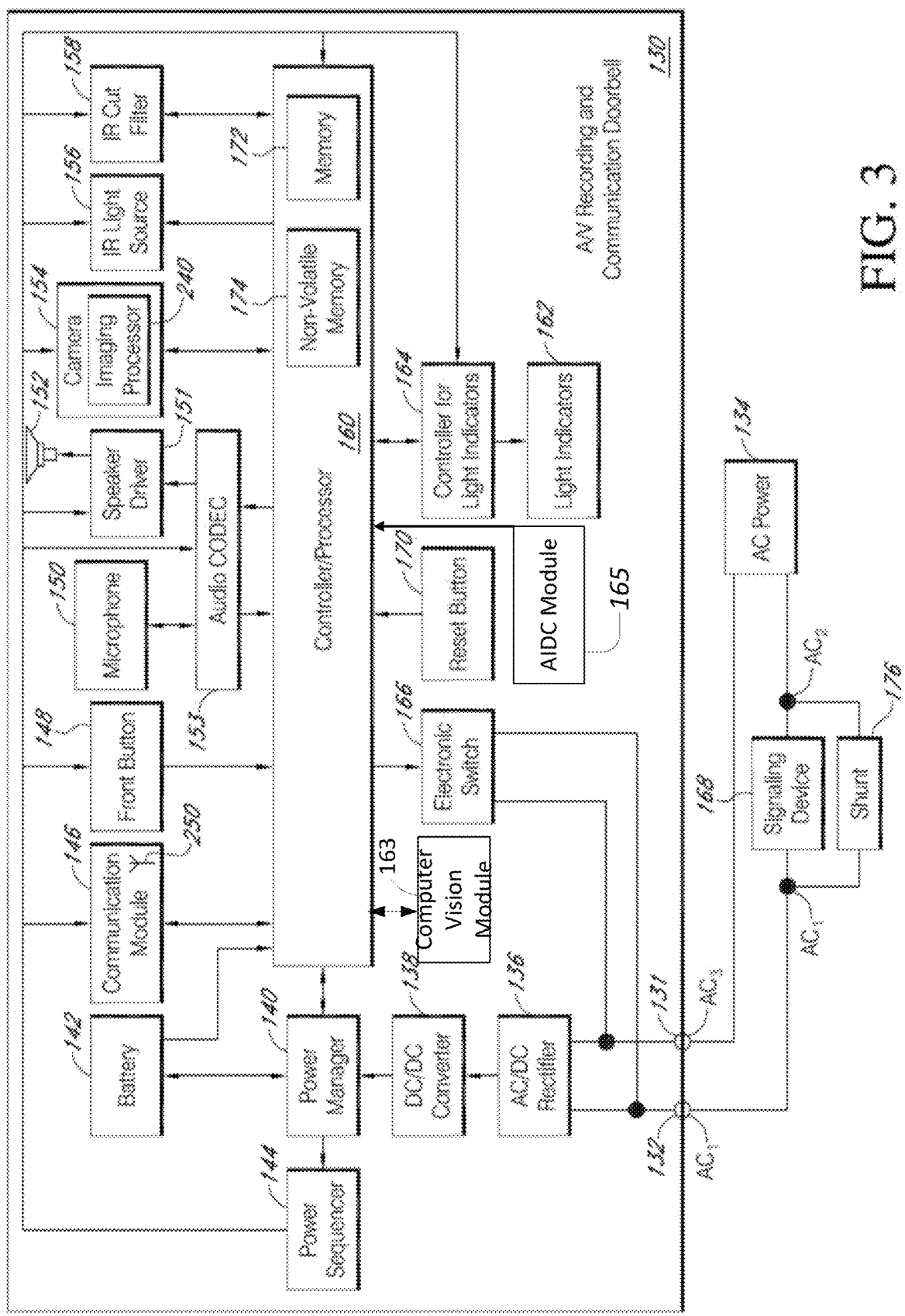
FIG. 3 is a functional block diagram illustrating an embodiment of an A/V recording and communication device according to the present disclosure.

FIGS. 3-13 illustrate one embodiment of a low-power-consumption A/V recording and communication device 130 according to various aspects of the present disclosure. FIG. 3 is a functional block diagram illustrating various components of the A/V recording and communication device 130 and their relationships to one another. For example, the A/V recording and communication device 130 includes a pair of terminals 131, 132 configured to be connected to a source of external AC (alternating-current) power, such as a household AC power supply 134 (may also be referred to as AC mains). The AC power 134 may have a voltage in the range of 16-24 V AC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication device 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication device 130, including a communication module 146, a front button 148, a microphone 150, a speaker driver 151, a speaker 152, an audio CODEC (COder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication device 130 further comprises an electronic switch 166 that closes when the front button 148 is depressed. When the electronic switch 166 closes, power from the AC power source 134 is diverted through a signaling device 168 that is external to the A/V recording and communication device 130 to cause the signaling device 168 to emit a sound, as further described below. In one non-limiting example, the electronic switch 166 may be a triac (triode AC switch) device. The A/V recording and communication device 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some of the present embodiments the memory 172 and/or non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication device 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication device 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication device 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V recording and communication device 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the device 130 therefore causes the signaling device 168 to "ring," alerting any person(s) within the structure to which the device 130 is mounted that there is a visitor at the front door (or at another location corresponding to the location of the device 130). In one non-limiting example, the electronic switch 166 may be a triac device.

Figure 4:
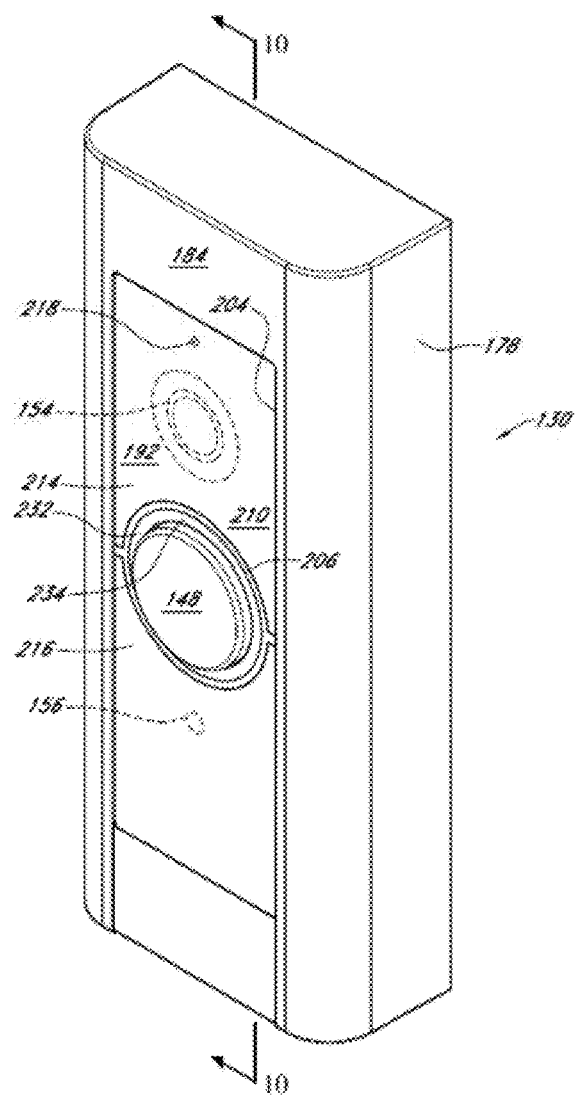
FIG. 4 is a front perspective view of an embodiment of an A/V recording and communication device according to the present disclosure.
Figure 5:
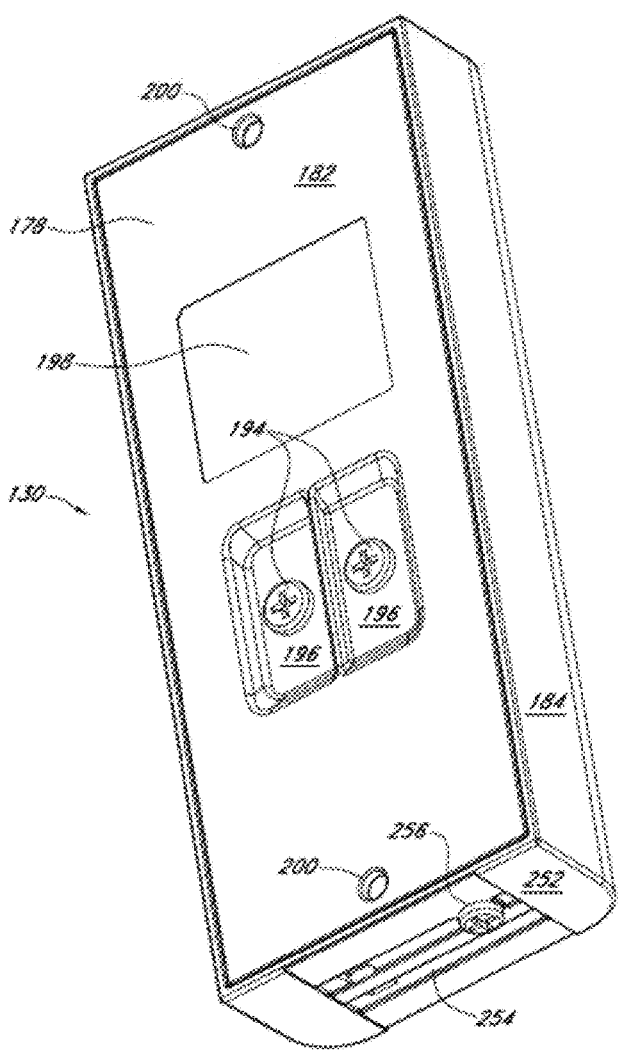
FIG. 5 is a rear perspective view of the A/V recording and communication device of FIG. 4.
Figure 6:
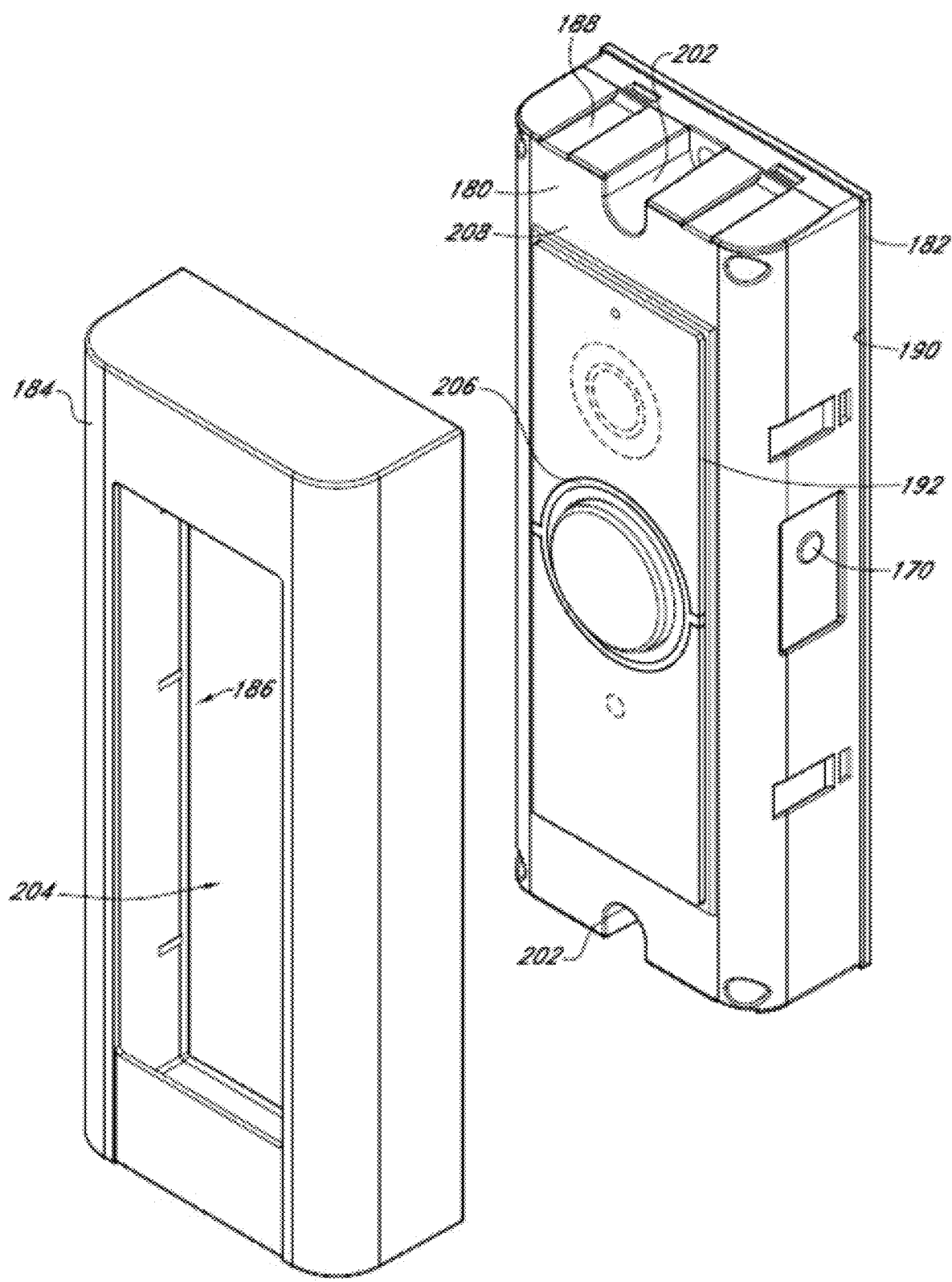
FIG. 6 is a partially exploded front perspective view of the A/V recording and communication device of FIG. 4 showing the cover removed.

With reference to FIGS. 4-6, the A/V recording and communication device 130 further comprises a housing 178 having an enclosure 180 (FIG. 6), a back plate 182 secured to the rear of the enclosure 180, and a shell 184 overlying the enclosure 180. With reference to FIG. 6, the shell 184 includes a recess 186 that is sized and shaped to receive the enclosure 180 in a close fitting engagement, such that outer surfaces of the enclosure 180 abut conforming inner surfaces of the shell 184. Exterior dimensions of the enclosure 180 may be closely matched with interior dimensions of the shell 184 such that friction maintains the shell 184 about the enclosure 180. Alternatively, or in addition, the enclosure 180 and/or the shell 184 may include mating features 188, such as one or more tabs, grooves, slots, posts, etc. to assist in maintaining the shell 184 about the enclosure 180. The back plate 182 is sized and shaped such that the edges of the back plate 182 extend outward from the edges of the enclosure 180, thereby creating a lip 190 against which the shell 184 abuts when the shell 184 is mated with the enclosure 180, as shown in FIGS. 4 and 5. In some of the present embodiments, multiple shells 184 in different colors may be provided so that the end user may customize the appearance of his or her A/V recording and communication device 130. For example, the A/V recording and communication device 130 may be packaged and sold with multiple shells 184 in different colors in the same package.

With reference to FIG. 4, a front surface of the A/V recording and communication device 130 includes the button 148 (may also be referred to as front button 148, FIG. 3), which is operatively connected to the processor 160. In a process similar to that described above with reference to FIG. 2, when a visitor presses the front button 148, an alert may be sent to the user's client device to notify the user that someone is at his or her front door (or at another location corresponding to the location of the A/V recording and communication device 130). With further reference to FIG. 4, the A/V recording and communication device 130 further includes the camera 154, which is operatively connected to the processor 160, and which is located behind a shield 192. As described in detail below, the camera 154 is configured to capture video images from within its field of view. Those video images may be streamed to the user's client device and/or uploaded to a remote network device for later viewing according to a process similar to that described above with reference to FIG. 2.

With reference to FIG. 5, a pair of terminal screws 194 extends through the back plate 182. The terminal screws 194 are connected at their inner ends to the terminals 131, 132 (FIG. 3) within the A/V recording and communication device 130. The terminal screws 194 are configured to receive electrical wires to connect to the A/V recording and communication device 130, through the terminals 131, 132, to the household AC power supply 134 of the structure on which the A/V recording and communication device 130 is mounted. In the illustrated embodiment, the terminal screws 194 are located within a recessed portion 196 of the rear surface 198 of the back plate 182 so that the terminal screws 194 do not protrude from the outer envelope of the A/V recording and communication device 130. The A/V recording and communication device 130 may thus be mounted to a mounting surface with the rear surface 198 of the back plate 182 abutting the mounting surface. The back plate 182 includes apertures 200 adjacent its upper and lower edges to accommodate mounting hardware, such as screws (not shown), for securing the back plate 182 (and thus the A/V recording and communication device 130) to the mounting surface. With reference to FIG. 6, the enclosure 180 includes corresponding apertures 202 adjacent its upper and lower edges that align with the apertures 200 in the back plate 182 to accommodate the mounting hardware. In certain embodiments, the A/V recording and communication device 130 may include a mounting plate or bracket (not shown) to facilitate securing the A/V recording and communication device 130 to the mounting surface.

Figure 10:
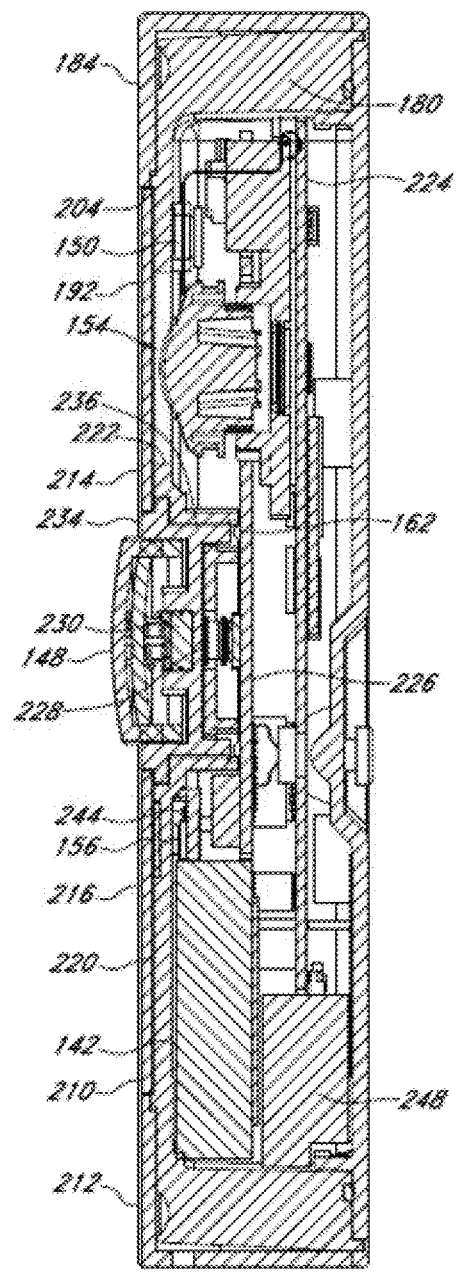
FIG. 10 is a right-side cross-sectional view of the A/V recording and communication device of FIG. 4 taken through the line 10-10 in FIG. 4.

With further reference to FIG. 6, the shell 184 includes a central opening 204 in a front surface. The central opening 204 is sized and shaped to accommodate the shield 192. In the illustrated embodiment, the shield 192 is substantially rectangular, and includes a central opening 206 through which the front button 148 protrudes. The shield 192 defines a plane parallel to and in front of a front surface 208 of the enclosure 180. When the shell 184 is mated with the enclosure 180, as shown in FIGS. 4 and 10, the shield 192 resides within the central opening 204 of the shell 184 such that a front surface 210 of the shield 192 is substantially flush with a front surface 212 of the shell 184 and there is little or no gap (FIG. 4) between the outer edges of the shield 192 and the inner edges of the central opening 204 in the shell 184.

With further reference to FIG. 6, the shield 192 includes an upper portion 214 (located above and to the sides of the front button 148) and a lower portion 216 (located below and to the sides of the front button 148). The upper and lower portions 214, 216 of the shield 192 may be separate pieces, and may comprise different materials. The upper portion 214 of the shield 192 may be transparent or translucent so that it does not interfere with the field of view of the camera 154. For example, in certain embodiments the upper portion 214 of the shield 192 may comprise glass or plastic. As described in detail below, the microphone 150, which is operatively connected to the processor 160, is located behind the upper portion 214 of the shield 192. The upper portion 214, therefore, may include an opening 218 that facilitates the passage of sound through the shield 192 so that the microphone 150 is better able to pick up sounds from the area around the A/V recording and communication device 130.

The lower portion 216 of the shield 192 may comprise a material that is substantially transparent to infrared (IR) light, but partially or mostly opaque with respect to light in the visible spectrum. For example, in certain embodiments the lower portion 216 of the shield 192 may comprise a plastic, such as polycarbonate. The lower portion 216 of the shield 192, therefore, does not interfere with transmission of IR light from the IR light source 156, which is located behind the lower portion 216. As described in detail below, the IR light source 156 and the IR cut filter 158, which are both operatively connected to the processor 160, facilitate "night vision" functionality of the camera 154.

The upper portion 214 and/or the lower portion 216 of the shield 192 may abut an underlying cover 220 (FIG. 10), which may be integral with the enclosure 180 or may be a separate piece. The cover 220, which may be opaque, may include a first opening 222 corresponding to the location of the camera 154, a second opening (not shown) corresponding to the location of the microphone 150 and the opening 218 in the upper portion 214 of the shield 192, and a third opening (not shown) corresponding to the location of the IR light source 156.

Figure 7:
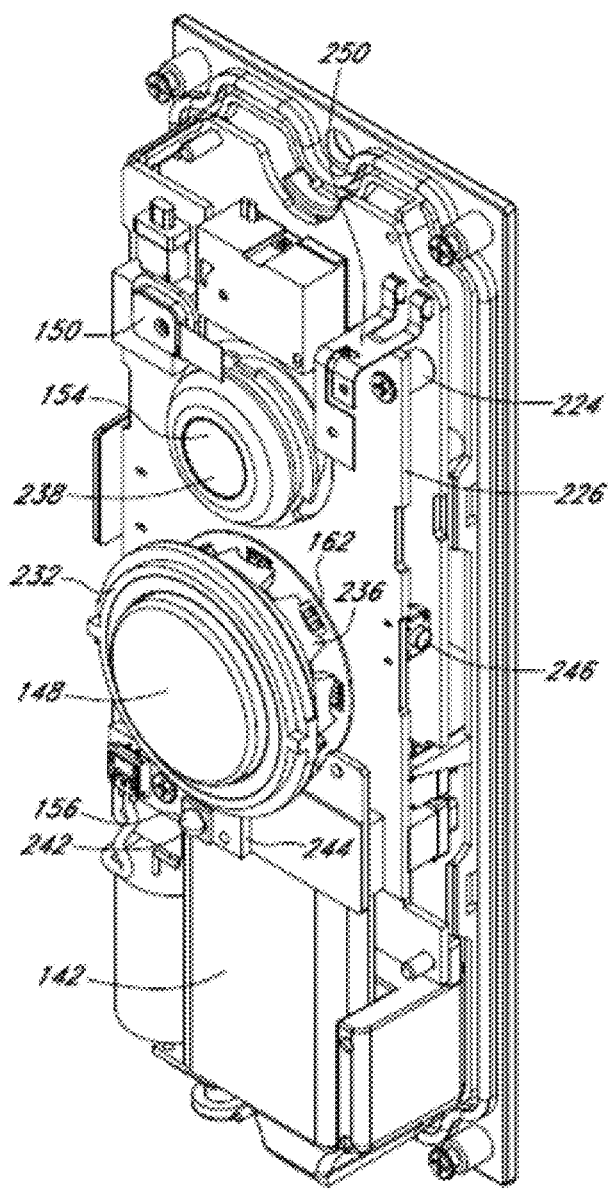
FIGS. 7-9 are front perspective views of various internal components of the A/V recording and communication device of FIG. 4.
Figure 8:
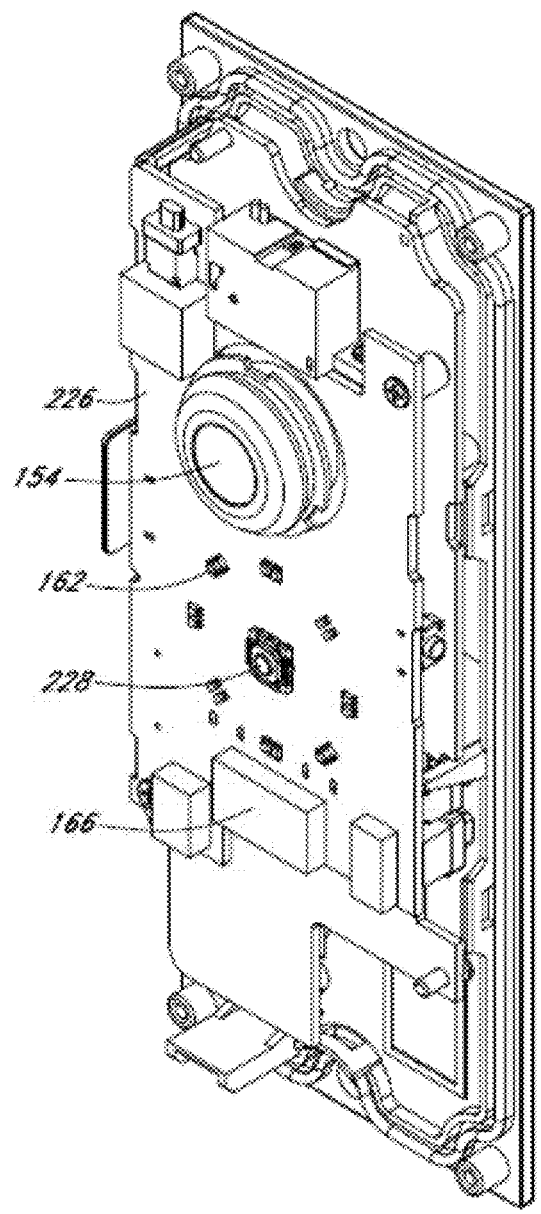
Figure 9:
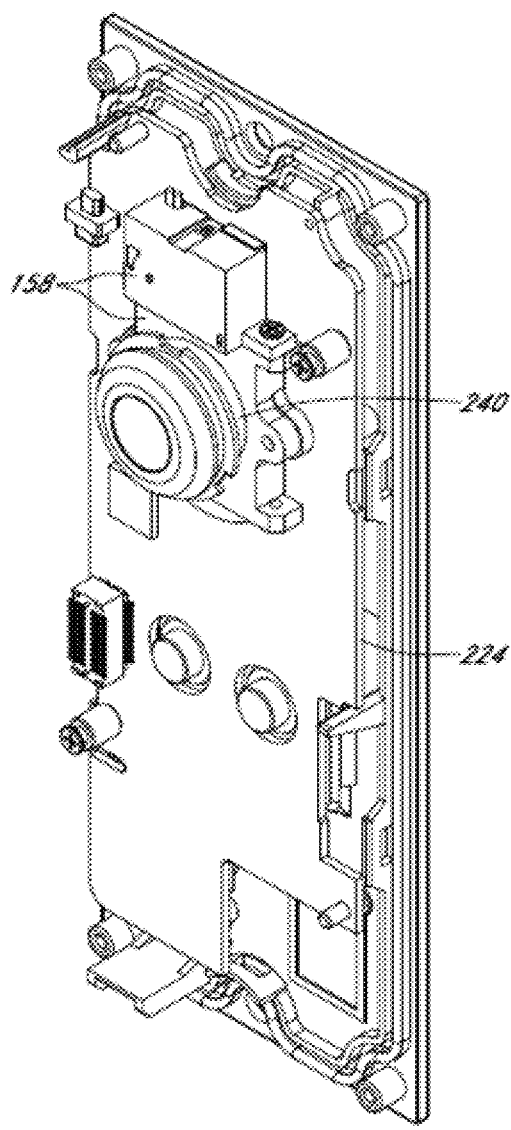

FIGS. 7-10 illustrate various internal components of the A/V recording and communication device 130. FIGS. 7-9 are front perspective views of the device 130 with the shell 184 and the enclosure 180 removed, while FIG. 10 is a right-side cross-sectional view of the device 130 taken through the line 10-10 in FIG. 4. With reference to FIGS. 7 and 8, the A/V recording and communication device 130 further comprises a main printed circuit board (PCB) 224 and a front PCB 226. With reference to FIG. 8, the front PCB 226 comprises a button actuator 228. With reference to FIGS. 7, 8, and 10, the front button 148 is located in front of the button actuator 228. The front button 148 includes a stem 230 (FIG. 10) that extends into the housing 178 to contact the button actuator 228. When the front button 148 is pressed, the stem 230 depresses the button actuator 228, thereby closing the electronic switch 166 (FIG. 8), as described below.

With reference to FIG. 8, the front PCB 226 further comprises the light indicators 162, which may illuminate when the front button 148 of the device 130 is pressed. In the illustrated embodiment, the light indicators 162 comprise light-emitting diodes (LEDs 162) that are surface mounted to the front surface of the front PCB 226 and are arranged in a circle around the button actuator 228. The present embodiments are not limited to the light indicators 162 being LEDs, and in alternative embodiments the light indicators 162 may comprise any other type of light-emitting device. The present embodiments are also not limited by the number of light indicators 162 shown in FIG. 8, nor by the pattern in which they are arranged.

With reference to FIG. 7, the device 130 further comprises a light pipe 232. The light pipe 232 is a transparent or translucent ring that encircles the front button 148. With reference to FIG. 4, the light pipe 232 resides in an annular space between the front button 148 and the central opening 206 in the shield 192, with a front surface 234 of the light pipe 232 being substantially flush with the front surface 210 of the shield 192. With reference to FIGS. 7 and 10, a rear portion of light pipe 232 includes a plurality of posts 236 whose positions correspond to the positions of the LEDs 162. When the LEDs 162 are illuminated, light is transmitted through the posts 236 and the body of the light pipe 232 so that the light is visible at the front surface 234 of the light pipe 232. The LEDs 162 and the light pipe 232 thus provide a ring of illumination around the front button 148. The light pipe 232 may comprise a plastic, for example, or any other suitable material capable of transmitting light.

The LEDs 162 and the light pipe 232 may function as visual indicators for a visitor and/or a user. For example, the LEDs 162 may illuminate upon activation or stay illuminated continuously. In one aspect, the LEDs 162 may change color to indicate that the front button 148 has been pressed. The LEDs 162 may also indicate that the battery 142 needs recharging, or that the battery 142 is currently being charged, or that charging of the battery 142 has been completed. The LEDs 162 may indicate that a connection to the user's wireless (and/or wired) network is good, limited, poor, or not connected. The LEDs 162 may be used to guide the user through setup or installation steps using visual cues, potentially coupled with audio cues emitted from the speaker 152.

With further reference to FIG. 7, the A/V recording and communication device 130 further comprises a rechargeable battery 142. As described in further detail below, the A/V recording and communication device 130 is connected to an external power source 134 (FIG. 3), such as AC mains. The A/V recording and communication device 130 is primarily powered by the external power source 134, but may also draw power from the rechargeable battery 142 so as not to exceed a threshold amount of power from the external power source 134, to thereby avoid inadvertently sounding the signaling device 168. With reference to FIG. 3, the battery 142 is operatively connected to the power manager 140. As described below, the power manager 140 controls an amount of power drawn from the battery 142 to supplement the power drawn from the external AC power source 134 to power the A/V recording and communication device 130 when supplemental power is needed. The power manager 140 also controls recharging of the battery 142 using power drawn from the external power source 134. The battery 142 may comprise, for example, a lithium-ion battery, or any other type of rechargeable battery.

With further reference to FIG. 7, the A/V recording and communication device 130 further comprises the camera 154. The camera 154 is coupled to a front surface of the front PCB 226, and includes a lens 238 and an imaging processor 240 (FIG. 9). The camera lens 238 may be a lens capable of focusing light into the camera 154 so that clear images may be captured. The camera 154 may comprise, for example, a high definition (HD) video camera, such as one capable of capturing video images at an image display resolution of 720p or better. In certain of the present embodiments, the camera 154 may be used to detect motion within its field of view, as described below.

With further reference to FIG. 7, the A/V recording and communication device 130 further comprises an infrared (IR) light source 242. In the illustrated embodiment, the IR light source 242 comprises an IR light-emitting diode (LED) 242 coupled to an IR LED printed circuit board (PCB) 244. In alternative embodiments, the IR LED 242 may not comprise a separate PCB 244, and may, for example, be coupled to the front PCB 226.

With reference to FIGS. 7 and 10, the IR LED PCB 244 is located below the front button 148 (FIG. 7) and behind the lower portion 216 of the shield 192 (FIG. 10). As described above, the lower portion 216 of the shield 192 is transparent to IR light, but may be opaque with respect to light in the visible spectrum. In alternative embodiments of the IR LED PCB 244, the IR LED PCB 244 may include more than one IR LED 242. For example, the IR LED PCB 244 may include three IR LEDs 242, or any other number of IR LEDs 242. In embodiments including more than one IR LED 242, the size of the third opening in the cover may be increased to accommodate the larger size of the IR LED PCB 244.

The IR LED 242 may be triggered to activate when a low level of ambient light is detected. When activated, IR light emitted from the IR LED 242 illuminates the camera 154's field of view. The camera 154, which may be configured to detect IR light, may then capture the IR light emitted by the IR LED 242 as it reflects off objects within the camera 154's field of view, so that the A/V recording and communication device 130 may clearly capture images at night (may be referred to as "night vision").

With reference to FIG. 9, the A/V recording and communication device 130 further comprises an IR cut filter 158. The IR cut filter 158 is a mechanical shutter that may be selectively positioned between the lens 238 and the image sensor of the camera 154. During daylight hours, or whenever there is a sufficient amount of ambient light, the IR cut filter 158 is positioned between the lens 238 and the image sensor to filter out IR light so that it does not distort the colors of images as the human eye sees them. During nighttime hours, or whenever there is little to no ambient light, the IR cut filter 158 is withdrawn from the space between the lens 238 and the image sensor, so that the camera 154 is sensitive to IR light ("night vision"). In some of the present embodiments, the camera 154 acts as a light detector for use in controlling the current state of the IR cut filter 158 and turning the IR LED 242 on and off. Using the camera 154 as a light detector is facilitated in some of the present embodiments by the fact that the A/V recording and communication device 130 is powered by a connection to AC mains, and the camera 154, therefore, is always powered on. In other embodiments, however, the A/V recording and communication device 130 may include a light sensor separate from the camera 154 for use in controlling the IR cut filter 158 and the IR LED 242.

With reference back to FIG. 6, the A/V recording and communication device 130 further comprises a reset button 170. The reset button 170 contacts a reset button actuator 246 (FIG. 8) coupled to the front PCB 226. When the reset button 170 is pressed, it may contact the reset button actuator 246, which may trigger the erasing of any data stored at the non-volatile memory 174 and/or at the memory 172 (FIG. 3), and/or may trigger a reboot of the processor 160. In some of the present embodiments, the reset button 170 may also be used in a process to activate the A/V recording and communication device 130, as described below.

Figures 11, 12:
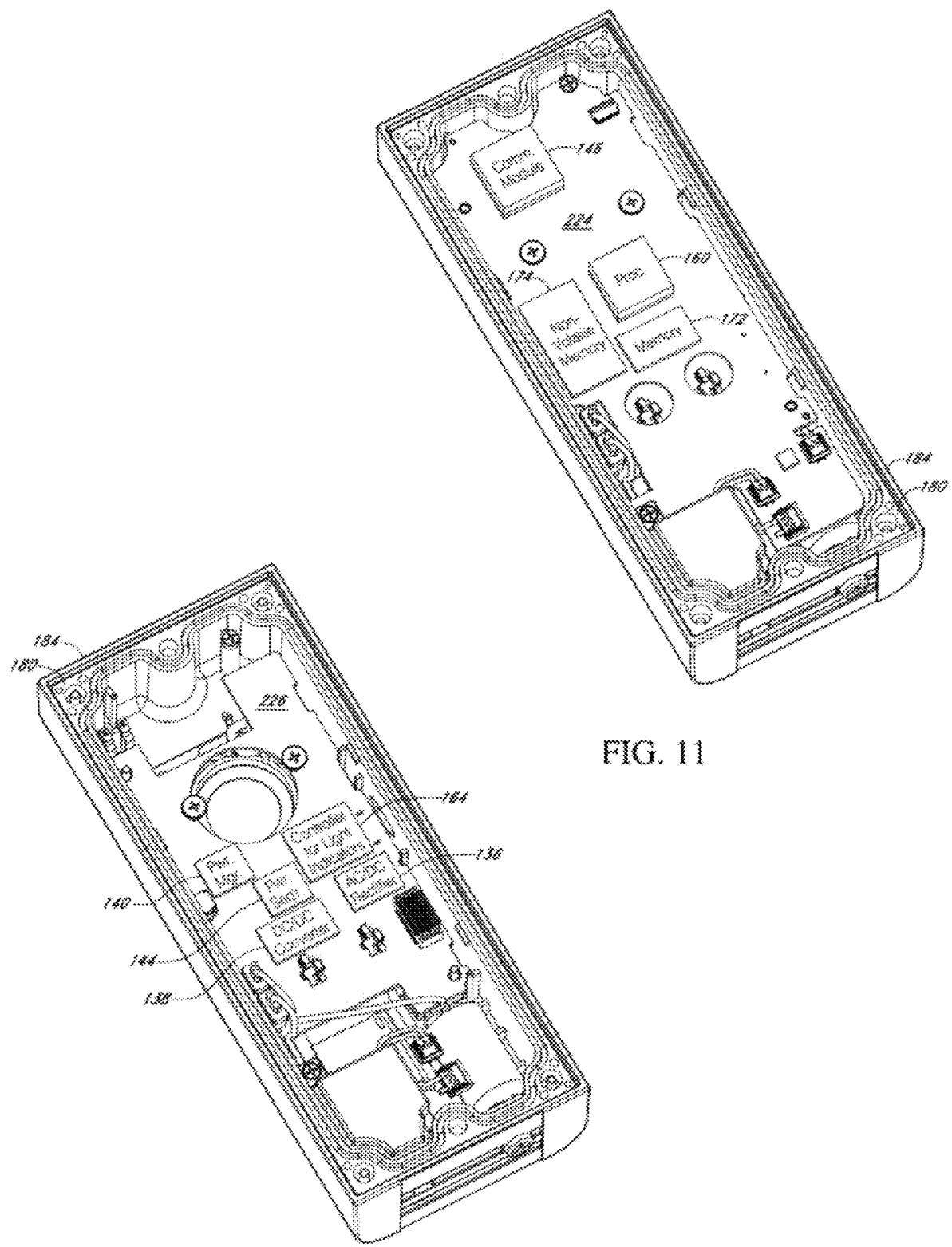
FIGS. 11-13 are rear perspective views of various internal components of the A/V recording and communication device of FIG. 4.
Figure 13:
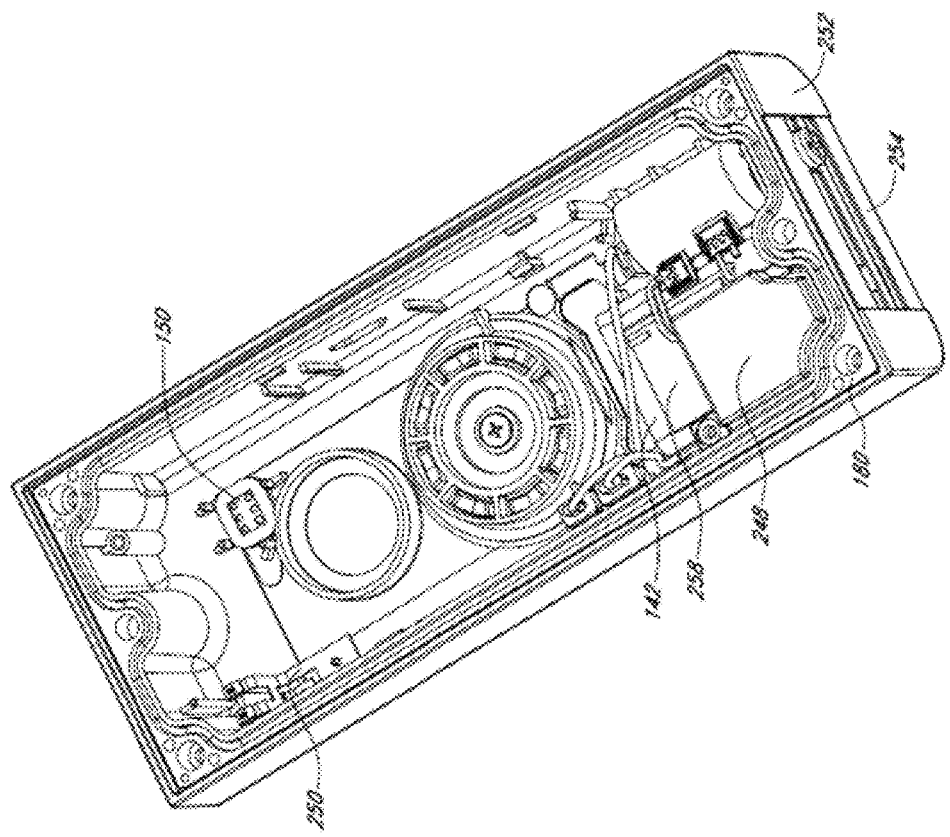

FIGS. 11-13 further illustrate internal components of the A/V recording and communication device 130. FIGS. 11-13 are rear perspective views of the device 130 with the back plate 182 and additional components removed. For example, in FIG. 11 the back plate 182 is removed, while in FIG. 12 the back plate 182 and the main PCB 224 are removed, and in FIG. 13 the back plate 182, the main PCB 224, and the front PCB 226 are removed. With reference to FIG. 11, several components are coupled to the rear surface of the main PCB 224, including the communication module 146, the processor 160, memory 172, and non-volatile memory 174. The functions of each of these components are described below. With reference to FIG. 12, several components are coupled to the rear surface of the front PCB 226, including the power manager 140, the power sequencer 144, the AC/DC rectifier 136, the DC/DC converter 138, and the controller 164 for the light indicators 162. The functions of each of these components are also described below. With reference to FIG. 13, several components are visible within the enclosure 180, including the microphone 150, a speaker chamber 248 (in which the speaker 152 is located), and an antenna 250 for the communication module 146. The functions of each of these components are also described below.

With reference to FIG. 7, the antenna 250 is coupled to the front surface of the main PCB 224 and operatively connected to the communication module 146, which is coupled to the rear surface of the main PCB 224 (FIG. 11). The microphone 150, which may also be coupled to the front surface of the main PCB 224, is located near the opening 218 (FIG. 4) in the upper portion 214 of the shield 192 so that sounds emanating from the area around the A/V recording and communication device 130 may pass through the opening 218 and be detected by the microphone 150. With reference to FIG. 13, the speaker chamber 248 is located near the bottom of the enclosure 180. The speaker chamber 248 comprises a hollow enclosure in which the speaker 152 is located. The hollow speaker chamber 248 amplifies the sounds made by the speaker 152 so that they may be better heard by a visitor in the area near the A/V recording and communication device 130. With reference to FIGS. 5 and 13, the lower surface 252 of the shell 184 and the lower surface (not shown) of the enclosure 180 may include an acoustical opening 254 through which the sounds made by the speaker 152 can pass so that they can be better heard by a visitor in the area near the A/V recording and communication device 130. In the illustrated embodiment, the acoustical opening 254 is shaped generally as a rectangle having a length extending substantially across the lower surface 252 of the shell 184 (and also the enclosure 180). The illustrated shape is, however, just one example. With reference to FIG. 5, the lower surface 252 of the shell 184 may further include an opening 256 for receiving a security screw (not shown). The security screw may extend through the opening 256 and into a similarly located opening in the enclosure 180 to secure the shell 184 to the enclosure 180. If the A/V recording and communication device 130 is mounted to a mounting bracket (not shown), the security screw may also maintain the device 130 on the mounting bracket.

With reference to FIG. 13, the A/V recording and communication device 130 may further include a battery heater 258. The present A/V recording and communication device 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater 258 helps to keep the rechargeable battery 142 warm in order to reduce or eliminate the foregoing negative performance issues. In the illustrated embodiment, the battery heater 258 comprises a substantially flat, thin sheet abutting a side surface of the rechargeable battery 142. The battery heater 258 may comprise, for example, an electrically resistive heating element that produces heat when electrical current is passed through it. The battery heater 258 may thus be operatively coupled to the power manager 140 and/or the power sequencer 144 (FIG. 12). In some of the present embodiments, the rechargeable battery 142 may include a thermally sensitive resistor ("thermistor," not shown) operatively connected to the processor 160 so that the battery 142's temperature can be monitored and the amount of power supplied to the battery heater 258 can be adaptively controlled to keep the rechargeable battery 142 within a desired temperature range.

As described above, the present embodiments advantageously limit the power consumption of the A/V recording and communication doorbell to an amount that is below the threshold necessary for causing the signaling device to sound (except when the front button of the doorbell is pressed). The present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some of the present embodiments, about 10-15 seconds of recorded footage can be continuously stored in the rolling buffer or sliding window. Also because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact, although in some alternative embodiments the doorbell may include one or more PIRs and/or other motion detectors, heat source detectors, etc. Also because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact, although in some alternative embodiments the doorbell may include a separate light detector.

Figure 16:
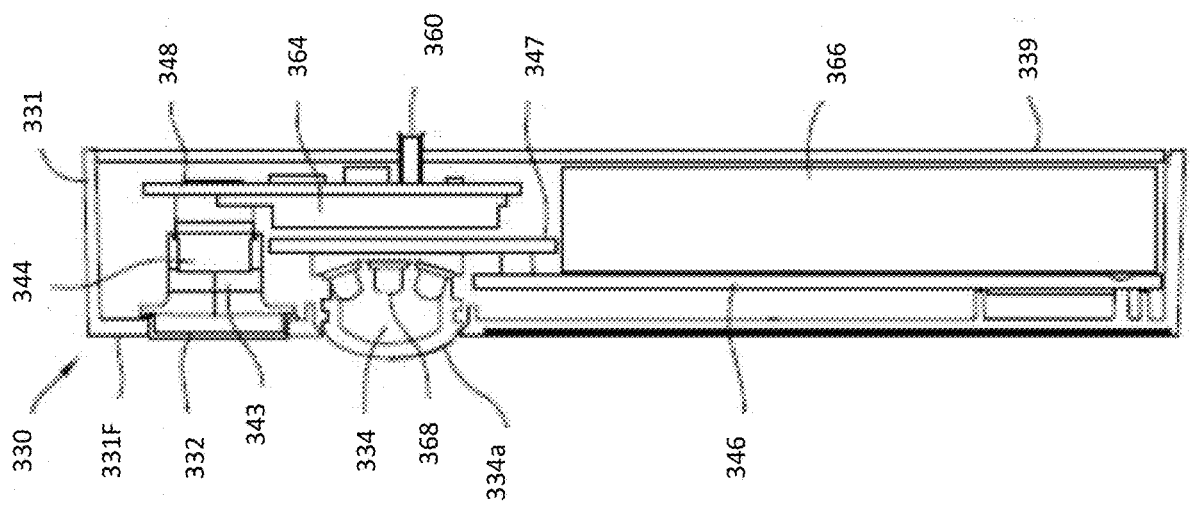
FIG. 16 is a right-side cross-sectional view of the A/V recording and communication device of FIG. 14.
Figure 15:
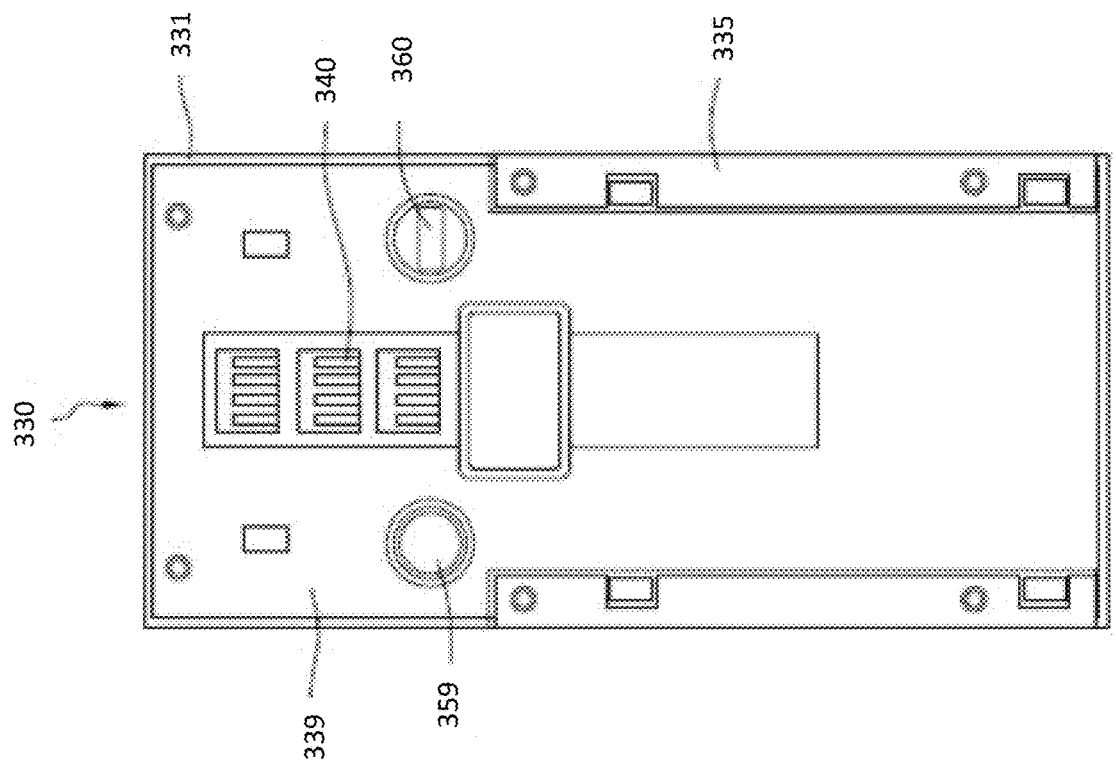
FIG. 15 is a rear view of the A/V recording and communication device of FIG. 14.
Figure 14:
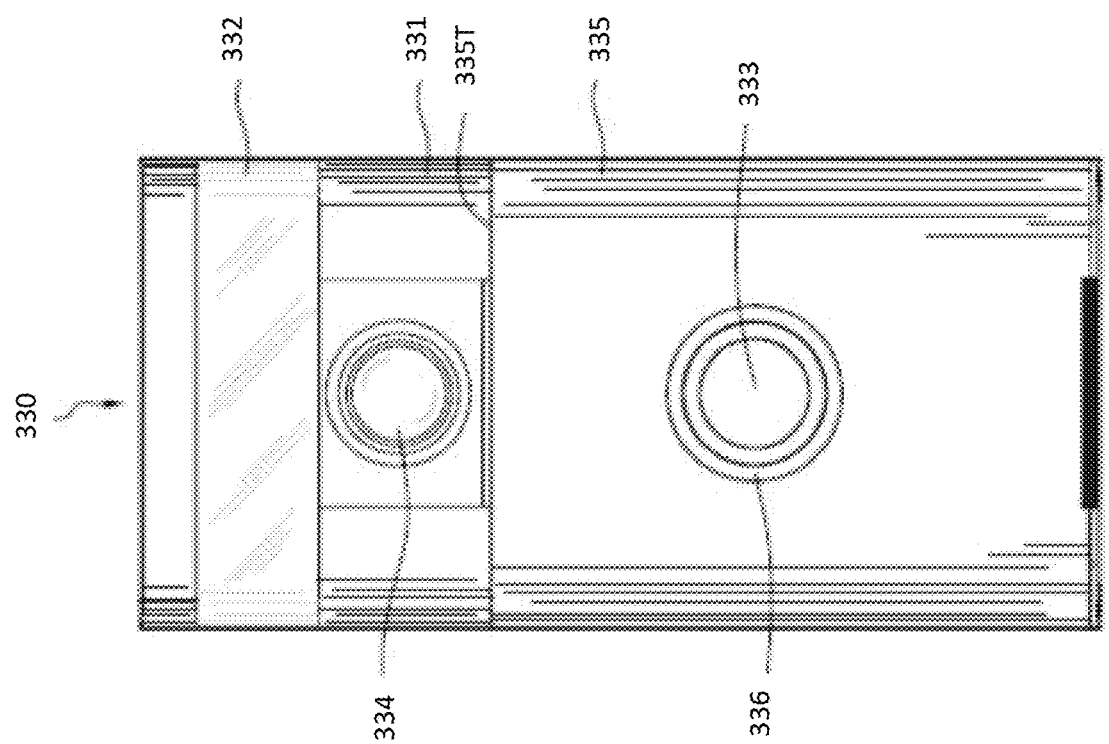
FIG. 14 is a front view of an A/V recording and communication device according to various aspects of the present disclosure.
Figure 17:
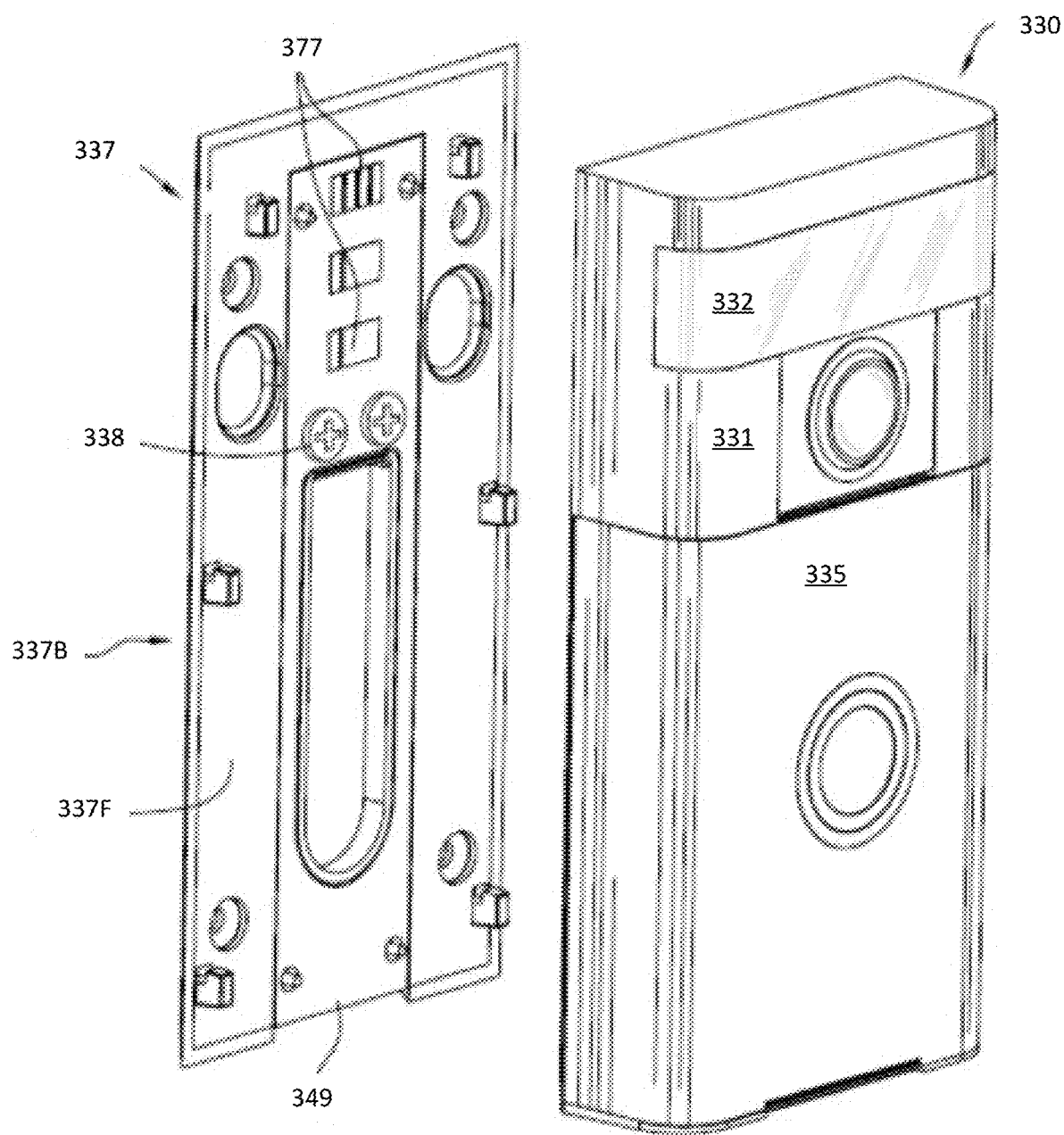
FIG. 17 is an exploded view of the A/V recording and communication device of FIG. 14 and a mounting bracket.

FIGS. 14-18 illustrate another embodiment of a wireless audio/video (A/V) communication doorbell 330 according to an aspect of present embodiments. FIG. 14 is a front view, FIG. 15 is a rear view, FIG. 16 is a right-side cross-sectional view, and FIG. 17 is an exploded view of the doorbell 330 and a mounting bracket 337. As described below, the doorbell 330 is configured to be connected to an external power source, such as household wiring, but is also configured to be powered by an on-board rechargeable battery instead of, or in addition to, the external power source.

The doorbell 330 includes a faceplate 335 mounted to a back plate 339 (FIG. 15). With reference to FIG. 16, the faceplate 335 has a substantially flat profile. The faceplate 335 may comprise any suitable material, including, without limitation, metals, such as brushed aluminum or stainless steel, metal alloys, or plastics. The faceplate 335 protects the internal contents of the doorbell 330 and serves as an exterior front surface of the doorbell 330.

With reference to FIG. 14, the faceplate 335 includes a button 333 and a light pipe 336. The button 333 and the light pipe 336 may have various profiles that may or may not match the profile of the faceplate 335. The light pipe 336 may comprise any suitable material, including, without limitation, transparent plastic, that is capable of allowing light produced within the doorbell 330 to pass through. The light may be produced by one or more light-emitting components, such as light-emitting diodes (LED's), contained within the doorbell 330, as further described below. The button 333 may make contact with a button actuator (not shown) located within the doorbell 330 when the button 333 is pressed by a visitor. When pressed, the button 333 may trigger one or more functions of the doorbell 330, as further described below.

With reference to FIGS. 3 and 4, the doorbell 330 further includes an enclosure 331 that engages the faceplate 335. In the illustrated embodiment, the enclosure 331 abuts an upper edge 335T (FIG. 14) of the faceplate 335, but in alternative embodiments one or more gaps between the enclosure 331 and the faceplate 335 may facilitate the passage of sound and/or light through the doorbell 330. The enclosure 331 may comprise any suitable material, but in some of the present embodiments the material of the enclosure 331 preferably permits infrared light to pass through from inside the doorbell 330 to the environment and vice versa. The doorbell 330 further includes a lens 332. In some of the present embodiments, the lens may comprise a Fresnel lens, which may be patterned to deflect incoming light into one or more infrared sensors located within the doorbell 330. The doorbell 330 further includes a camera 334, which captures video data when activated, as described below.

FIG. 15 is a rear view of the doorbell 330, according to an aspect of the present embodiments. As illustrated, the enclosure 331 may extend from the front of the doorbell 330 around to the back thereof and may fit snugly around a lip of the back plate 339. The back plate 339 may comprise any suitable material, including, without limitation, metals, such as brushed aluminum or stainless steel, metal alloys, or plastics. The back plate 339 protects the internal contents of the doorbell 330 and serves as an exterior rear surface of the doorbell 330. The faceplate 335 may extend from the front of the doorbell 330 and at least partially wrap around the back plate 339, thereby allowing a coupled connection between the faceplate 335 and the back plate 339. The back plate 339 may have indentations in its structure to facilitate the coupling.

With further reference to FIG. 15, spring contacts 340 may provide power to the doorbell 330 when mated with other conductive contacts connected to a power source. The spring contacts 340 may comprise any suitable conductive material, including, without limitation, copper, and may be capable of deflecting when contacted by an inward force, for example the insertion of a mating element. The doorbell 330 further comprises a connector 360, such as a micro-USB or other connector, whereby power and/or data may be supplied to and from the components within the doorbell 330. A reset button 359 may be located on the back plate 339, and may make contact with a button actuator (not shown) located within the doorbell 330 when the reset button 359 is pressed. When the reset button 359 is pressed, it may trigger one or more functions, as described below.

FIG. 16 is a right side cross-sectional view of the doorbell 330 without the mounting bracket 337. In the illustrated embodiment, the lens 332 is substantially coplanar with the front surface 331F of the enclosure 331. In alternative embodiments, the lens 332 may be recessed within the enclosure 331 or may protrude outward from the enclosure 331. The camera 334 is coupled to a camera printed circuit board (PCB) 347, and a lens 334a of the camera 334 protrudes through an opening in the enclosure 331. The camera lens 334a may be a lens capable of focusing light into the camera 334 so that clear images may be taken.

The camera PCB 347 may be secured within the doorbell with any suitable fasteners, such as screws, or interference connections, adhesives, etc. The camera PCB 347 comprises various components that enable the functionality of the camera 334 of the doorbell 330, as described below. Infrared light-emitting components, such as infrared LED's 368, are coupled to the camera PCB 347 and may be triggered to activate when a light sensor detects a low level of ambient light. When activated, the infrared LED's 368 may emit infrared light through the enclosure 331 and/or the camera 334 out into the ambient environment. The camera 334, which may be configured to detect infrared light, may then capture the light emitted by the infrared LED's 368 as it reflects off objects within the camera's 334 field of view, so that the doorbell 330 may clearly capture images at night (may be referred to as "night vision").

With continued reference to FIG. 16, the doorbell 330 further comprises a front PCB 346, which in the illustrated embodiment resides in a lower portion of the doorbell 330 adjacent a battery 366. The front PCB 346 may be secured within the doorbell 330 with any suitable fasteners, such as screws, or interference connections, adhesives, etc. The front PCB 346 comprises various components that enable the functionality of the audio and light components, as further described below. The battery 366 may provide power to the doorbell 330 components while receiving power from the spring contacts 340, thereby engaging in a trickle-charge method of power consumption and supply. Alternatively, the doorbell 330 may draw power directly from the spring contacts 340 while relying on the battery 366 only when the spring contacts 340 are not providing the power necessary for all functions. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360.

With continued reference to FIG. 16, the doorbell 330 further comprises a power PCB 348, which in the illustrated embodiment resides behind the camera PCB 347. The power PCB 348 may be secured within the doorbell 330 with any suitable fasteners, such as screws, or interference connections, adhesives, etc. The power PCB 348 comprises various components that enable the functionality of the power and device-control components, as further described below.

With continued reference to FIG. 16, the doorbell 330 further comprises a communication module 364 coupled to the power PCB 348. The communication module 364 facilitates communication with client devices in one or more remote locations, as further described below. The connector 360 may protrude outward from the power PCB 348 and extend through a hole in the back plate 339. The doorbell 330 further comprises passive infrared (PIR) sensors 344, which are secured on or within a PIR sensor holder 343, and the assembly resides behind the lens 332. In some of the present embodiments, the doorbell 330 may comprise three PIR sensors 344, as further described below, but in other embodiments any number of PIR sensors 344 may be provided. In some of the present embodiments, one or more of the PIR sensors 344 may comprise a pyroelectric infrared sensor. The PIR sensor holder 343 may be secured to the doorbell 330 with any suitable fasteners, such as screws, or interference connections, adhesives, etc. The PIR sensors 344 may be any type of sensor capable of detecting and communicating the presence of a heat source within their field of view. Further, alternative embodiments may comprise one or more motion sensors either in place of or in addition to the PIR sensors 344. The motion sensors may be configured to detect motion using any methodology, such as a methodology that does not rely on detecting the presence of a heat source within a field of view.

FIG. 17 is an exploded view of the doorbell 330 and the mounting bracket 337 according to an aspect of the present embodiments. The mounting bracket 337 is configured to be mounted to a mounting surface (not shown) of a structure, such as a home or an office. FIG. 17 shows the front side 337F of the mounting bracket 337. The mounting bracket 337 is configured to be mounted to the mounting surface such that the back side 337B thereof faces the mounting surface. In certain embodiments, the mounting bracket 337 may be mounted to surfaces of various composition, including, without limitation, wood, concrete, stucco, brick, vinyl siding, aluminum siding, etc., with any suitable fasteners, such as screws, or interference connections, adhesives, etc. The doorbell 330 may be coupled to the mounting bracket 337 with any suitable fasteners, such as screws, or interference connections, adhesives, etc.

With continued reference to FIG. 17, the illustrated embodiment of the mounting bracket 337 includes the terminal screws 338. The terminal screws 338 are configured to receive electrical wires adjacent the mounting surface of the structure upon which the mounting bracket 337 is mounted, so that the doorbell 330 may receive electrical power from the structure's electrical system. The terminal screws 338 are electrically connected to electrical contacts 377 of the mounting bracket. If power is supplied to the terminal screws 338, then the electrical contacts 377 also receive power through the terminal screws 338. The electrical contacts 377 may comprise any suitable conductive material, including, without limitation, copper, and may protrude slightly from the face of the mounting bracket 337 so that they may mate with the spring contacts 340 located on the back plate 339.

Figure 18:
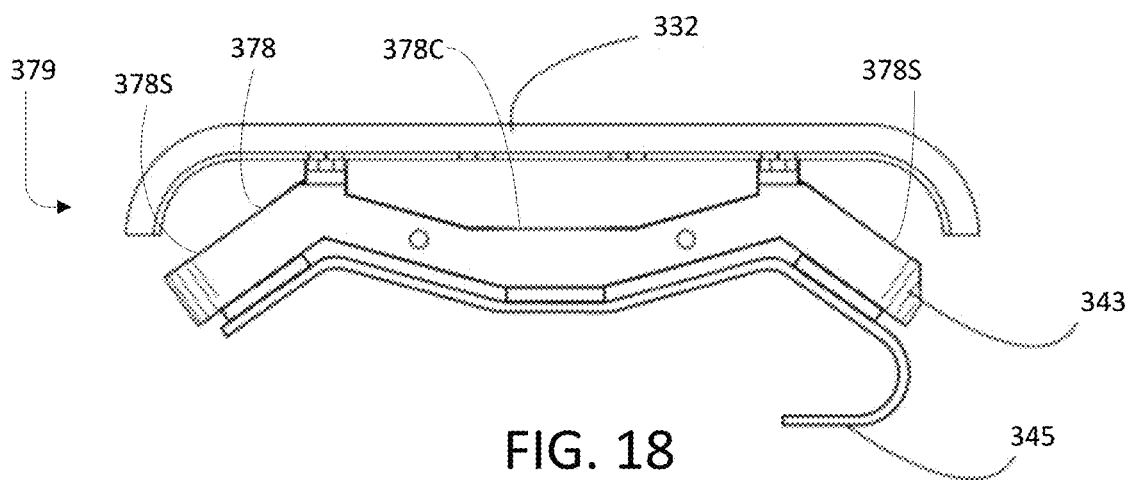
FIG. 18 is a top view of a passive infrared sensor assembly according to various aspects of the present disclosure.

With continued reference to FIG. 17, the mounting bracket 337 further comprises a bracket PCB 349. The bracket PCB 349 is situated outside the doorbell 330, and is therefore configured for various sensors that measure ambient conditions, such as an accelerometer 350, a barometer 351, a humidity sensor 352, and a temperature sensor 353 (FIG. 18). The functions of these components are discussed in more detail below. The bracket PCB 349 may be secured to the mounting bracket 337 with any suitable fasteners, such as screws, or interference connections, adhesives, etc.

With continued reference to FIG. 17, the faceplate 335 may extend from the bottom of the doorbell 330 up to just below the camera 334, and connect to the back plate 339 as described above. The lens 332 may extend and curl partially around the side of the doorbell 330. The enclosure 331 may extend and curl around the side and top of the doorbell 330, and may be coupled to the back plate 339 as described above. The camera 334 may protrude slightly through the enclosure 331, thereby giving it a wider field of view. The mounting bracket 337 may couple with the back plate 339 such that they contact each other at various points in a common plane of contact, thereby creating an assembly including the doorbell 330 and the mounting bracket 337. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 19:
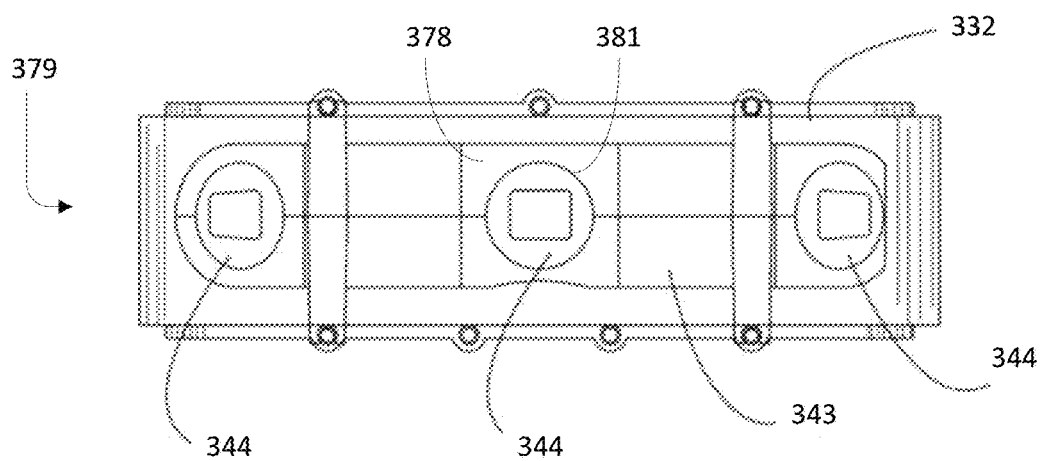
FIG. 19 is a front view of the passive infrared sensor assembly of FIG. 18.

FIG. 18 is a top view and FIG. 19 is a front view of a passive infrared sensor assembly 379 including the lens 332, the passive infrared sensor holder 343, the passive infrared sensors 344, and a flexible power circuit 345. The passive infrared sensor holder 343 is configured to mount the passive infrared sensors 344 facing out through the lens 332 at varying angles, thereby allowing the passive infrared sensor 344 field of view to be expanded to 180° or more and also broken up into various zones, as further described below. The passive infrared sensor holder 343 may include one or more faces 378, including a center face 378C and two side faces 378S to either side of the center face 378C. With reference to FIG. 19, each of the faces 378 defines an opening 381 within or on which the passive infrared sensors 344 may be mounted. In alternative embodiments, the faces 378 may not include openings 381, but may instead comprise solid flat faces upon which the passive infrared sensors 344 may be mounted. Generally, the faces 378 may be any physical structure capable of housing and/or securing the passive infrared sensors 344 in place.

With reference to FIG. 18, the passive infrared sensor holder 343 may be secured to the rear face of the lens 332. The flexible power circuit 345 may be any material or component capable of delivering power and/or data to and from the passive infrared sensors 344, and may be contoured to conform to the non-linear shape of the passive infrared sensor holder 343. The flexible power circuit 345 may connect to, draw power from, and/or transmit data to and from, the power printed circuit board 348.

Figure 20:
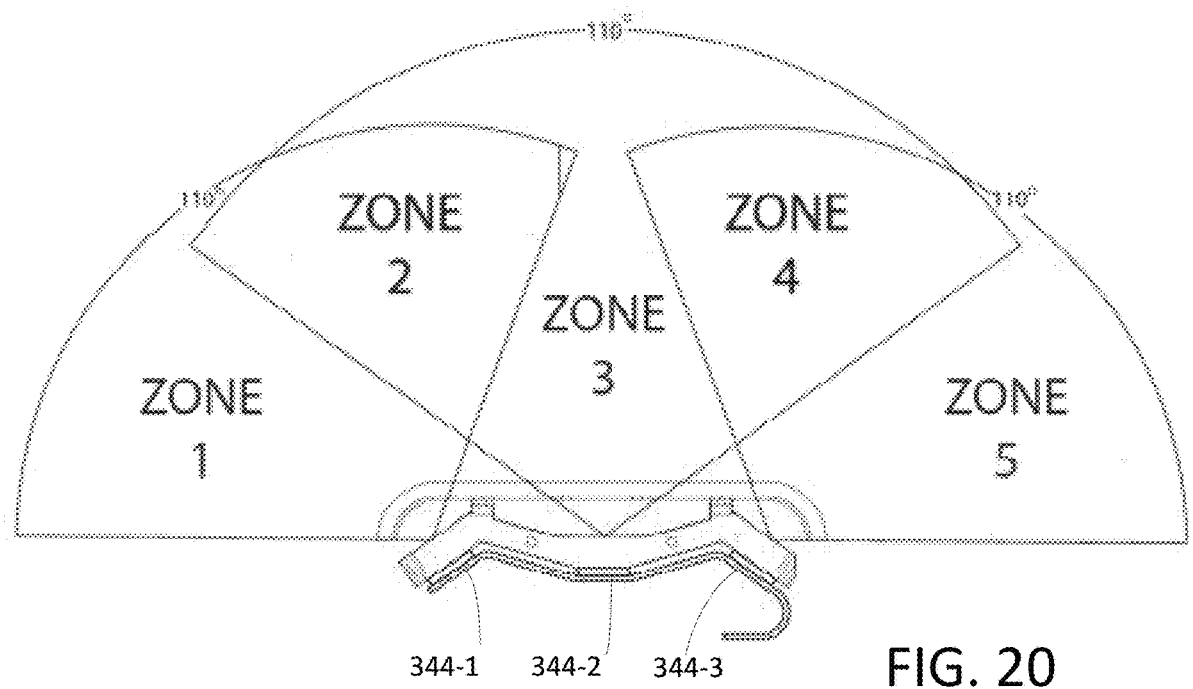
FIG. 20 is a top view of the passive infrared sensor assembly of FIG. 18, illustrating the fields of view of the passive infrared sensors according to various aspects of the present disclosure.

FIG. 20 is a top view of the passive infrared sensor assembly 379 illustrating the fields of view of the passive infrared sensors 344. In the illustrated embodiment, the side faces 378S of the passive infrared sensor holder 343 are angled at 55° facing outward from the center face 378C, and each passive infrared sensor 344 has a field of view of 110°. However, these angles may be increased or decreased as desired. Zone 1 is the area that is visible only to a first one of the passive infrared sensors 344-1. Zone 2 is the area that is visible only to the first passive infrared sensor 344-1 and a second one of the passive infrared sensors 344-2. Zone 3 is the area that is visible only to the second passive infrared sensor 344-2. Zone 4 is the area that is visible only to the second passive infrared sensor 144-2 and a third one of the passive infrared sensors 344-3. Zone 5 is the area that is visible only to the third passive infrared sensor 344-3. In some of the present embodiments, the A/V recording and communication device 130 may be capable of determining the direction that an object is moving based upon which zones are triggered in a time sequence.

In some examples, the zones may be used as an activation mode. In some examples, a security system may not be configured or capable of entering a package protection mode whereby a parcel bounding box is used to monitor a parcel delivered to a property, as described in FIGS. 51-53, below. In systems in which a package protection mode is not available, but monitoring is desired, the activation mode may be used, wherein the sensitivity of a particular area is increased. In some examples, the activation mode may include determining in which zone a package is delivered. In the example of the use of the passive infrared sensor assembly 379, motion detected in a particular zone may be used to determine that a parcel has been delivered. For example, a third party, such as a parcel or package delivery service, may send a notice that a parcel has been delivered to a property at a particular time. The passive infrared sensor assembly 379, or another component, may receive information from the passive infrared sensor assembly 379 that motion was detected in a particular zone, such as Zone 3, at the same time the parcel was delivered. In response to the notification, the sensitivity to motion may be increased to the second passive infrared sensor 344-2. Thereafter, motion within the Zone 3, even slight motion, may be better detected due to the increased sensitivity of the second passive infrared sensor 344-2. If a camera, such as the camera 154 of FIG. 3, has zones associated with the data received from the camera, similar or same zone sensitivity technologies may be used. Thus, while a security system or other system may not have a package protection mode, changing the sensitivity of zones may be used as an alternate or supplementary technology.

Figure 21:
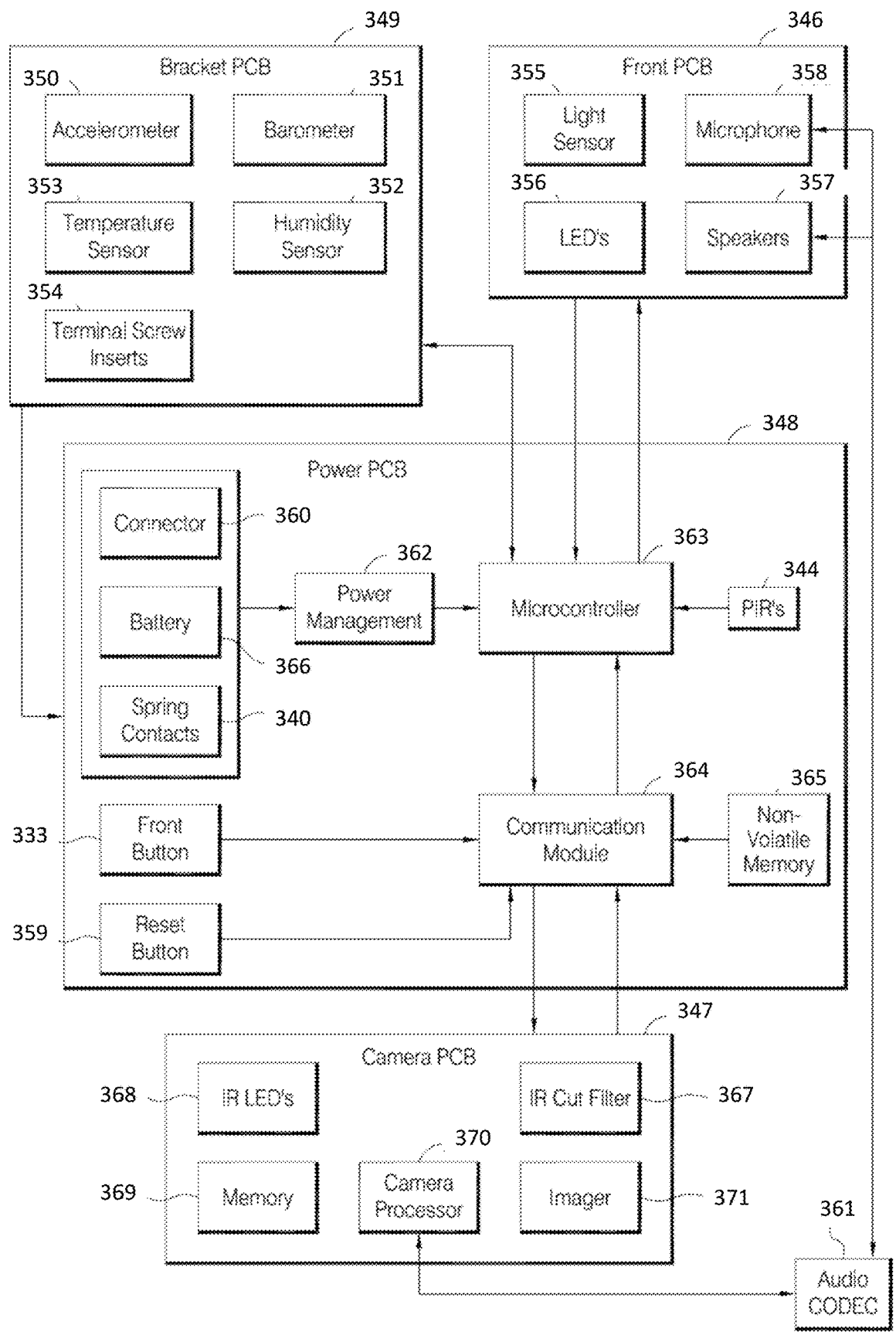
FIG. 21 is a functional block diagram of the components of the A/V recording and communication device of FIG. 14.

FIG. 21 is a functional block diagram of the components within or in communication with the doorbell 330, according to an aspect of the present embodiments. As described above, the bracket PCB 349 may comprise an accelerometer 350, a barometer 351, a humidity sensor 352, and a temperature sensor 353. The accelerometer 350 may be one or more sensors capable of sensing motion and/or acceleration. The barometer 351 may be one or more sensors capable of determining the atmospheric pressure of the surrounding environment in which the bracket PCB 349 may be located. The humidity sensor 352 may be one or more sensors capable of determining the amount of moisture present in the atmospheric environment in which the bracket PCB 349 may be located. The temperature sensor 353 may be one or more sensors capable of determining the temperature of the ambient environment in which the bracket PCB 349 may be located. As described above, the bracket PCB 349 may be located outside the housing of the doorbell 330 so as to reduce interference from heat, pressure, moisture, and/or other stimuli generated by the internal components of the doorbell 330.

With further reference to FIG. 21, the bracket PCB 349 may further comprise terminal screw inserts 354, which may be configured to receive the terminal screws 338 and transmit power to the electrical contacts 377 on the mounting bracket 337 (FIG. 17). The bracket PCB 349 may be electrically and/or mechanically coupled to the power PCB 348 through the terminal screws 338, the terminal screw inserts 354, the spring contacts 340, and the electrical contacts 377. The terminal screws 338 may receive electrical wires located at the surface to which the doorbell 330 is mounted, such as the wall of a building, so that the doorbell may receive electrical power from the building's electrical system. Upon the terminal screws 338 being secured within the terminal screw inserts 354, power may be transferred to the bracket PCB 349, and to all of the components associated therewith, including the electrical contacts 377. The electrical contacts 377 may transfer electrical power to the power PCB 348 by mating with the spring contacts 340.

With further reference to FIG. 21, the front PCB 346 may comprise a light sensor 355, one or more light-emitting components, such as LED's 356, one or more speakers 357, and a microphone 358. The light sensor 355 may be one or more sensors capable of detecting the level of ambient light of the surrounding environment in which the doorbell 330 may be located. LED's 356 may be one or more light-emitting diodes capable of producing visible light when supplied with power. The speakers 357 may be any electromechanical device capable of producing sound in response to an electrical signal input. The microphone 358 may be an acoustic-to-electric transducer or sensor capable of converting sound waves into an electrical signal. When activated, the LED's 356 may illuminate the light pipe 336 (FIG. 14). The front PCB 346 and all components thereof may be electrically coupled to the power PCB 348, thereby allowing data and/or power to be transferred to and from the power PCB 348 and the front PCB 346.

The speakers 357 and the microphone 358 may be coupled to the camera processor 370 through an audio CODEC 361. For example, the transfer of digital audio from the user's client device 114 and the speakers 357 and the microphone 358 may be compressed and decompressed using the audio CODEC 361, coupled to the camera processor 370. Once compressed by audio CODEC 361, digital audio data may be sent through the communication module 364 to the network 112, routed by one or more servers 118, and delivered to the user's client device 114. When the user speaks, after being transferred through the network 112, digital audio data is decompressed by audio CODEC 361 and emitted to the visitor via the speakers 357.

With further reference to FIG. 21, the power PCB 348 may comprise a power management module 362, a microcontroller 363 (may also be referred to as "processor," "CPU," or "controller"), the communication module 364, and power PCB non-volatile memory 365. In certain embodiments, the power management module 362 may comprise an integrated circuit capable of arbitrating between multiple voltage rails, thereby selecting the source of power for the doorbell 330. The battery 366, the spring contacts 340, and/or the connector 360 may each provide power to the power management module 362. The power management module 362 may have separate power rails dedicated to the battery 366, the spring contacts 340, and the connector 360. In one aspect of the present disclosure, the power management module 362 may continuously draw power from the battery 366 to power the doorbell 330, while at the same time routing power from the spring contacts 340 and/or the connector 360 to the battery 366, thereby allowing the battery 366 to maintain a substantially constant level of charge. Alternatively, the power management module 362 may continuously draw power from the spring contacts 340 and/or the connector 360 to power the doorbell 330, while only drawing from the battery 366 when the power from the spring contacts 340 and/or the connector 360 is low or insufficient. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360. The power management module 362 may also serve as a conduit for data between the connector 360 and the microcontroller 363.

With further reference to FIG. 21, in certain embodiments the microcontroller 363 may comprise an integrated circuit including a processor core, memory, and programmable input/output peripherals. The microcontroller 363 may receive input signals, such as data and/or power, from the PIR sensors 344, the bracket PCB 349, the power management module 362, the light sensor 355, the microphone 358, and/or the communication module 364, and may perform various functions as further described below. When the microcontroller 363 is triggered by the PIR sensors 344, the microcontroller 363 may be triggered to perform one or more functions. When the light sensor 355 detects a low level of ambient light, the light sensor 355 may trigger the microcontroller 363 to enable "night vision," as further described below. The microcontroller 363 may also act as a conduit for data communicated between various components and the communication module 364.

With further reference to FIG. 21, the communication module 364 may comprise an integrated circuit including a processor core, memory, and programmable input/output peripherals. The communication module 364 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 364 may receive inputs, such as power and/or data, from the camera PCB 347, the microcontroller 363, the button 333, the reset button 359, and/or the power PCB non-volatile memory 365. When the button 333 is pressed, the communication module 364 may be triggered to perform one or more functions. When the reset button 359 is pressed, the communication module 364 may be triggered to erase any data stored at the power PCB non-volatile memory 365 and/or at the camera PCB memory 369. The communication module 364 may also act as a conduit for data communicated between various components and the microcontroller 363. The power PCB non-volatile memory 365 may comprise flash memory configured to store and/or transmit data. For example, in certain embodiments the power PCB non-volatile memory 365 may comprise serial peripheral interface (SPI) flash memory.

With further reference to FIG. 21, the camera PCB 347 may comprise components that facilitate the operation of the camera 334. For example, an imager 371 may comprise a video recording sensor and/or a camera chip. In one aspect of the present disclosure, the imager 371 may comprise a complementary metal-oxide semiconductor (CMOS) array, and may be capable of recording high definition (e.g., 1080p or better) video files. A camera processor 370 may comprise an encoding and compression chip. In some of the present embodiments, the camera processor 370 may comprise a bridge processor. The camera processor 370 may process video recorded by the imager 371 and audio recorded by the microphone 358, and may transform this data into a form suitable for wireless transfer by the communication module 364 to a network. The camera PCB memory 369 may comprise volatile memory that may be used when data is being buffered or encoded by the camera processor 370. For example, in certain embodiments the camera PCB memory 369 may comprise synchronous dynamic random-access memory (SD RAM). IR LED's 368 may comprise light-emitting diodes capable of radiating infrared light. IR cut filter 367 may comprise a system that, when triggered, configures the imager 371 to see primarily infrared light as opposed to visible light. When the light sensor 355 detects a low level of ambient light (which may comprise a level that impedes the performance of the imager 371 in the visible spectrum), the IR LED's 368 may shine infrared light through the doorbell 330 enclosure out to the environment, and the IR cut filter 367 may enable the imager 371 to see this infrared light as it is reflected or refracted off of objects within the field of view of the doorbell. This process may provide the doorbell 330 with the "night vision" function mentioned above.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the A/V recording and communication doorbell 130, but without the front button 148, the button actuator 228, and/or the light pipe 232.

The present disclosure also provides numerous examples of methods and systems including A/V recording and communication devices that are powered by a connection to AC mains, but the present embodiments are equally applicable for A/V recording and communication devices that are battery powered. For example, the present embodiments may include an A/V recording and communication device such as those described in US Patent Application Publication Nos. 2015/0022620 (application Ser. No. 14/499,828) and 2015/0022618 (application Ser. No. 14/334,922), both of which are incorporated herein by reference in their entireties as if fully set forth.

Figure 22:
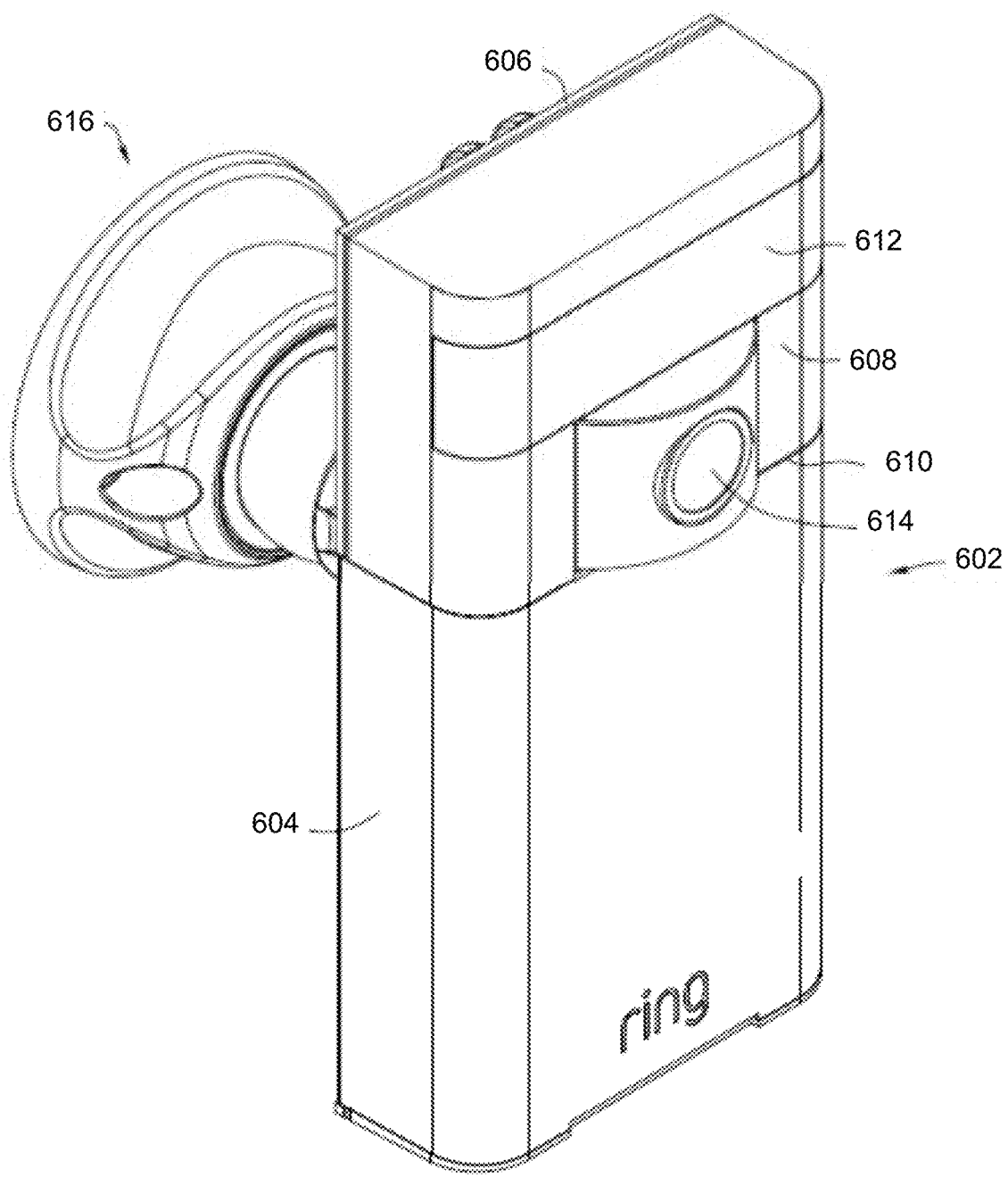
FIG. 22 is an upper front perspective view of an example A/V recording and communication security camera according to various aspects of the present disclosure.
Figure 23:
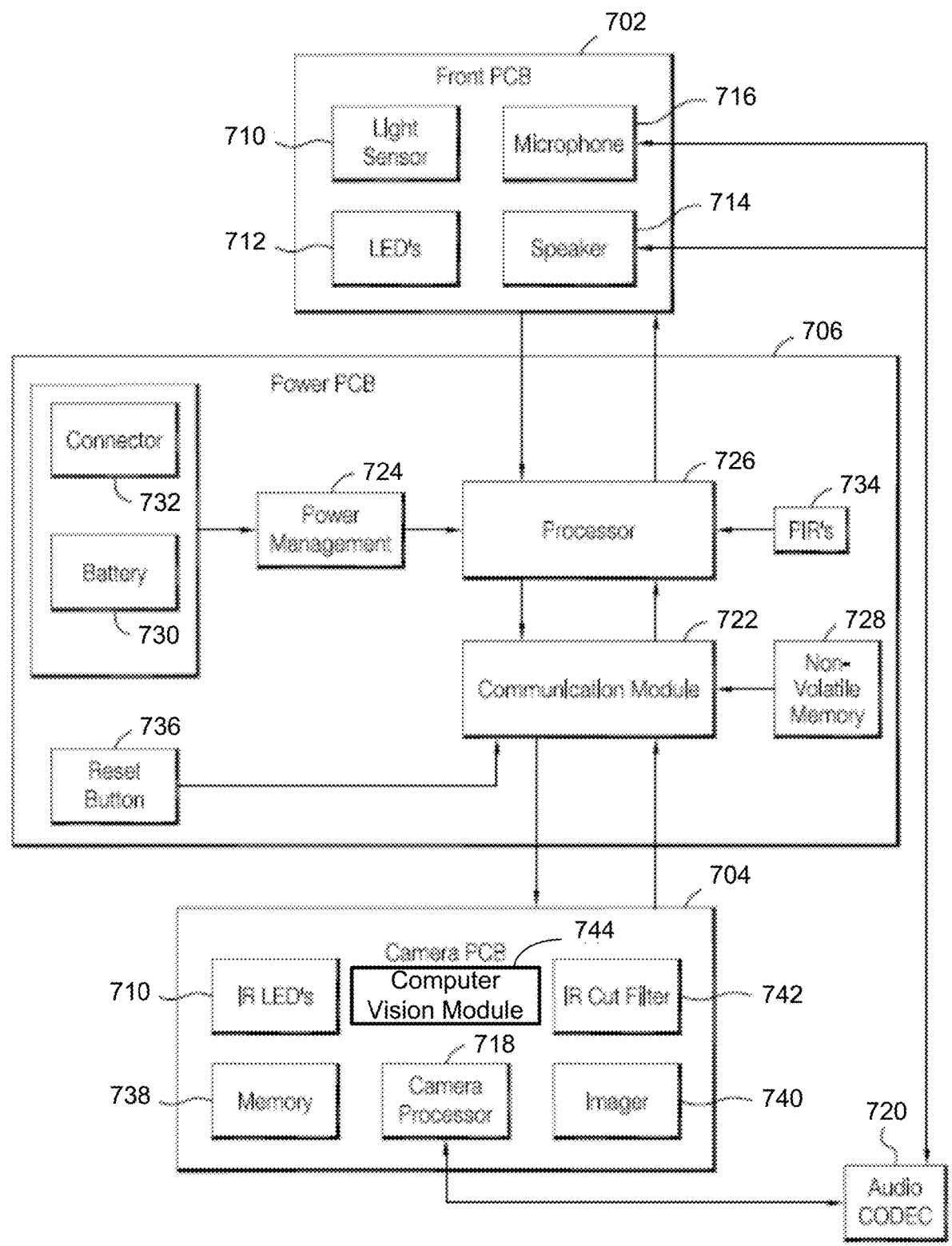
FIG. 23 is a functional block diagram of example components of the A/V recording and communication security camera of FIG. 6.

FIGS. 22 and 23 illustrate an example A/V recording and communication security camera according to various aspects of the present embodiments. With reference to FIG. 22, the security camera 602, similar to the A/V recording and communication device 130, includes a faceplate 604 that is mounted to a back plate 606 and an enclosure 608 that engages the faceplate 604. Collectively, the faceplate 604, the back plate 606, and the enclosure 608 form a housing that contains and protects the inner components of the security camera 602. However, unlike the video A/V recording and communication device 130, the security camera 602 does not include any front button 148 for activating the doorbell. The faceplate 604 may comprise any suitable material, including, without limitation, metals, such as brushed aluminum or stainless steel, metal alloys, or plastics. The faceplate 604 protects the internal contents of the security camera 602 and serves as an exterior front surface of the security camera 602.

With continued reference to FIG. 22, the enclosure 608 engages the faceplate 604 and abuts an upper edge 610 of the faceplate 604. As discussed above, one or more gaps between the enclosure 608 and the faceplate 604 may facilitate the passage of sound and/or light through the security camera 602. The enclosure 608 may comprise any suitable material, but in some embodiments the material of the enclosure 608 preferably permits infrared light to pass through from inside the security camera 602 to the environment and vice versa. The security camera 602 further includes a lens 612. Again, similar to the video doorbell 302, in some embodiments, the lens may comprise a Fresnel lens, which may be patterned to deflect incoming light into one or more infrared sensors located within the security camera 602. The security camera 602 further includes a camera 614, which captures video data when activated, as described above and below.

With further reference to FIG. 6, the enclosure 608 may extend from the front of the security camera 602 around to the back thereof and may fit snugly around a lip (not shown) of the back plate 606. The back plate 606 may comprise any suitable material, including, without limitation, metals, such as brushed aluminum or stainless steel, metal alloys, or plastics. The back plate 606 protects the internal contents of the security camera 602 and serves as an exterior rear surface of the security camera 602. The faceplate 604 may extend from the front of the security camera 602 and at least partially wrap around the back plate 606, thereby allowing a coupled connection between the faceplate 604 and the back plate 606. The back plate 606 may have indentations (not shown) in its structure to facilitate the coupling.

With continued reference to FIG. 22, the security camera 602 further comprises a mounting apparatus 616. The mounting apparatus 616 facilitates mounting the security camera 602 to a surface, such as an interior or exterior wall of a building, such as a home or office. The faceplate 604 may extend from the bottom of the security camera 602 up to just below the camera 614, and connect to the back plate 606 as described above. The lens 612 may extend and curl partially around the side of the security camera 602. The enclosure 608 may extend and curl around the side and top of the security camera 602, and may be coupled to the back plate 606 as described above. The camera 614 may protrude from the enclosure 608, thereby giving it a wider field of view. The mounting apparatus 616 may couple with the back plate 606, thereby creating an assembly including the security camera 602 and the mounting apparatus 616. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

FIG. 23 is a functional block diagram of the components of the A/V recording and communication security camera of FIG. 22. With reference to FIG. 23, the interior of the wireless security camera 602 comprises a plurality of printed circuit boards, including a front PCB 702, a camera PCB 704, and a power PCB 706, each of which is described below. The camera PCB 704 comprises various components that enable the functionality of the camera 614 of the security camera 602, as described below. Infrared light-emitting components, such as infrared LED's 708, are coupled to the camera PCB 704 and may be triggered to activate when a light sensor detects a low level of ambient light. When activated, the infrared LED's 708 may emit infrared light through the enclosure 608 and/or the camera 614 out into the ambient environment. The camera 614, which may be configured to detect infrared light, may then capture the light emitted by the infrared LED's 708 as it reflects off objects within the camera's 614 field of view, so that the security camera 602 may clearly capture images at night (may be referred to as "night vision").

The front PCB 702 comprises various components that enable the functionality of the audio and light components, including a light sensor 710, LED's 712, one or more speakers 714, and a microphone 716. The light sensor 710 may be one or more sensors capable of detecting the level of ambient light of the surrounding environment in which the security camera 602 may be located. The speakers 714 may be any electromechanical device capable of producing sound in response to an electrical signal input. The microphone 716 may be an acoustic-to-electric transducer or sensor capable of converting sound waves into an electrical signal. The front PCB 702 and all components thereof may be electrically coupled to the power PCB 706, thereby allowing data and/or power to be transferred to and from the power PCB 706 and the front PCB 702.

The speakers 714 and the microphone 716 may be coupled to a camera processor 718 on the camera PCB 704 through an audio CODEC 720. For example, the transfer of digital audio from the user's client device 114 and the speakers 714 and the microphone 716 may be compressed and decompressed using the audio CODEC 720, coupled to the camera processor 718. Once compressed by audio CODEC 720, digital audio data may be sent through the communication module 722 to the network 112, routed by one or more servers 118, and delivered to the user's client device 114. When the user speaks, after being transferred through the network 112, digital audio data is decompressed by audio CODEC 720 and emitted to the visitor via the speakers 714.

With continued reference to FIG. 23, the power PCB 706 comprises various components that enable the functionality of the power and device-control components, including a power management module 724, a processor 726 a communication module 722, and power PCB non-volatile memory 728. In certain embodiments, the power management module 724 may comprise an integrated circuit capable of arbitrating between multiple voltage rails, thereby selecting the source of power for the security camera 602. The battery 730 and/or the connector 732 may each provide power to the power management module 532. The power management module 724 (which may be similar to connector 360) may have separate power rails dedicated to the battery 730 and the connector 732. The power management module 724 may control charging of the battery 730 when the connector 732 is connected to an external source of power, and may also serve as a conduit for data between the connector 732 and the processor 726.

With further reference to FIG. 23, in certain embodiments the processor 726 may comprise an integrated circuit including a processor core, memory, and programmable input/output peripherals. The processor 726 may receive input signals, such as data and/or power, from the PIR sensors 734, the power management module 724, the light sensor 710, the microphone 716, and/or the communication module 722, and may perform various functions as further described below. When the processor 726 is triggered by the PIR sensors 734, the processor 726 may be triggered to perform one or more functions, such as initiating recording of video images via the camera 614. When the light sensor 710 detects a low level of ambient light, the light sensor 710 may trigger the processor 726 to enable "night vision," as further described below. The processor 726 may also act as a conduit for data communicated between various components and the communication module 722.

With further reference to FIG. 23, the security camera 602 further comprises a communication module 722 coupled to the power PCB 706. The communication module 722 facilitates communication with devices in one or more remote locations, as further described below. The communication module 722 may comprise an integrated circuit including a processor core, memory, and programmable input/output peripherals. The communication module 722 may also be configured to transmit data wirelessly to a remote network device, such as the user's client device 114, the remote storage device 116, and/or the remote server 118, and may include one or more transceivers (not shown). The wireless communication may comprise one or more wireless networks, such as, without limitation, Wi-Fi, cellular, Bluetooth, and/or satellite networks. The communication module 722 may receive inputs, such as power and/or data, from the camera PCB 704, the processor 726, the reset button 736 (which may be similar to the reset button 359), and/or the power PCB non-volatile memory 728. When the reset button 736 is pressed, the communication module 722 may be triggered to erase any data stored at the power PCB non-volatile memory 728 and/or at the camera PCB memory 738. The communication module 722 may also act as a conduit for data communicated between various components and the processor 726. The power PCB non-volatile memory 728 may comprise flash memory configured to store and/or transmit data. For example, in certain embodiments the power PCB non-volatile memory 728 may comprise serial peripheral interface (SPI) flash memory.

With continued reference to FIG. 23, the power PCB 706 further comprises the connector 732 described above and a battery 730. The connector 732 may protrude outward from the power PCB 706 and extend through a hole in the back plate 339. The battery 730, which may be a rechargeable battery, may provide power to the components of the security camera 602.

With continued reference to FIG. 23, the power PCB 706 further comprises passive infrared (PIR) sensors 734, which may be secured on or within a PIR sensor holder (not shown) that resides behind the lens 612 (FIG. 22). The PIR sensors 734 may be any type of sensor capable of detecting and communicating the presence of a heat source within their field of view. Further, alternative embodiments may comprise one or more motion sensors either in place of or in addition to the PIR sensors 734. The motion sensors may be configured to detect motion using any methodology, such as a methodology that does not rely on detecting the presence of a heat source within a field of view.

With further reference to FIG. 23, the camera PCB 704 may comprise components that facilitate the operation of the camera 614. For example, an imager 740 may comprise a video recording sensor and/or a camera chip. In one aspect of the present disclosure, the imager 740 may comprise a complementary metal-oxide semiconductor (CMOS) array, and may be capable of recording high definition (e.g., 722$p$ or better) video files. A camera processor 718 may comprise an encoding and compression chip. In some embodiments, the camera processor 718 may comprise a bridge processor. The camera processor 718 may process video recorded by the imager 740 and audio recorded by the microphone 716, and may transform this data into a form suitable for wireless transfer by the communication module 722 to a network. The camera PCB memory 738 may comprise volatile memory that may be used when data is being buffered or encoded by the camera processor 718. For example, in certain embodiments the camera PCB memory 738 may comprise synchronous dynamic random-access memory (SD RAM). IR LED's 708 may comprise light-emitting diodes capable of radiating infrared light. IR cut filter 742 may comprise a system that, when triggered, configures the imager 740 to see primarily infrared light as opposed to visible light. When the light sensor 710 detects a low level of ambient light (which may comprise a level that impedes the performance of the imager 740 in the visible spectrum), the IR LED's 708 may shine infrared light through the security camera 602 enclosure out to the environment, and the IR cut filter 742 may enable the imager 740 to see this infrared light as it is reflected or refracted off of objects within the field of view of the doorbell. This process may provide the security camera 602 with the "night vision" function mentioned above.

The camera PCB 704 further includes a computer vision module 744. Functionality of the computer vision module 744 is described in greater detail below.

Figure 24:
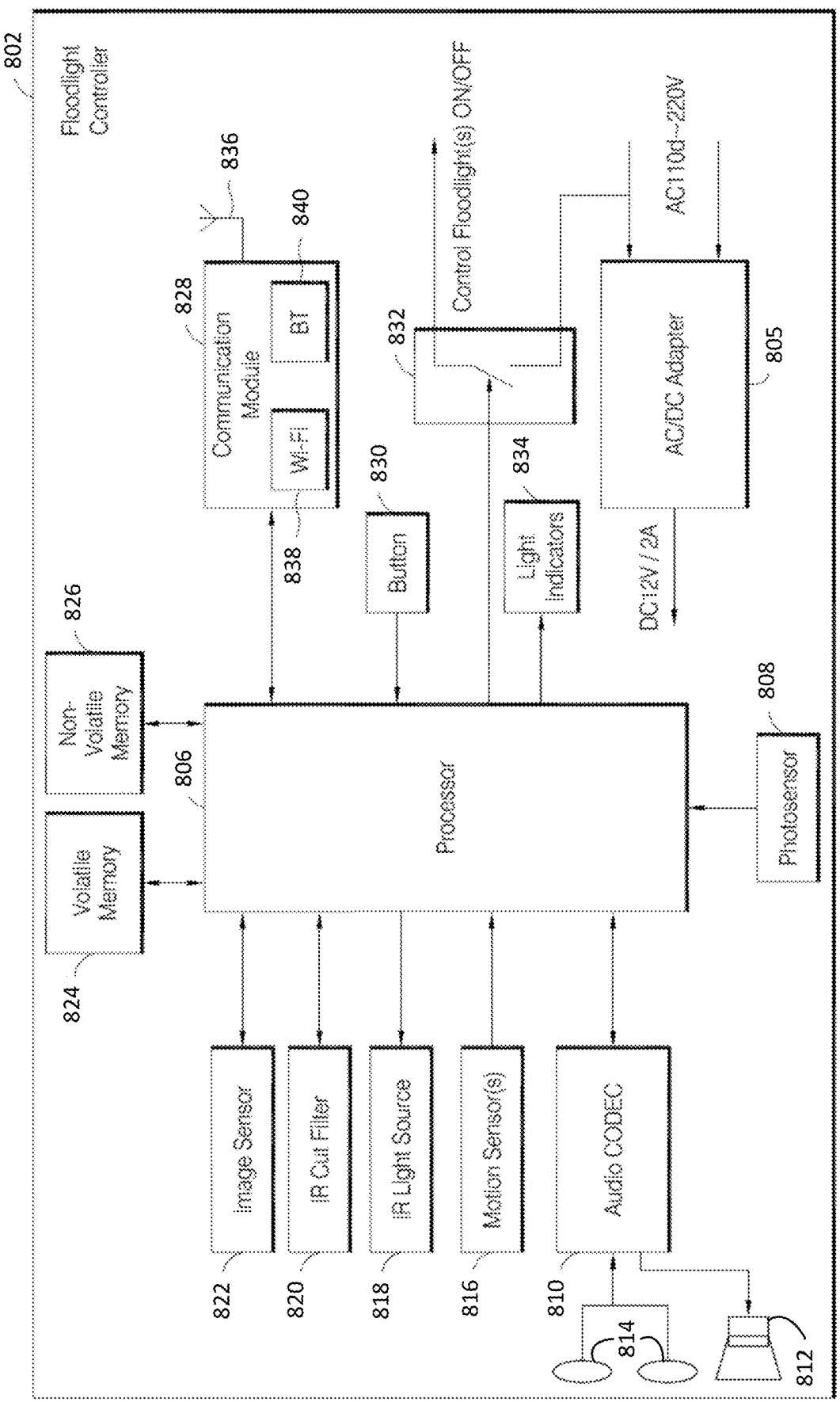
FIG. 24 is a functional block diagram of example components of a floodlight controller with A/V recording and communication features according to various aspects of the present disclosure.
Figure 25:
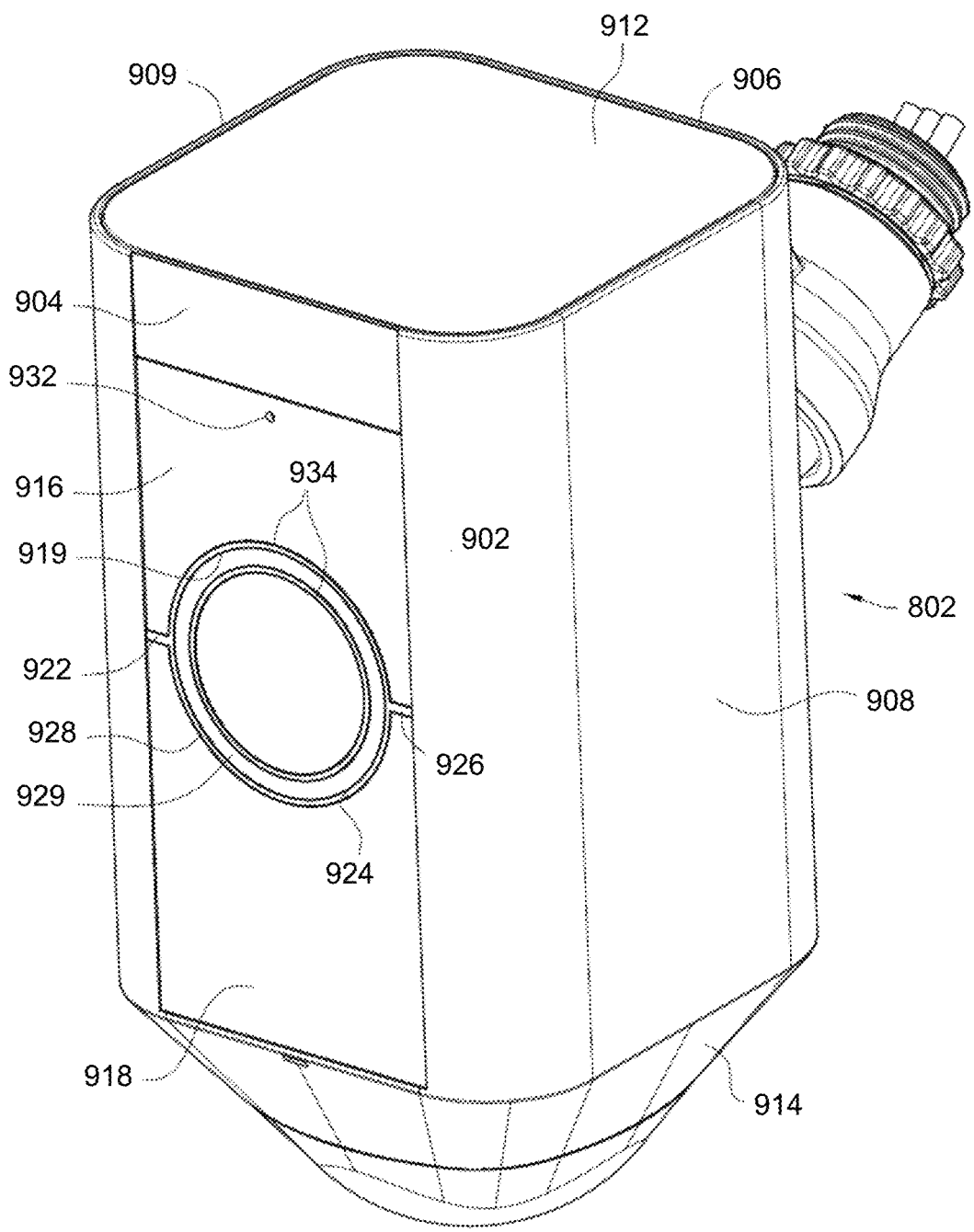
FIG. 25 is an upper front perspective view of an example floodlight controller with A/V recording and communication features according to various aspects of the present disclosure.
Figure 28:
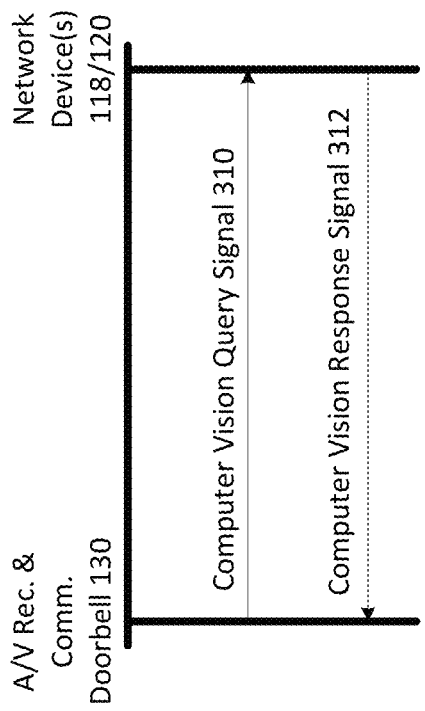
FIG. 28 is a sequence diagram illustrating an embodiment of a process for deterring parcel theft with an A/V recording and communication device according to various aspects of the present disclosure.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication floodlight controllers instead of, or in addition to, one or more A/V recording and communication doorbells. FIGS. 24-26 illustrate an example A/V recording and communication floodlight controller according to various aspects of the present embodiments. FIG. 24 is a functional block diagram illustrating various components of the floodlight controller 802 and their relationships to one another. For example, the floodlight controller 802 comprises an AC/DC adapter 805. The floodlight controller 802 is thus configured to be connected to a source of external AC (alternating-current) power, such as a household AC power supply (may also be referred to as AC mains). The AC power may have a voltage in the range of 110-220 VAC, for example. The incoming AC power may be received by the AC/DC adapter 805, which may convert the incoming AC power to DC (direct-current) and may step down the voltage from 110-220 VAC to a lower output voltage of about 12 VDC and an output current of about 2 A, for example. In various embodiments, the output of the AC/DC adapter 805 may be in a range of from about 9 V to about 15 V, for example, and in a range of from about 0.5 A to about 5 A, for example. These voltages and currents are only examples provided for illustration and are not limiting in any way.

With further reference to FIG. 24, the floodlight controller 802 further comprises other components, including a processor 806 (may also be referred to as a controller), a photosensor 808, an audio CODEC (coder-decoder) 810, at least one speaker 812 (which may be similar to speaker 108), the at least one microphone 814 (which may be similar to microphone 104), at least one motion sensor 816, an infrared (IR) light source 818, an IR cut filter 820, an image sensor 822 (may be a component of the camera 102, and may be referred to interchangeably as the camera 102), volatile memory 824, non-volatile memory 826, a communication module 828, a button 830, a switch 832 for controlling one or more floodlights, and a plurality of light indicators 834. Each of these components is described in detail below.

With further reference to FIG. 24, the processor 806 may perform data processing and various other functions, as described below. The processor 806 may comprise an integrated circuit including a processor core, the volatile memory 824, the non-volatile memory 826, and/or programmable input/output peripherals (not shown). The volatile memory 824 may comprise, for example, DDR3 SDRAM (double data rate type three synchronous dynamic random-access memory). The non-volatile memory 826 may comprise, for example, NAND flash memory. In the embodiment illustrated in FIG. 24, the volatile memory 824 and the non-volatile memory 826 are illustrated outside the box representing the processor 806. The embodiment illustrated in FIG. 24 is, however, merely an example, and in some embodiments the volatile memory 824 and/or the non-volatile memory 826 may be physically incorporated with the processor 806, such as on the same chip. The volatile memory 824 and/or the non-volatile memory 826, regardless of their physical location, may be shared by one or more other components (in addition to the processor 806) of the present floodlight controller 802.

With further reference to FIG. 24, the image sensor 822 (camera 102), the IR light source 818, the IR cut filter 820, and the photosensor 808 are all operatively coupled to the processor 806. As described in detail below, the IR light source 818 and the IR cut filter 820 facilitate "night vision" functionality of the image sensor 822. For example, the photosensor 808 is configured to detect the level of ambient light about the floodlight controller 802. The processor 806 uses the input from the photosensor 808 to control the states of the IR light source 818 and the IR cut filter 820 to activate and deactivate night vision, as described below. In some embodiments, the image sensor 822 may comprise a video recording sensor or a camera chip. In some embodiments, the IR light source 818 may comprise one or more IR light-emitting diodes (LEDs).

With further reference to FIG. 24, the at least one speaker 812 and the at least one microphone 814 are operatively coupled to the audio CODEC 810, which is operatively coupled to the processor 806. The transfer of digital audio between the user and a visitor (or intruder) may be compressed and decompressed using the audio CODEC 810, as described below. The motion sensor(s) 816 is also operatively coupled to the processor 806. The motion sensor(s) 816 may comprise, for example, passive infrared (PIR) sensors, or any other type of sensor capable of detecting and communicating to the processor 806 the presence and/or motion of an object within its field of view. When the processor 806 is triggered by the motion sensor(s) 816, the processor 806 may perform one or more functions, as described below.

With further reference to FIG. 24, the communication module 828 is operatively coupled to the processor 806. The communication module 828, which includes at least one antenna 836, is configured to handle communication links between the floodlight controller 802 and other, external devices or receivers, and to route incoming/outgoing data appropriately. For example, inbound data from the antenna(s) 836 may be routed through the communication module 828 before being directed to the processor 806, and outbound data from the processor 806 may be routed through the communication module 828 before being directed to the antenna(s) 836. The communication module 828 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, Bluetooth, or any other protocol and/or technology. In the illustrated embodiment, the communication module 828 includes a Wi-Fi chip 838 and a Bluetooth chip 840, but these components are merely examples and are not limiting. Further, while the Wi-Fi chip 838 and the Bluetooth chip 840 are illustrated within the box representing the communication module 828, the embodiment illustrated in FIG. 24 is merely an example, and in some embodiments the Wi-Fi chip 838 and/or the Bluetooth chip 840 are not necessarily physically incorporated with the communication module 828.

In some embodiments, the communication module 828 may further comprise a wireless repeater (not shown, may also be referred to as a wireless range extender). The wireless repeater is configured to receive a wireless signal from a wireless router (or another network device) in the user's network 110 and rebroadcast the signal. Wireless devices that are not within the broadcast range of the wireless router, or that only weakly receive the wireless signal from the wireless router, may receive the rebroadcast signal from the wireless repeater of the communication module 828, and may thus connect to the user's network 110 through the floodlight controller 802. In some embodiments, the wireless repeater may include one or more transceiver modules (not shown) capable of transmitting and receiving data, and using, for example, one or more protocols and/or technologies, such as Wi-Fi (IEEE 802.11), WiMAX (IEEE 802.16), or any other protocol and/or technology.

With further reference to FIG. 24, when a visitor (or intruder) who is present in the area about the floodlight controller 802 speaks, audio from the visitor (or intruder) is received by the microphones 814 and compressed by the audio CODEC 810. Digital audio data is then sent through the communication module 828 to the network 112 (FIG. 1) via the user's network 110, routed by the server 118 and/or the API 120, and delivered to the user's client device 114. When the user speaks, after being transferred through the network 112, the user's network 110, and the communication module 828, the digital audio data from the user is decompressed by the audio CODEC 810 and emitted to the visitor through the speaker 812, which may be driven by a speaker driver (not shown).

With further reference to FIG. 24, the button 830 is operatively coupled to the processor 806. The button 830 may have one or more functions, such as changing an operating mode of the floodlight controller 802 and/or triggering a reset of the floodlight controller 802. For example, when the button 830 is pressed and released, it may cause the communication module 828 of the floodlight controller 802 to enter access point (AP) mode, which may facilitate connecting the floodlight controller 802 to the user's network 110. Alternatively, or in addition, when the button 830 is pressed and held down for at least a threshold period of time, it may trigger the erasing of any data stored at the volatile memory 824 and/or at the non-volatile memory 826, and/or may trigger a reboot of the processor 806.

With reference to FIG. 25, the floodlight controller 802 comprises a housing 902 for containing and protecting the interior components of the floodlight controller 802. The housing 902 includes a front wall 904, a rear wall 906, opposing side walls 908, 909, an upper wall 912, and a tapered lower portion 914. The front wall 904 includes a central opening that receives an upper shield 916 and a lower grill 918. In the illustrated embodiment, front surfaces of the upper shield 916 and the lower grill 918 are substantially flush with a front surface of the front wall 904, but in alternative embodiments these surfaces may not be flush with one another. The upper shield 916 is substantially rectangular, and includes a semicircular indentation 919 along its lower edge 922. The lower grill 918 is substantially rectangular, and includes a semicircular indentation 924 along its upper edge 926. Together, the semicircular indentations 919, 924 in the upper shield 916 and the lower grill 918 form a circular opening 928 that accommodates a light pipe 929. A cover extends across and closes an outer open end of the light pipe 929. The upper shield 916, the lower grill 918, the light pipe 929, and the cover are all described in further detail below. The camera (not shown) is located in the circular opening 928 formed by the upper shield 916 and the lower grill 918, behind the cover, and is surrounded by the light pipe 929.

With reference to FIG. 24, the floodlight controller 802 further comprises the microphones 814. In the illustrated embodiment, a first one of the microphones 814 is located along the front of the floodlight controller 802 behind the upper shield 916 (FIG. 25) and a second one of the microphones 814 is located along the left side of the floodlight controller 802 behind the left-side wall 909 (FIG. 25) of the housing 902. Including two microphones that are spaced from one another and located on different sides of the floodlight controller 802 provides the illustrated embodiment of the floodlight controller 802 with advantageous noise cancellation and/or echo cancellation for clearer audio. The illustrated embodiment is, however, just one example and is not limiting. Alternative embodiments may only include one microphone 814, or include two microphones 814 in different locations than as illustrated in FIG. 24.

With reference to FIG. 25, the upper shield 916 may include a first microphone opening 932 located in front of the first microphone 814 to facilitate the passage of sound through the upper shield 916 so that sounds from the area about the floodlight controller 802 may reach the first microphone 814. The left-side wall 909 of the housing 902 may include a second microphone opening (not shown) located in front of the second microphone 814 that facilitates the passage of sound through the left-side wall 909 of the housing 902 so that sounds from the area about the floodlight controller 802 may reach the second microphone 814.

With further reference to FIG. 25, the floodlight controller 802 may further comprise a light barrier 934 surrounding inner and outer surfaces of the light pipe 929. The light barrier 934 may comprise a substantially opaque material that prevents the light generated by the light indicators 834 from bleeding into the interior spaces of the floodlight controller 802 around the light pipe 929. The light barrier 934 may comprise a resilient material, such as a plastic, which may also advantageously provide moisture sealing at the junctures between the light pipe 929 and the upper shield 916 and the lower grill 918. Portions of the light barrier 934 may also extend between the junctures between the upper shield 916 and the lower grill 918.

With further reference to FIG. 25, the floodlight controller 802 further comprises connecting hardware configured for connecting the floodlight controller 802 to a floodlight device 1002 (FIG. 26) and a power source (not shown). The floodlight controller 802 further comprises a plurality of wires for connecting the floodlight controller 802 to the power supply and to the floodlight(s) 1004 (FIG. 26) of the floodlight device 1002 (for enabling the floodlight controller 802 to turn the floodlight(s) 1004 on and off). In the illustrated embodiment, three wires may be used, but the illustrated embodiment is merely one example and is not limiting. In alternative embodiments, any number of wires may be provided.

As discussed above, parcel theft is an increasingly common problem. Parcel carriers frequently leave parcels near the front door of a home when no one answers the door at the time of delivery. These parcels are vulnerable to theft, as they are often clearly visible from the street. This problem has only gotten worse with the proliferation of online commerce, and is particularly common around major holidays when many consumers do their holiday shopping online. It would be advantageous, therefore, if the functionality of A/V recording and communication devices could be leveraged to deter parcel theft and/or to identify and apprehend parcel thieves. It would also be advantageous if the functionality of A/V recording and communication devices could be enhanced in one or more ways to deter parcel theft and/or to identify and apprehend parcel thieves. The present embodiments provide these advantages and enhancements, as described below.

For example, some of the present embodiments deter parcel theft by receiving, by a processor of a client device, image data including a parcel recorded by a camera of an A/V recording and communication device in a field of view of the camera, displaying the image data on the display of the client device, receiving, by the processor based on the image data displayed on the display of the client device, an input including a first selection of a parcel boundary for monitoring the parcel within the parcel boundary, and a second selection of a monitoring action to be executed in response to the parcel being moved from within the parcel boundary, and generating and transmitting, by the processor based on the input, parcel monitoring rules to the A/V recording and communication device.

As another example, some of the present embodiments may deter parcel theft by receiving, by a processor of an A/V recording and communication device, from a client device associated with the A/V recording and communication device, parcel monitoring rules for monitoring a parcel in a field of view of the motion detector, the parcel monitoring rules including a parcel boundary for monitoring the parcel within the parcel boundary, and a monitoring action to be executed in response to the parcel being moved from within the parcel boundary, updating, by the processor based on the parcel monitoring rules, the motion detection rules to create updated motion detection rules, detecting, by the motion detector based on the updated motion detection rules, that the parcel has been moved from within the parcel boundary; and executing, by the processor in response to the detecting that the parcel has been moved from within the parcel boundary and based on the updated motion detection rules, the monitoring action.

Some of the present embodiments may comprise computer vision for one or more aspects, such as object recognition. Computer vision includes methods for acquiring, processing, analyzing, and understanding images and, in general, high-dimensional data from the real world in order to produce numerical or symbolic information, e.g. in the form of decisions. Computer vision seeks to duplicate the abilities of human vision by electronically perceiving and understanding an image. Understanding in this context means the transformation of visual images (the input of the retina) into descriptions of the world that may interface with other thought processes and elicit appropriate action. This image understanding may be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data may take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes may be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that may be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g. ASCII). 2D Code Reading—Reading of 2D codes such as data matrix and QR codes. Facial Recognition. Shape Recognition Technology (SRT)—Differentiating human beings (e.g. head and shoulder patterns) from objects.

Typical functions and components (e.g. hardware) found in many computer vision systems are described in the following paragraphs. The present embodiments may include at least some of these aspects. For example, with reference to FIG. 3, embodiments of the present A/V recording and communication device 130 may include a computer vision module 163. The computer vision module 163 may include any of the components (e.g. hardware) and/or functionality described herein with respect to computer vision, including, without limitation, one or more cameras, sensors, and/or processors. In some of the present embodiments, the microphone 150, the camera 154, and/or the imaging processor 240 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but may also be related to various physical measures, such as depth, absorption or reflectance of sonic or electromagnetic waves, or nuclear magnetic resonance.

Pre-processing—Before a computer vision method may be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information may be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed point arithmetic for image processing.

Figure 27:
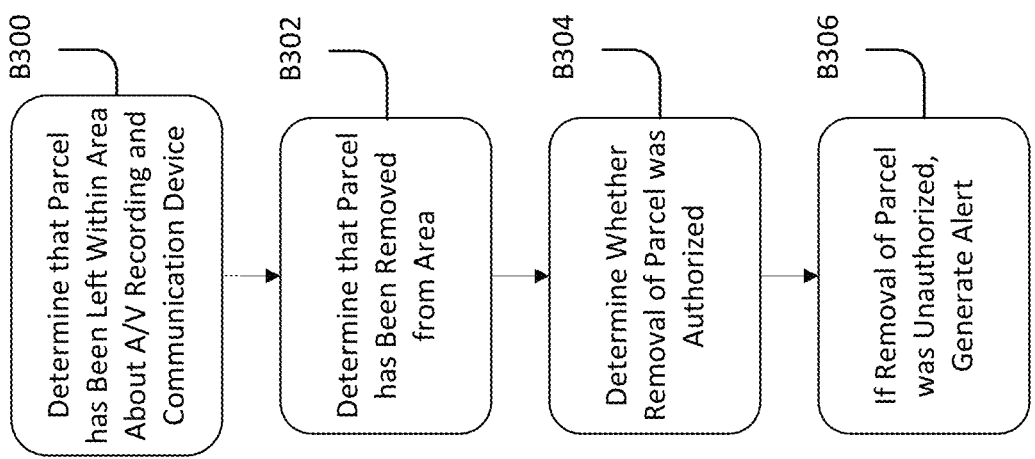
FIG. 27 is a flowchart illustrating an embodiment of a process for deterring parcel theft with an A/V recording and communication device according to various aspects of the present disclosure.

FIG. 27 illustrates an example embodiment of a process for deterring parcel theft with an A/V recording and communication device according to various aspects of the present disclosure. At block B300, the process determines that a parcel has been left within an area about an A/V recording and communication device, such as the A/V recording and communication device 130 described above, or the A/V recording and communication device 1102 described below, for example. The present embodiments encompass any method of determining that a parcel has been left within an area about an A/V recording and communication device, and several examples are provided below. The present embodiments are not, however, limited to these examples, which are provided for illustration only. Any of the examples described below, as well as any of the present embodiments, may include one or more aspects of computer vision.

In one example embodiment, determining that the parcel has been left within the area about the A/V recording and communication device 130 may comprise comparing video frames recorded by the camera 154 of the A/V recording and communication device 130, e.g. using computer vision. For example, before a parcel is left within the area about the A/V recording and communication device 130, the field of view of the camera 154 may remain largely static. Different objects may occasionally (or frequently) pass through the camera's field of view, such as people, animals, cars, etc., but these objects generally do not remain within the camera's field of view for very long (on the order of seconds) and, if they stop within the camera's field of view, they typically begin moving again soon after stopping. By contrast, when a parcel is left within the camera's field of view, it typically remains within the camera's field of view for a significant amount of time (on the order of minutes or hours), and the parcel typically remains motionless throughout the time that it remains within the camera's field of view (at least until someone picks it up and carries it away). Thus, comparing video frames from a time before a parcel is left within the camera's field of view with video frames from a time after the parcel is left within the camera's field of view may enable a reliable determination to be made as to whether an object that is present within the camera's field of view is a parcel or not.

The present embodiments contemplate numerous methodologies for determining whether an object that is present within the camera's field of view is a parcel or not. Any or all of these methodologies may include one or more aspects of computer vision. For example, in some of the present embodiments an object within the camera's field of view may be determined to be a parcel if the object is not present within the camera's field of view at a first time (in a first video frame), the object is present within the camera's field of view at a second time after the first time (in a second video frame), and the object remains within the camera's field of view for at least a threshold amount of time (e.g., 10 seconds, 30 seconds, or 60 seconds). Determining whether the object remains within the camera's field of view for at least the threshold amount of time may comprise review of one or more video frames that are recorded after the second video frame. In other embodiments, an object within the camera's field of view may be determined to be a parcel if the object is not present within the camera's field of view at a first time (in a first video frame), the object is present within the camera's field of view at a second time after the first time (in a second video frame), and the object remains motionless within the camera's field of view for at least a threshold amount of time. Determining whether the object remains motionless within the camera's field of view for at least the threshold amount of time may comprise review of one or more video frames that are recorded after the second video frame.

In other embodiments, an object within the camera's field of view may be determined to be a parcel if the object is not present within the camera's field of view at a first time (in a first video frame), a person is detected approaching the A/V recording and communication device 130 at a second time after the first time (in a second video frame), the person is detected moving away from the A/V recording and communication device 130 at a third time after the second time (in a third video frame), and the object is present within the camera's field of view at a fourth time after the third time (in a fourth video frame).

In other embodiments, an object within the camera's field of view may be determined to be a parcel if the object is not present within the camera's field of view at a first time (in a first video frame), a stationary vehicle (which may be a delivery vehicle, for example) is detected within the camera's field of view at a second time after the first time (in a second video frame), the object is present within the camera's field of view at a third time after the second time (in a third video frame), and the vehicle is no longer present within the camera's field of view at a fourth time after the third time (in a fourth video frame).

In other embodiments, an object within the camera's field of view may be determined to be a parcel if the object is not present within the camera's field of view at a first time (in a first video frame), the object is present within the camera's field of view at a second time after the first time (in a second video frame), and the object meets one or more criteria, such as having one or more physical characteristics. Examples of physical characteristics that may be examined to determine whether the object is a parcel include, without limitation, size, shape, color, and material (or materials). For example, if the object is made of cardboard and is brown or white (common colors for cardboard shipping boxes), it may be determined to be a parcel.

The present embodiments contemplate many processes for examining physical characteristics of the object and making a determination as to whether the object is a parcel. For example, some of the present embodiments may comprise gathering information about the object using computer vision, and then comparing the gathered information about the object to stored information about parcels to determine whether there is a match. For example, the present embodiments may include a database of parcels and/or physical characteristics of parcels. The database may include pictures of known parcels, and comparing the gathered information about the object to the stored information about parcels may comprise comparing a picture of the object to the pictures of known parcels. Gathering information about the object using computer vision may comprise using one or more cameras, scanners, imagers, etc. and/or one or more sensors, such as sonar. In some of the present embodiments, determining whether the object is a parcel may be based on the location of the object within the field of view of the camera. For example, if the A/V recording and communication device is located near a door, such as the front door, then a motionless object in close proximity to the A/V recording and communication device may be more likely to be a parcel. However, if the object is distant from the A/V recording and communication device, such as in the front yard, near the street, or in a garden, for example, the object may be less likely to be a parcel. As such, the determination of whether the object is a parcel may further include determining the location of the parcel in the field of view of the camera 444. In some of the present embodiments, the user of the client device (e.g., client device 404, 406 of FIG. 33) may be able to set parcel zone(s) during a setup process. The creation of the parcel zone(s) may be similar to that of the creation of the parcel boundary 475 described below (e.g., drawn on a display of the client device, automatically created based on the field of view of the A/V recording and communication device, etc.). In embodiments where parcel zone(s) are created, the A/V recording and communication device may first determine if the motionless object is within the parcel zone prior to determining, based on the methods disclosed herein, if the motionless object is a parcel.

With reference to FIG. 23, information received by the computer vision module 163 of the A/V recording and communication device 130 may be sent to one or more network devices, such as the server 118 and/or the backend API 120, in a computer vision query signal 310. The one or more network devices may then analyze the sent information and/or compare the sent information with other information in one or more databases to determine whether there is a match, for example in order to identify the parcel. In one example embodiment, comparing the sent information about the parcel with other information in one or more databases to determine whether there is a match may comprise comparing the sent information, such as one or more photos or images, about the parcel with photos and/or images of known parcels. If there is a match, then one or more actions may occur, such as the A/V recording and communication device 130 transitioning to a different operational mode. For example, the network device, such as the server 118 and/or the backend API 120, may send a computer vision response signal 312 to the A/V recording and communication device 130. The computer vision response signal 312 may include a command to the A/V recording and communication device 130 to change the operational mode of the A/V recording and communication device 130. For example, the command to the A/V recording and communication device 130 may cause the A/V recording and communication device 130 to transition to an "armed" mode in which the A/V recording and communication device 130 is configured to take one or more actions when the parcel is removed from the area about the A/V recording and communication device 130, as described below.

In another example embodiment, determining that the parcel has been left within the area about the A/V recording and communication device 130 may comprise receiving information from a carrier (e.g. the postal service, FedEx, UPS, etc.) that delivered the parcel. For example, when the parcel carrier delivers the parcel, or at some time after the parcel carrier has delivered the parcel, the carrier may update a delivery status of the parcel in the carrier's parcel tracking system to indicate that the parcel has been delivered. The carrier's parcel tracking system may then forward that information to one or more network devices, such as the server 118 and/or the backend API 120, which may then forward the information to the A/V recording and communication device 130.

In another example embodiment, determining that the parcel has been left within the area about the A/V recording and communication device 130 may comprise automatic identification and data capture (AIDC). For example, the parcel may include at least one of a barcode 320 (FIG. 29), a matrix code 322 (FIG. 30), a bokode 324 (FIG. 31), and a radio frequency identification (RFID) tag 326 (FIG. 32). AIDC refers to methods of automatically identifying objects, collecting data about them, and entering that data directly into computer systems (e.g. without human involvement). Technologies typically considered part of AIDC include barcodes, matrix codes, bokodes, RFID, biometrics (e.g. iris recognition, facial recognition, voice recognition, etc.), magnetic stripes, Optical Character Recognition (OCR), and smart cards. AIDC is also commonly referred to as "Automatic Identification," "Auto-ID," and "Automatic Data Capture."

AIDC encompasses obtaining external data, particularly through analysis of images and/or sounds. To capture data, a transducer may convert an image or a sound into a digital file. The file is then typically stored and analyzed by a computer, and/or compared with other files in a database, to verify identity and/or to provide authorization to enter a secured system. AIDC also refers to methods of recognizing objects, getting information about them, and entering that data or feeding it directly into computer systems without any human involvement. In biometric security systems, capture may refer to the acquisition of and/or the process of acquiring and identifying characteristics, such as finger images, palm images, facial images, or iris prints, which all may involve video data, or voice prints, which may involve audio data.

Figure 29:
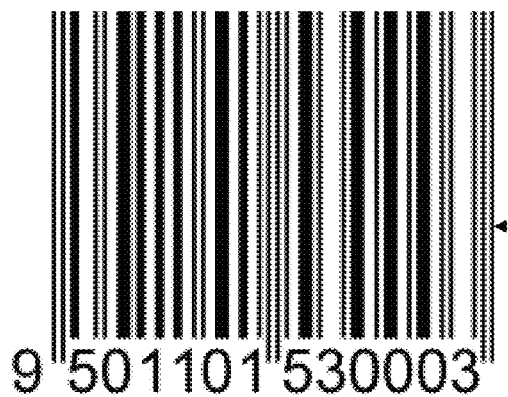
FIG. 29 is a front elevation view of a barcode.

A barcode, such as the example barcode 320 shown in FIG. 29, is an optical machine-readable representation of data relating to the object to which it is attached. Barcodes systematically represent data by varying the widths and spacings of parallel lines, and may be referred to as linear or one-dimensional (1D) barcodes.

Figure 30:
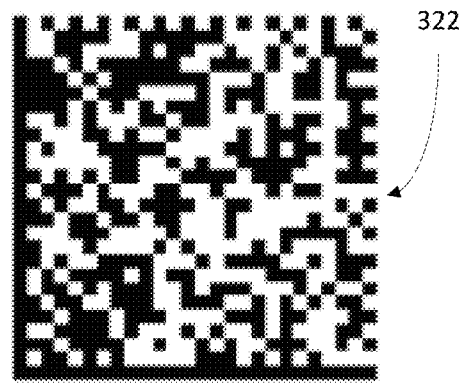
FIG. 30 is a front elevation view of a matrix code.

A matrix code, such as the example matrix code 322 shown in FIG. 30, is a two-dimensional matrix barcode consisting of black and white "cells" or modules arranged in either a square or rectangular pattern. The information encoded may be text and/or numeric data. Quick response (QR) codes and Data Matrix codes are specific types of matrix codes.

Figure 31:
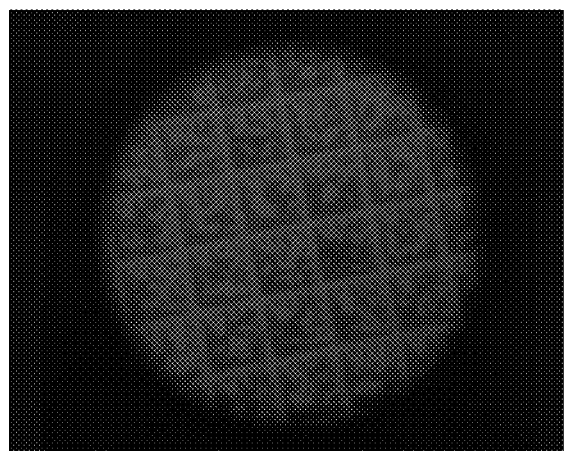
FIG. 31 is a front elevation view of a bokode.
Figure 32:
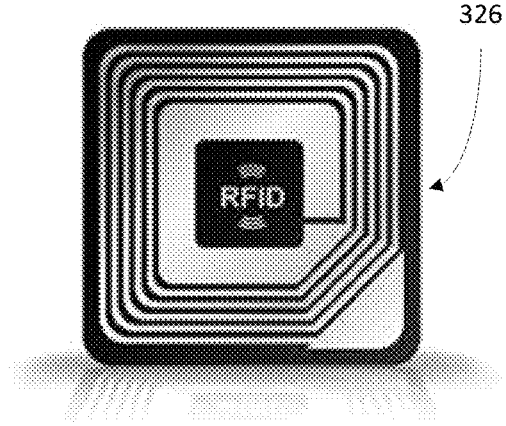
FIG. 32 is a front elevation view of a radio frequency identification (RFID) tag.

A bokode, such as the example bokode 324 shown in FIG. 31, is a type of data tag that holds much more information than a barcode over the same area. The bokode pattern is a tiled series of matrix codes. Bokodes may be circular, and may include an LED covered with a mask and a lens.

Radio-frequency identification (RFID) uses electromagnetic fields to automatically identify and track tags attached to objects. The tags, such as the example RFID tag 326 shown in FIG. 32, contain electronically stored information, and may be passive or active. Passive tags collect energy from a nearby RFID reader's interrogating radio waves. Active tags have a local power source, such as a battery, and may operate at hundreds of meters from the RFID reader. Unlike a barcode, the tag need not be within the line of sight of the reader, so it may be embedded in the tracked object.

The A/V recording and communication device 130 may capture information embedded in one of these types (or any other type) of AIDC technologies. For example, with reference to FIG. 3, the A/V recording and communication device 130 may include an AIDC module (not shown) operatively connected to the processor 160. The AIDC module 165 may include hardware and/or software configured for one or more types of AIDC, including, but not limited to, any of the types of AIDC described herein. For example, the AIDC module 165 may include an RFID reader (not shown), and the camera 154 of the A/V recording and communication device 130 may in some of the present embodiments be considered to be part of the AIDC module 165. For example, with respect to barcodes, matrix codes, and bokodes (or any other type code), the camera 154 of the A/V recording and communication device 130 may scan the code, and any information embedded therein. To facilitate scanning the code, the parcel carrier may hold the parcel up to the camera 154. With respect to RFID, the RFID reader of the AIDC module 165 may interrogate an RFID tag 326 on, or embedded in, the parcel. In some of the present embodiments, the processor 160 of the A/V recording and communication device 130 may be considered to be part of the AIDC module 165 and/or the processor 160 may operate in conjunction with the AIDC module 165 in various AIDC processes.

AIDC and computer vision have significant overlap, and use of either one of these terms herein should be construed as also encompassing the subject matter of the other one of these terms. For example, the computer vision module 163 and the AIDC module 165 may comprise overlapping hardware components and/or functionality. In some of the present embodiments, the computer vision module 163 and the AIDC module 165 may be combined into a single module.

The computer vision methods and AIDC methods described above may also be used in the processes described in FIGS. 43-54 below. For example, in the process of FIG. 45, at block B618, computer vision and/or AIDC methods similar to those described above may be used to detect, by the motion detector (e.g., the camera 444) based on the updated motion detection rules 470, that the parcel has been moved from within the parcel boundary 475. Similarly, in the process of FIG. 46, at block B626, computer vision and/or AIDC methods similar to those described above may be used to analyze, by the processor 452, the image data 460 to determine whether the image data 460 includes a parcel. As another example, in the process of FIG. 48, at block B638, computer vision and/or AIDC methods similar to those described above may be used by the processor 502 of the backend server 430 to analyze the image data 460 to determine whether a parcel is present.

Figure 33:
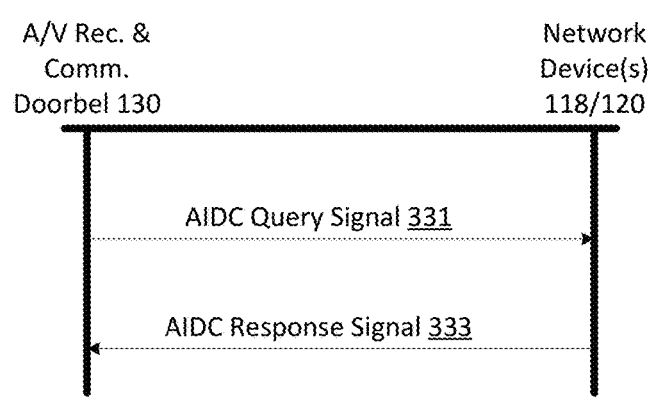
FIG. 33 is a sequence diagram illustrating an embodiment of a process for deterring parcel theft with an A/V recording and communication device according to various aspects of the present disclosure.

With reference to FIG. 33, information received by the AIDC module 165 of the A/V recording and communication device 130 from one or more codes or tags may be sent to one or more network devices, such as the server 118 and/or the backend API 120, in an AIDC query signal 331. The one or more network devices may then analyze the sent information and/or compare the sent information with other information in one or more codes databases to determine whether there is a match, for example in order to identify the parcel. If there is a match, then one or more actions may occur, such as the A/V recording and communication device 130 transitioning to a different operational mode. For example, the network device, such as the server 118 and/or the backend API 120, may send an AIDC response signal 333 to the A/V recording and communication device 130. The AIDC response signal 333 may include a command to the A/V recording and communication device 130 to change the operational mode of the A/V recording and communication device 130. For example, the command to the A/V recording and communication device 130 may cause the A/V recording and communication device 130 to transition to an "armed" mode in which the A/V recording and communication device 130 is configured to take one or more actions when the parcel is removed from the area about the A/V recording and communication device 130, as described below.

With further reference to FIG. 27, at block B302 the process determines that the parcel has been removed from the area about the A/V recording and communication device 130. The area about the A/V recording and communication device may be the entire area in the field of view of the A/V recording and communication device, a parcel zone as described above, or may specifically be a parcel boundary, such as the parcel boundary 475 described below. The present embodiments encompass any method of determining that a parcel has been removed from the area about an A/V recording and communication device, and several examples are provided below. The present embodiments are not, however, limited to these examples, which are provided for illustration only. Any of the examples described below, as well as any of the present embodiments, may include one or more aspects of computer vision.

In one example embodiment, determining that the parcel has been removed from the area about the A/V recording and communication device 130 may comprise comparing video frames recorded by the camera 154 of the A/V recording and communication device 130. For example, after a parcel has been determined to have been left within the area about the A/V recording and communication device 130, the parcel is likely to remain motionless in the position where it was left. Thus, if the parcel is present within the camera's field of view at a first time (in a first video frame), and is no longer present within the camera's field of view at a second time after the first time (in a second video frame), then the parcel may be determined to have been removed from the area about the A/V recording and communication device 130. As described above, this determination may be made within the entire area about the A/V recording and communication device, or in a more defined area, such as within the parcel zone and/or the parcel boundary 475, for example.

In another example embodiment, determining that the parcel has been removed from the area about the A/V recording and communication device 130 may comprise AIDC. For example, if the parcel includes an RFID tag, then an RFID reader of the AIDC module 165 may detect that the RFID tag no longer responds to interrogation signals. In some of the present embodiments, if the RFID reader sends a threshold number of interrogation signals and receives no response from the RFID tag of the parcel, the process may determine that the parcel has been removed from the area about the A/V recording and communication device 130. In some of the present embodiments, the threshold number of interrogation signals with no response may be one interrogation signal, or two interrogation signals, or three interrogation signals, or any other number of interrogation signals. As described above, this determination may be made using AIDC within the entire area about the A/V recording and communication device, or in a more defined area, such as within the parcel zone and/or the parcel boundary 475, for example.

With further reference to FIG. 27, at block B304 the process determines whether removal of the parcel from the area about the A/V recording and communication device 130 was authorized. The present embodiments encompass any method of determining whether removal of the parcel from the area about the A/V recording and communication device 130 was authorized, and several examples are provided below. The present embodiments are not, however, limited to these examples, which are provided for illustration only. Any of the examples described below, as well as any of the present embodiments, may include one or more aspects of computer vision.

In one example embodiment, determining whether removal of the parcel from the area about the A/V recording and communication device 130 was authorized may comprise detecting (or tracking) a direction of movement of the parcel. For example, when a parcel is left outside the front entrance of a home, the homeowner (or other occupant) will typically pick up the parcel and bring it inside the home. A parcel thief, by contrast, will typically pick up the parcel and carry it away from the home. Thus, if the A/V recording and communication device 130 detects that the parcel is moving toward a structure to which the A/V recording and communication device 130 is secured (or with which the A/V recording and communication device 130 is associated), then the process may determine that the removal of the parcel from the area about the A/V recording and communication device 130 is authorized. But, if the A/V recording and communication device 130 detects that the parcel is moving away from the structure to which the A/V recording and communication device 130 is secured (or with which the A/V recording and communication device 130 is associated), then the process may determine that the removal of the parcel from the area about the A/V recording and communication device 130 is unauthorized. This determination may be similar to that of block B618 of the process of FIG. 45. For example, detecting, by the motion detector based on the updated motion detection rules 470, that the parcel has been moved from within the parcel boundary 475 may include detecting (or tracking) a direction of movement of the parcel.

In another example embodiment, determining whether removal of the parcel from the area about the A/V recording and communication device 130 was authorized may comprise AIDC and/or computer vision. For example, if an authorized person (e.g. the addressee of the parcel) removes the parcel from the area about the A/V recording and communication device 130, the A/V recording and communication device 130 may receive information from the authorized person. For example, the authorized person may present identification or credentials to the A/V recording and communication device 130. The camera 154 and/or the AIDC module 165 and/or the processor 160 of the A/V recording and communication device 130 may receive information from the identification or credentials for use in determining that the person removing the parcel from the area about the A/V recording and communication device 130 is an authorized person. If no identification or credentials are presented when the parcel is removed from the area about the A/V recording and communication device 130, or if identification or credentials are presented but they do not match an expected identification or credentials, then the process may determine that the person removing the parcel from the area about the A/V recording and communication device 130 is not an authorized person. In some of the present embodiments, the A/V recording and communication device 130 may provide a prompt, such as a voice prompt emitted through the speaker, requesting identification or credentials when a person is detected within the area about the A/V recording and communication device 130 and/or when the A/V recording and communication device 130 detects that the parcel has been moved or picked up.

Figure 34:
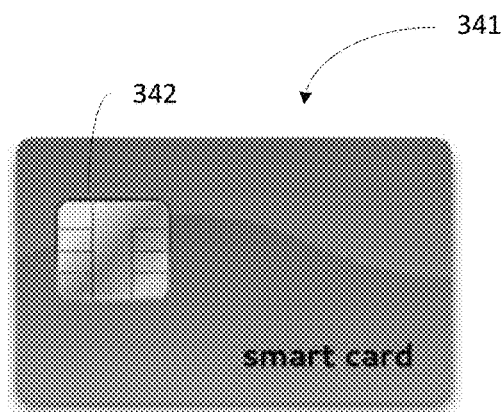
FIG. 34 is a front elevation view of a smart card.

Examples of identification or credentials that could be used in the foregoing processes include, without limitation, a card (or other carrier or substrate) bearing a barcode 320, or a matrix code 322, or a bokode 324, or an RFID tag 326, or an embedded integrated circuit (such as in a smart card, a chip card, or an integrated circuit card (ICC)), or a magnetic stripe. FIG. 34 illustrates an example of a smart card 341 including an embedded integrated circuit 342, and FIG. 35 illustrates an example of a card 373 including a magnetic stripe 373(*a*).

A smart card, chip card, or integrated circuit card (ICC), such as the example smart card 341 shown in FIG. 34, is any pocket-sized card that has one or more embedded integrated circuits. Smart cards may be either contact or contactless. Contact smart cards include a contact area comprising contact pads. These pads provide electrical connectivity when inserted into a reader, which serves as a communication medium between the smart card and a host (e.g., a computer, or a point of sale terminal). Contact smart cards do not contain batteries. Instead, power is supplied by the card reader. With contactless smart cards, the card communicates with and is powered by the reader through RF induction technology. These cards require only proximity to an antenna to communicate. Like contact smart cards with, contactless cards do not have an internal power source. Instead, they use an inductor to capture some of the incident radio-frequency interrogation signal, rectify it, and use it to power the card's electronics.

Figure 35:
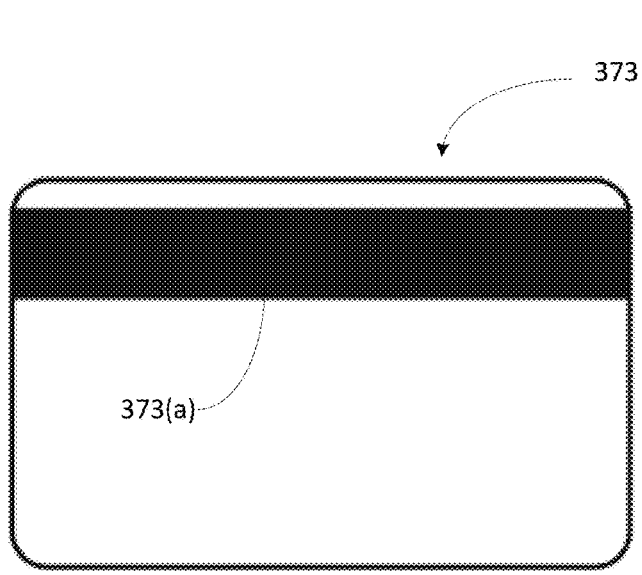
FIG. 35 is a rear elevation view of a magnetic stripe card.

A magnetic stripe card, such as the example card 373 shown in FIG. 35, is a type of card capable of storing data by modifying the magnetism of tiny iron-based magnetic particles on a band of magnetic material on the card. The magnetic stripe, sometimes called a magstripe, is read by swiping past a magnetic reading head.

Further examples of identification or credentials that could be used in the foregoing processes include, without limitation, a card (or other carrier or substrate) bearing text that may be received as input by the AIDC module 165 and/or the camera 154 and/or the processor 160 through optical character recognition (OCR). OCR is the mechanical or electronic conversion of images of typed, handwritten, or printed text into machine-encoded text.

Further examples of AIDC and/or computer vision that may be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers may be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who removes the parcel from the area about the A/V recording and communication device 130. For example, the computer vision module 163, the AIDC module 165, and/or the camera 154 and/or the processor 160 may receive information about the person using any one, or any combination of more than one, of the foregoing biometrics.

Another aspect of determining whether removal of the parcel from the area about the A/V recording and communication device 130 was authorized may comprise comparing information received through the AIDC (and/or computer vision) to information about one or more persons. With reference to FIG. 33, information received by the AIDC module 165 (and/or the computer vision module 163) and/or the camera 154 and/or the processor 160 of the A/V recording and communication device 130 may be sent to one or more network devices, such as the server 118 and/or the backend API 120, in an AIDC query signal 331. The one or more network devices may then compare information in the AIDC query signal 331 about the person detected in the area about the A/V recording and communication device 130 with information from one or more sources. These information sources may include one or more databases and/or services. For example, a database and/or service may include a smart list of authorized persons. If a person who removed the parcel is on the smart list of authorized persons, then the removal of the parcel from the area about the A/V recording and communication device 130 may be determined to be authorized.

In some of the present embodiments, the information in the AIDC query signal 331 may be compared with information about one or more persons who are authorized to remove parcels from the area about the A/V recording and communication device 130. For example, biometric information (or other AIDC/computer vision information) about one or more authorized persons may be uploaded and stored at one or more databases and/or services accessible to the one or more network devices, such as the server 118 and/or the backend API 120. Comparison(s) between this information and the information in the AIDC query signal 331 may determine whether a person detected in the area about the A/V recording and communication device 130 is an authorized person or not. The comparison(s) may be performed by one or more network devices, such as the server 118 and/or the backend API 120, for example.

In other embodiments, the information in the AIDC query signal 331 may be compared with information about one or more persons who have been reported in connection with one or more crimes and/or suspicious events. In some of the present embodiments, the crime(s) and/or suspicious event(s) may have occurred within a defined radius of the A/V recording and communication device 130. For example, a first user of an A/V recording and communication device may view video footage that was recorded by his or her device and determine that the person or persons in the video footage are, or may be, engaged in suspicious activity and/or criminal activity. The first user may then share that video footage with one or more other people, such as other users of A/V recording and communication devices, and/or one or more organizations, including one or more law enforcement agencies. The present embodiments may leverage this shared video footage for use in comparing with the information in the AIDC query signal 331 to determine whether a person detected in the area about the A/V recording and communication device 130 is the same person that was the subject of (and/or depicted in) the shared video footage. If a person detected in the area about the A/V recording and communication device 130 is the same person that was reported in connection with one or more crimes and/or suspicious events, then that person is probably not a person who is authorized to remove parcels from the area about the A/V recording and communication device 130. In some of the present embodiments, the person (or persons) depicted in the shared video footage may be a perpetrator(s) of one or more parcel thefts. Further, those parcel thefts may have occurred within a defined radius about the A/V recording and communication device 130. Further description of sharing video footage from A/V recording and communication devices is provided in U.S. patent application Ser. Nos. 62/288,971 (filed on Jan. 29, 2016 and entitled "SHARING VIDEO FOOTAGE FROM WIRELESS AUDIO/VIDEO RECORDING AND COMMUNICATION DEVICES") and 62/300,547 (filed on Feb. 26, 2016 and entitled "SHARING VIDEO FOOTAGE FROM WIRELESS AUDIO/VIDEO RECORDING AND COMMUNICATION DEVICES"), both of which are incorporated herein by reference in their entireties as if fully set forth.

In another example embodiment, AIDC and/or computer vision may comprise the camera 154 of the A/V recording and communication device 130 capturing an image of a person in the area about the A/V recording and communication device 130. The image of the person may comprise an image of the person's face. The image of the person's face may be compared with image(s) of the face(s) of at least one other person. In some of the present embodiments, the at least one other person may be a person or persons who were reported in connection with suspicious activity and/or criminal activity, such as parcel theft. The comparison(s) may be performed by one or more network devices, such as the server 118 and/or the backend API 120. If a match is found between the image of the person's face captured by the camera 154 of the A/V recording and communication device 130 and the at least one image of the face(s) of at least one other person, then the process may determine that removal of the parcel from the area about the A/V recording and communication device 130 was unauthorized. The process may then generate an alert, which may comprise any or all of the alert types described herein.

With further reference to FIG. 33, the network device, such as the server 118 and/or the backend API 120, may send an AIDC response signal 333 to the A/V recording and communication device 130. In some of the present embodiments, the AIDC response signal 333 may be sent after a comparison has been made between the information in the AIDC query signal 331 and the information about one or more persons who are authorized to remove parcels from the area about A/V recording and communication device 130 and/or the information about one or more persons who have been reported in connection with one or more crimes and/or suspicious events. The AIDC response signal 333 may comprise an indicator (and/or information) about whether a person detected in the area about the A/V recording and communication device 130 is authorized to remove parcels from that area or not.

With further reference to FIG. 27, at block B306, when the removal of the parcel from the area about the A/V recording and communication device 130 is determined to have been unauthorized, the process may generate an alert. In some of the present embodiments, the alert may comprise an alert signal sent to a client device. For example, the alert may be similar to, or the same as, the process described above with respect to block B268 of FIG. 2, in which audio and/or video data is transmitted (streamed) from the A/V recording and communication device 130 to the user's client device 114 via the user's network 110 and the network 112. The streaming video may include images of the person(s) who was/were determined to have been unauthorized. The user may then determine whether to take further action, such as alerting law enforcement and/or sharing the video footage with other people, such as via social media.

In some of the present embodiments, the alert may comprise an audible alarm emitted from the speaker 152 of the A/V recording and communication device 130. The audible alarm may be any loud noise likely to attract attention and/or startle the unauthorized person, making it more likely that he or she will flee without absconding with the parcel(s). In some of the present embodiments, the alert may comprise an announcement emitted from the speaker 152 of the A/V recording and communication device 130. The announcement may comprise a verbal warning that the area about the A/V recording and communication device 130 is being recorded. The unauthorized person, upon being informed that the area about the A/V recording and communication device 130 is being recorded, may decide to flee the scene without absconding with the parcel(s). In some of the present embodiments, the alert may comprise both an audible alarm and an announcement in combination. Also in some of the present embodiments, the alert may comprise any combination of an alert signal sent to a client device, an audible alarm emitted from the speaker 152 of the A/V recording and communication device 130, and an announcement emitted from the speaker 152 of the A/V recording and communication device 130.

In some of the present embodiments, the alert may be similar to that of the user alert 472 described below. In the alternative, the user alert 472 described below may be similar to the alert described above in some of the present embodiments.

Some of the present embodiments may comprise identifying a parcel within the area about the A/V recording and communication device 130. In some of the present embodiments, identifying the parcel may comprise the camera 154 of the A/V recording and communication device 130 capturing an image of an identifying mark on the parcel. In various embodiments, the identifying mark may be, for example, a company logo or other identifying symbol. The identifying mark on the parcel may be compared with a plurality of identifying marks in a database. If a match is found, the parcel may be identified as originating with the sender associated with the matching identifying mark. In other embodiments, the identifying mark may be, for example, a barcode, a matrix code, a bokode, etc. In some of the present embodiments, RFID (or other similar technology) may be used to identify a parcel.

Figure 36:
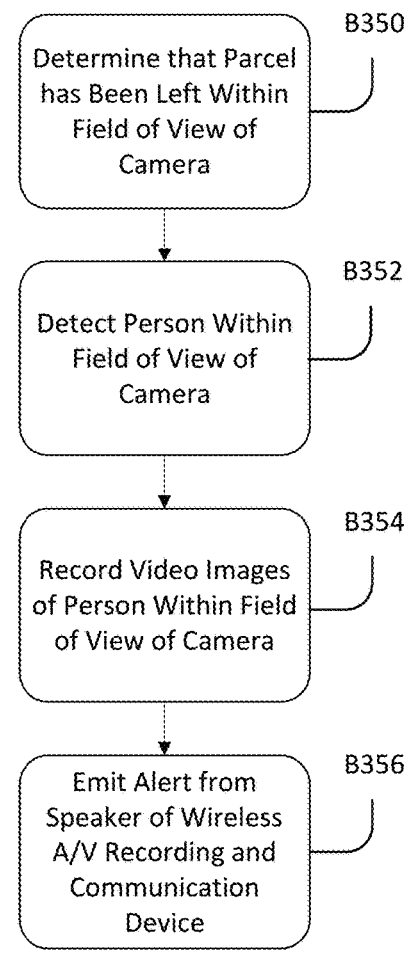
FIGS. 36 and 37 are flowcharts illustrating embodiments of processes for deterring parcel theft with an A/V recording and communication device according to various aspects of the present disclosure.

FIG. 36 illustrates an example embodiment of a process for deterring parcel theft with an A/V recording and communication device according to various aspects of the present disclosure. At block B350, the process may determine that a parcel has been left within an area about an A/V recording and communication device, such as the A/V recording and communication device 130 described above. The present embodiments encompass any method of determining that a parcel has been left within an area about an A/V recording and communication device, including any of the examples described above. The present embodiments are not, however, limited to these examples, which are provided for illustration only.

With further reference to FIG. 36, at block B352, after the parcel has been left within the area about the A/V recording and communication device 130, the process may detect a person within the area about the A/V recording and communication device 130. The detection of the person within the area about the A/V recording and communication device 130 may be according to any of the processes described herein, such as, for example, comparing video frames recorded by the camera 154 of the A/V recording and communication device 130.

With further reference to FIG. 36, at block B354 the process may record, with the camera 154 of the A/V recording and communication device 130, video images of the person within the area about the A/V recording and communication device 130. At block B356, the process may emit an alert from the speaker 152 of the A/V recording and communication device 130. The alert may comprise an audible alarm and/or an announcement, similar to the example embodiments described above.

In some of the present embodiments, the processes described above may be performed automatically when a parcel is detected within the area about the A/V recording and communication device 130. In other embodiments, processes similar to those described above may only be performed in response to a user command. For example, one aspect of the present embodiments may provide an option to a user for enabling and/or disabling a parcel protection feature or mode. An option to enable/disable the parcel protection mode may be presented to the user, for example, through a graphical user interface (GUI) of an application executing on the user's client device 114. The GUI may also provide other options (e.g., receiving motion alerts, etc.), in addition to the parcel protection mode, for the user to select or unselect (e.g., to enable or disable).

In one example embodiment, the user may manually enable parcel protection mode in response to a notification that a parcel has been delivered. For example, with reference to FIG. 37, at block B360 the user may receive a notification that a parcel has been delivered (e.g., left within the field of view of the camera 154). The notification may be received in several different ways. For example, the parcel carrier may press the front button 148 of the A/V recording and communication device 130, thereby initiating a call to the user's client device 114. The user may answer the call and speak to the parcel carrier, who may inform the user that his or her parcel has been delivered and left in the area about the A/V recording and communication device 130. In another example, the call to the user's client device 114 may be initiated automatically by the A/V recording and communication device 130 in response to detecting the presence of the parcel carrier, such as by using the camera 154 for motion detection and/or a separate motion sensor. The user may then view live streaming video of the parcel delivery event (or subsequently view recorded video of the parcel delivery event) and thereby be informed of the parcel delivery without actually speaking to the parcel carrier. In yet another example, the A/V recording and communication device 130 may detect the delivery of the parcel, for example using any of the techniques described herein, and may then send a notification to the user's client device 114, for example in the form of an alert (e.g., a push notification).

Figure 37:
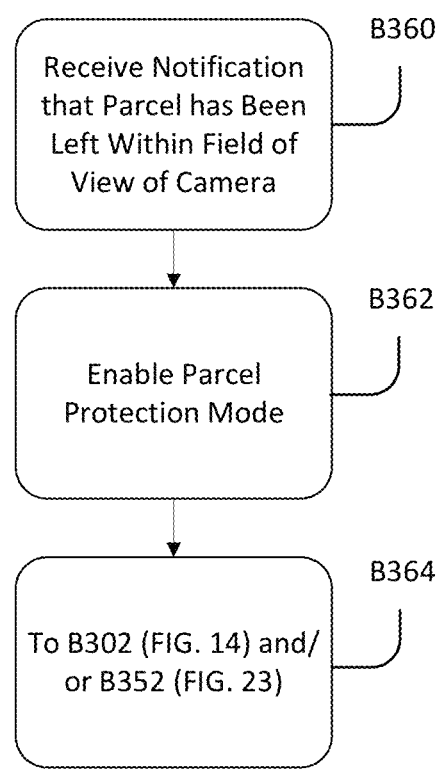

Regardless of the form of notification, and with further reference to FIG. 37, at block B362 the user may manually enable parcel protection mode, such as, for example, using an application executing on the user's client device 114, as described above. In some of the present embodiments, the option to enable parcel protection mode may be presented to the user in conjunction with the notification sent to the user's client device 114, for example in the form of an alert (e.g., a push notification). If the user enables parcel protection mode, then at block B364 the process of FIG. 37 advances to block B302 of FIG. 27 and/or block B352 of FIG. 36. In some of the present embodiments, however, if the user declines to enable parcel protection mode, then parcel protection mode may remain inactive, and the operations shown in blocks B302-B306 of FIG. 27 and blocks B362-B366 of FIG. 36 would not be performed.

As described above, a user may disable the parcel protection mode manually in the same manner that the user enables this feature/mode (e.g., through a GUI of an application that is associated with the A/V recording and communication device). Some of the present embodiments may also disable the parcel protection mode automatically (e.g., without a user's intervention). Some such embodiments may disable the parcel protection mode when a parcel is removed from an area about an A/V recording and communication device by an authorized person (e.g., the homeowner, a friend or family member of the homeowner, or any other person authorized by the homeowner). Different embodiments may realize that a parcel is removed (e.g., from the field of view of a camera of an A/V recording and communication device) by an authorized person through different methods. Some aspects of the present embodiments may verify a person as an authorized person by authenticating the person's biometrics. As an example, one aspect of the present embodiments identifies the person's face (e.g., by performing a face recognition process, as described above) and compares the identification data with one or more databases that contain authorized persons' identification data.

Some of the present embodiments may disable a parcel protection mode when these embodiments determine that an authorized user is at, or within a threshold vicinity of, the location of the parcel. Some of the present embodiments make such a determination by comparing a current location of the authorized user (e.g., by locating a client device that the user carries) and the location of the parcel. Some other embodiments may determine that a parcel is picked up by an authorized person when the parcel moves in a specific direction (e.g., toward the house instead of away from the house). Some of the present embodiments may realize that the parcel is being moved toward the house, e.g., by comparing a sequence of video images of the moving parcel captured by a camera of the A/V recording and communication device. Some other embodiments may use an AIDC module (e.g., an RFID reader) of the A/V recording and communication device to determine the direction of movement of a parcel (e.g., when the parcel includes a barcode, a matrix code, an RFID tag, etc.).

In any of the present embodiments, various aspects of methods may be performed locally, e.g. by one or more components of the A/V recording and communication device 130, and/or remotely, e.g. by one or more network devices, such as the server 118 and/or the backend API 120, for example. For example, the processor 160 of the A/V recording and communication device 130 may perform various aspects such as, but not limited to, comparing video frames recorded by the camera 154 of the A/V recording and communication device 130 to determine whether a parcel has been left within the area about the A/V recording and communication device 130 and/or that the parcel has been removed from the area about the A/V recording and communication device 130.

Many of the present embodiments have been described with reference to persons detected by, or present in the area about, the A/V recording and communication device 130. The present embodiments are not limited, however, to scenarios involving humans. For example, the present embodiments contemplate that a parcel thief need not be a human. A parcel theft bot or drone, for example, may be encompassed by any of the present embodiments. For example, in a process similar to any process described herein, after a parcel has been left within the area about the A/V recording and communication device 130, the process may detect a parcel theft bot or drone within the area about the A/V recording and communication device 130. The process may also record, with the camera 154 of the A/V recording and communication device 130, video images of the parcel theft bot or drone within the area about the A/V recording and communication device 130.

Any of the present embodiments may comprise a designated parcel delivery area. For example, a user may designate a particular area about the A/V recording and communication device 130 as a parcel delivery area. The parcel delivery area may be demarcated in any suitable manner, such as with markings and/or text provided on the pavement and/or adjacent wall(s). Processes of determining whether a parcel has been left within the area about the A/V recording and communication device 130 and/or determining whether the parcel has been removed from the area about the A/V recording and communication device 130 may comprise determining whether an object has been left within and/or removed from the designated parcel delivery area. The user may, in some of the present embodiments, direct or aim the camera 154 of the A/V recording and communication device 130 toward the designated parcel delivery area to facilitate determining whether an object has been left within and/or removed from the designated parcel delivery area.

Figure 38:
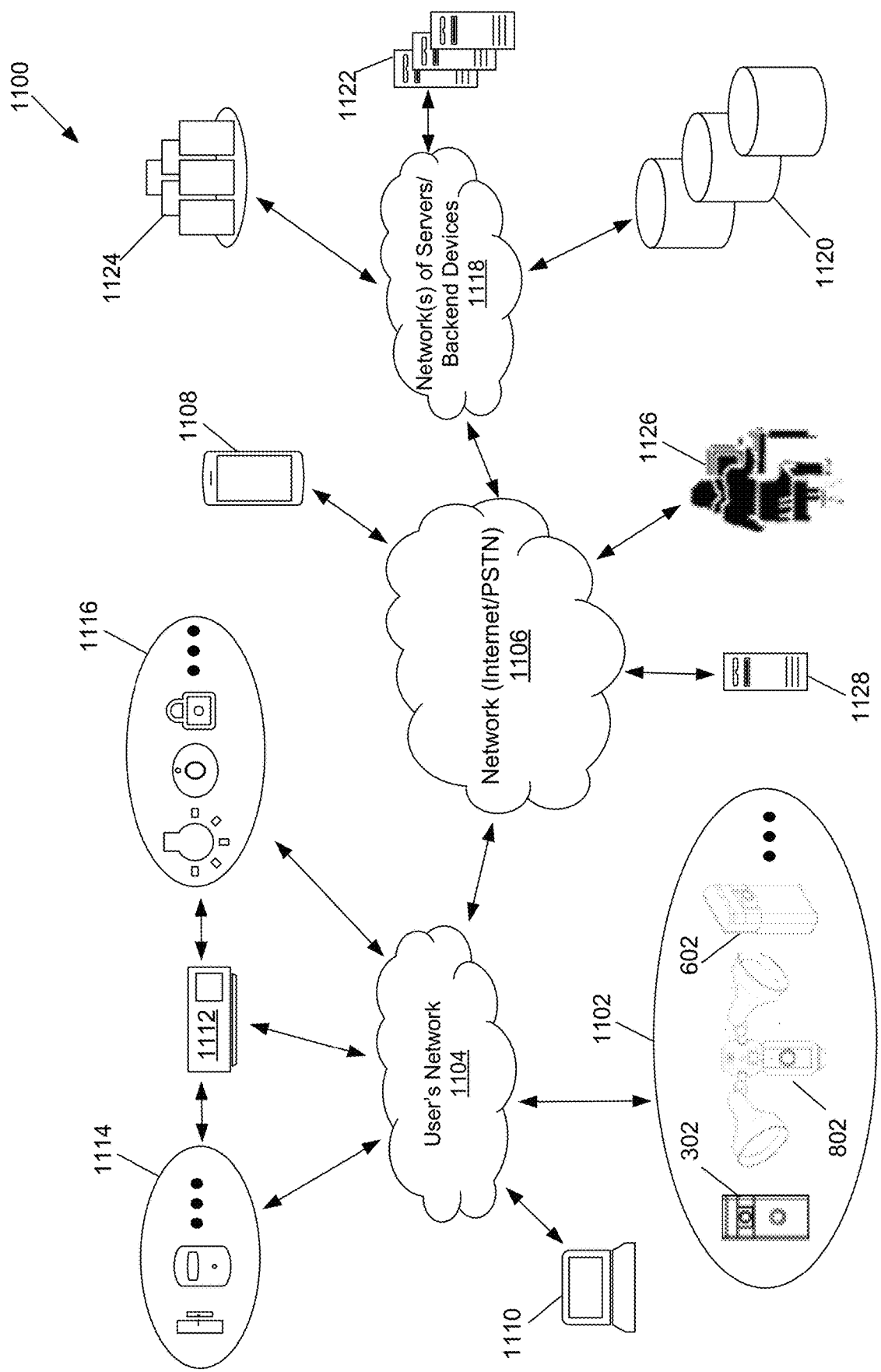
FIG. 38 is a functional block diagram illustrating a system for deterring parcel theft using an A/V recording and communication device according to the present embodiments.

FIG. 38 is a functional block diagram illustrating a system 1100 for communicating in a network according to various aspects of the present disclosure. The system 1100 may include one or more A/V recording and communication devices 1102 configured to access a user's network 1104 (which may correspond to the user's network 110) to connect to a network (Internet/PSTN) 1106 (in some embodiments, the A/V recording and communication devices 1102 may be configured to connect directly to the network (Internet/PSTN) 1106, such as over a cellular connection). The one or more A/V recording and communication devices 1102 may include any or all of the components and/or functionality of the A/V recording and communication device 100 (FIGS. 1-2), the A/V recording and communication doorbell 302 (FIGS. 3-5), the security camera 602 (FIGS. 6-7), and/or the floodlight controller 802 (FIGS. 24-26).

The user's network 1104 may include any or all of the components and/or functionality of the user's network 110 described herein.

The system 1100 may further include a smart-home hub device 1112 (which may alternatively be referred to herein as the hub device 1112) connected to the user's network 1104. The smart-home hub device 1112 (also known as a home automation hub, gateway device, etc.), may comprise any device that facilitates communication with and control of the sensors 1114, automation devices 1116, and/or the one or more A/V recording and communication devices 1102. For example, the smart-home hub device 1112 may be a component of a home automation system installed at a property. In some embodiments, the A/V recording and communication devices 1102, the sensors 1114, and/or the automation devices 1116 may communicate with the smart-home hub device 1112 directly and/or indirectly via the user's network 1104 and/or the network (Internet/PSTN) 1106. In some of the present embodiments, the A/V recording and communication devices 1102, the sensors 1114, and/or the automation devices 1116 may, in addition to or in lieu of communicating with the smart-home hub device 1112, communicate with the client devices 1108, 1110 and/or one or more of the components of the network of servers/backend devices 1118 directly and/or indirectly via the user's network 1104 and/or the network (Internet/PSTN) 1106.

Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. Smart home devices (e.g., the hub device 1112, the sensors 1114, the automation devices 1116, the A/V recording and communication devices 1102, etc.), when remotely monitored and controlled via the network (Internet/PSTN) 1106, may be considered to be components of the Internet of Things. Smart home systems may include switches and/or sensors (e.g., the sensors 1114) connected to a central hub such as the smart-home hub device 1112, sometimes called a gateway, from which the system may be controlled with a user interface. The user interface may include any or all of a wall-mounted terminal (e.g., a keypad, a touchscreen, etc.), software installed on the client devices 1108, 1110 (e.g., a mobile application), a tablet computer or a web interface, often but not always via Internet cloud services. The home automation system may use one or more communication protocols, including either or both of wired and wireless protocols, including but not limited to Wi-Fi, X10, Ethernet, RS-485, 6LoWPAN, Bluetooth LE (BTLE), ZigBee, and Z-Wave.

The one or more sensors 1114 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

The one or more automation devices 1116 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the user's network 1104, the client devices 1108, 1110, the A/V recording and communication device 1102, the smart-home hub device 1112, the sensors 1114, and the automation devices 1116 may be referred to as a security system, which may be installed at a property or premises.

With further reference to FIG. 38, the system 1100 may also include various backend devices such as (but not limited to) storage devices 1120, backend server 1122, and backend APIs 1124 that may be in network communication (e.g., over the user's network 1104 and/or the network (Internet/PSTN) 1106) with the A/V recording and communication devices 1102, the hub device 1112, the client devices 1108, 1110, the sensors 1114, and/or the automation devices 1116. In some embodiments, the storage devices 1120 may be a separate device from the backend server 1122 (as illustrated) or may be an integral component of the backend server 1122. The storage devices 1120 may be similar in structure and/or function to the storage device 116 (FIG. 1). In addition, in some embodiments, the backend server 1122 and backend APIs 1124 may be similar in structure and/or function to the server 118 and the backend API 122 (FIG. 1), respectively.

With further reference to FIG. 38, the system 1100 may also include a security monitoring service 1126. The security monitoring service 1126 may be operated by the same company that manufactures, sells, and/or distributes the A/V recording and communication devices 1102, the hub device 1112, the sensors 1114, and/or the automation devices 1116. In other embodiments, the security monitoring service 1126 may be operated by a third-party company (e.g., a different company than the one that manufactured, sold, and/or distributed the A/V recording and communication devices 1102, the hub device 1112, the sensors 1114, and/or the automation devices 1116). In any of the present embodiments, the security monitoring service 1126 may have control of at least some of the features and components of the security system (e.g., the security monitoring service 1126 may be able to arm and/or disarm the security system, lock and/or unlock doors, activate and/or deactivate one or more of the sensors 1114 and/or the automation devices 1116, etc.). Once disarmed, the security system is in a disarmed mode. For example, the security monitoring service 1126 may operate and control their own client devices and/or network of servers/backend devices for monitoring and/or controlling security systems. In such an example, the A/V recording and communication devices 1102, the hub device 1112, the sensors 1114, and/or the automation devices 1116 may communicate with the client devices and/or one or more components of the network of servers/backend devices of the security monitoring service 1126 over the network (Internet/PSTN) 1106 (in some embodiments, via one or more of the components of the network of backend servers/backend devices 1118).

The system 1100 may also include one or more client devices 1108, 1110 (alternatively referred to herein as a "client device 1108, 1110"), which in various embodiments may be configured to be in network communication and/or associated with the A/V recording and communication device 1102, the hub device 1112, the automation device 1116, and/or the sensors 1114. The client devices 1108, 1110 may comprise, for example, a mobile phone such as a smartphone, or a computing device such as a tablet computer, a laptop computer, a desktop computer, etc. In some embodiments, the client devices 1108, 1110 may include a connected device, such as a smart watch, Bluetooth headphones, another wearable device, or the like. In such embodiments, the client devices 1108, 1110 may include a combination of the smartphone or other device and a connected device (e.g., a wearable device), such that alerts, data, and/or information received by the smartphone or other device are forwarded to the connected device, and one or more controls of the smartphone or other device may be input using the connected device (e.g., by touch, voice, etc.). The client devices 1108, 1110 may include any or all of the components and/or functionality of the client device 114 (FIG. 1) and/or the client device 2502 described herein. In some embodiments, one or more of the client devices 1108, 1110 may not be associated with the A/V recording and communication device 1102.

Figure 39:
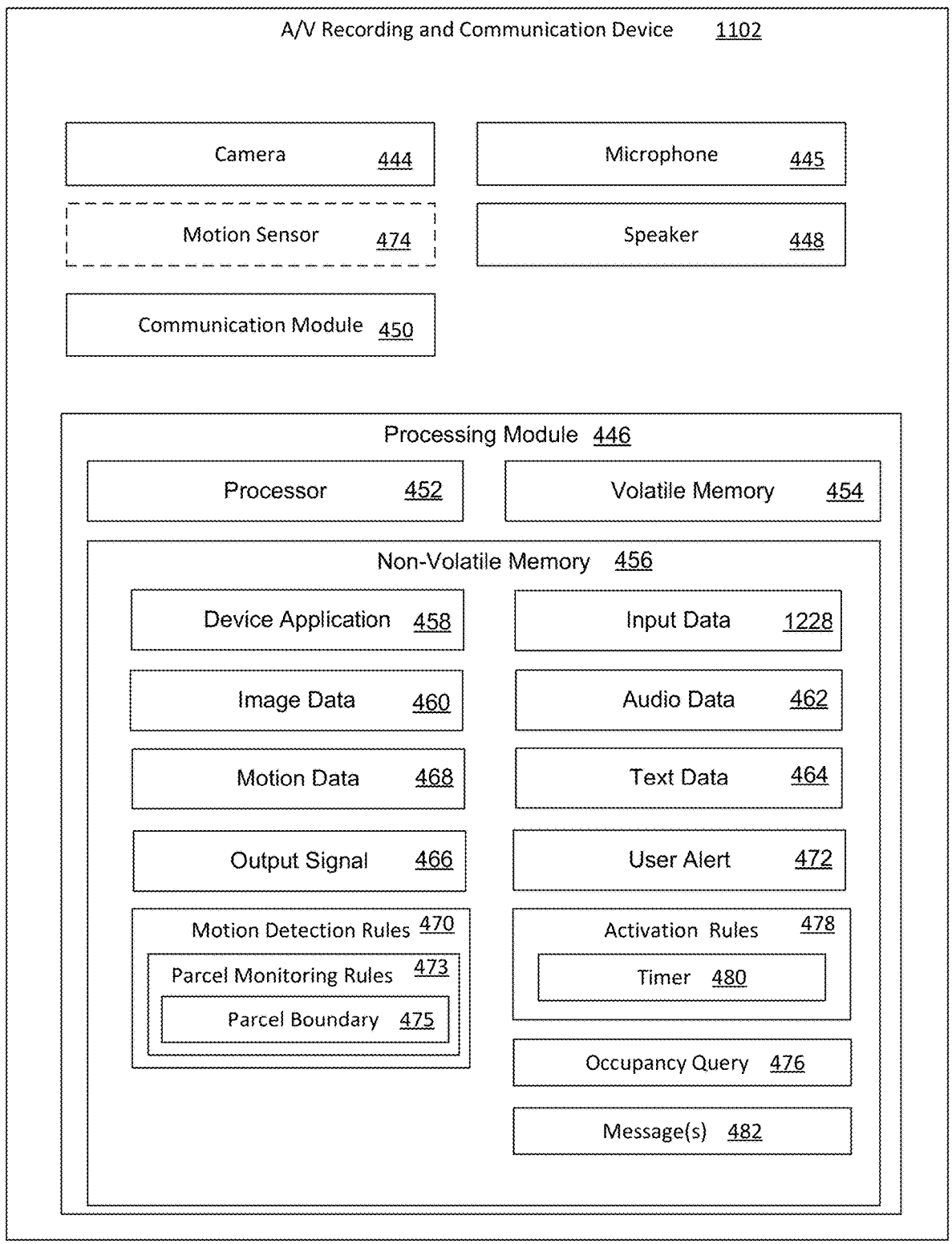
FIG. 39 is a functional block diagram of an A/V recording and communication device on which the present embodiments may be implemented according to various aspects of the present disclosure.

FIG. 39 is a functional block diagram illustrating an embodiment of the A/V recording and communication device 1102 according to various aspects of the present disclosure. The A/V recording and communication device 1102 may comprise a processing module 446 that is operatively connected to a camera 444, a microphone 445, a speaker 448, a motion sensor 474, and a communication module 450. The processing module 446 may comprise a processor 452, volatile memory 454, and non-volatile memory 456 that includes a device application 458. In various embodiments, the device application 458 may configure the processor 452 to capture image data 460 using the camera 444, audio data 462 using the microphone 445, input data 1228 using the button 148 (and/or the camera 444 and/or the motion sensor 474, depending on the embodiment), and/or motion data 468 using at least one of the camera 444 or the motion sensor 474. In some of the present embodiments, the device application 458 may also configure the processor 452 to generate text data 464 describing the image data 460, such as in the form of metadata, for example. In other embodiments, the text data 464 describing the image data 460 may be generated by a user using the client device 404, 406 associated with the A/V recording and communication device 1102. In addition, the device application 458 may configure the processor 452 to transmit the image data 460, the input data 1228, the audio data 462, the motion data 468, and/or the text data 464 to the client device 404, 406 using the communication module 450. In various embodiments, the device application 458 may also configure the processor 452 to generate and transmit an output signal 466 that may include the image data 460, the input data 1228, the audio data 462, the text data 464 and/or the motion data 468. In some of the present embodiments, the output signal 466 may be transmitted to a backend device, such as the backend server(s) 430, using the communication module 450, and the backend devices may transfer the output signal 466 to the client device 404, 406. In other embodiments, the output signal 466 may be transmitted directly to the client device 404, 406.

In further reference to FIG. 39, the image data 460 may comprise image sensor data such as (but not limited to) exposure values and data regarding pixel values for a particular sized grid. Further, the image data 460 may comprise converted image sensor data for standard image file formats such as (but not limited to) JPEG, JPEG 2000, TIFF, BMP, or PNG. In addition, the image data 460 may also comprise data related to video, where such data may include (but is not limited to) image sequences, frame rates, and the like. Moreover, the image data 460 may include data that is analog, digital, compressed, uncompressed, and/or in vector formats.

In some of the present embodiments, the image data 460 may also include facial recognition, facial detection, biometric recognition, object recognition, object detection, AIDC, and/or other information about the persons and/or objects in the image data 460. The facial recognition, facial detection, biometric recognition, object recognition, object detection, AIDC, and/or other information may be generated in response to using facial recognition software, facial detection software, object recognition, object detection, and/or biometric analysis software, for example, as described above. The facial recognition, facial detection, biometric recognition, object recognition, object detection, AIDC, and/or other information may be included in the image data 460 for analysis in some of the present embodiments.

The image data 460 may take on various forms and formats as appropriate to the requirements of a specific application in accordance with the present embodiments. As described herein, the term "record" may also be referred to as "capture" as appropriate to the requirements of a specific application in accordance with the present embodiments.

In further reference to FIG. 39, the motion data 468 may comprise data generated by a motion detector having motion detection rules 470. The motion detector may be the motion sensor 474 and/or the camera 444, depending on the specific embodiment. For example, in embodiments that use motion sensors 474 such as PIRs, the motion data 468 may include voltage data generated by the motion sensor 474 in response to the presence of infrared radiation. In some of the present embodiments, the motion data 468 may also comprise time-based and/or location-based information such as the amount of time a motion event is detected and/or the location of the motion event in the field of view of the motion sensor 474 and/or the field of view of the camera 444 (e.g., Zones 1-5 (FIG. 20), the location within one of the Zones 1-5, and/or the proximity to the A/V recording and communication device 1102). Dependent on the type of motion sensor 474 implemented in a given embodiment, the motion data 468 may include the data type (e.g., voltage) generated specific to the type of motion sensor 474 (e.g., PIR, microwave, acoustic, etc.). The motion sensor 474 of FIG. 34 is illustrated with dashed lines to indicate that the motion sensor 474 may not be a feature of the A/V recording and communication device 1102 and/or may not be used in certain embodiments (e.g., the A/V recording and communication device 130 of FIG. 3-13).

In embodiments where the A/V recording and communication device 1102 is similar to that of the A/V recording and communication device 130 of FIGS. 3-13, the motion data 468 may be generated solely by the camera 444. As such, the detection of a motion event, the determination of whether a motion event is caused by the movement of a person and/or object in a field of view of the A/V recording and communication device 1102, and/or the speed and/or location of a person and/or object in the field of view of the A/V recording and communication device 1102 may be determined using the motion data 468 generated by the camera 444, for example.

The motion data 468 may further include an estimated speed and/or direction data of the person and/or object that caused the motion event. For example, the motion data 468 may include an estimated speed of a person and/or object (e.g., a parcel) passing in a field of view of the motion sensor 474 and/or the camera 444. For another example, the motion data 468 may include a direction that a person and/or object in front of the motion sensor 474 and/or camera 444 is traveling, such as toward or away from the A/V recording and communication device 1102 or from within the parcel boundary 475. As described above, the direction of the movement of the parcel may be used in determining whether or not the removal of the parcel is authorized.

In some of the present embodiments, the motion data 468 may include information pertaining to a status of a parcel in the field of view of the motion detector (e.g., the camera 444 and/or the motion sensor 474). For example, the motion data 468 may include information about the movement of the parcel in the field of view of the motion detector, such as information of the parcel's movement within and from within the parcel boundary 475. As such, the motion detection rules 470 and/or the parcel monitoring rules 473 may include rules for generating the motion data 468 specific to the parcel and/or the parcel boundary 475. As a result, the motion data 468 may be different for each parcel that enters the field of view of the motion detector, as each parcel may have a unique parcel boundary 475, may be located in a unique location within the field of view of the motion detector, and/or may be a unique parcel shape and/or size, for example.

With further reference to FIG. 39, the motion detection rules 470 may include rules for generating motion data 468, analyzing motion data 468, and/or executing tasks and/or commands in response to the analysis of the motion data 468. The A/V recording and communication device 1102 may have motion detection rules 470 specific to persons and/or objects.

In some of the present embodiments, the motion detection rules 470 may include parcel monitoring rules 473 for monitoring parcels in the field of view of the motion detector (e.g., the camera 444 and/or the motion sensor 474). The parcel monitoring rules 473 may include rules specific to the parcel boundary 475. For example, the parcel monitoring rules 473 may adjust the motion detection rules 470 within the parcel boundary 475, such as by increasing the sensitivity of the motion detector within the parcel boundary 475. As an example, in embodiments using the motion sensor 474, any movement within the parcel boundary 475 may trigger a user alert 472. As another example, less movement may be required for triggering a user alert 472 when the movement occurs within the parcel boundary 475 than when the movement occurs outside of the parcel boundary 475. As another example, in embodiments using the camera 444 as the motion detector, the amount of change (e.g., changed pixels) within the parcel boundary 475 between successive frames of the image data 460 required to trigger the monitoring action may be less than the amount of change required outside of the parcel boundary 475. For example, any change within the parcel boundary 475 may trigger a determination that the parcel is being moved from within the parcel boundary, and may trigger the monitoring action.

Figure 52:
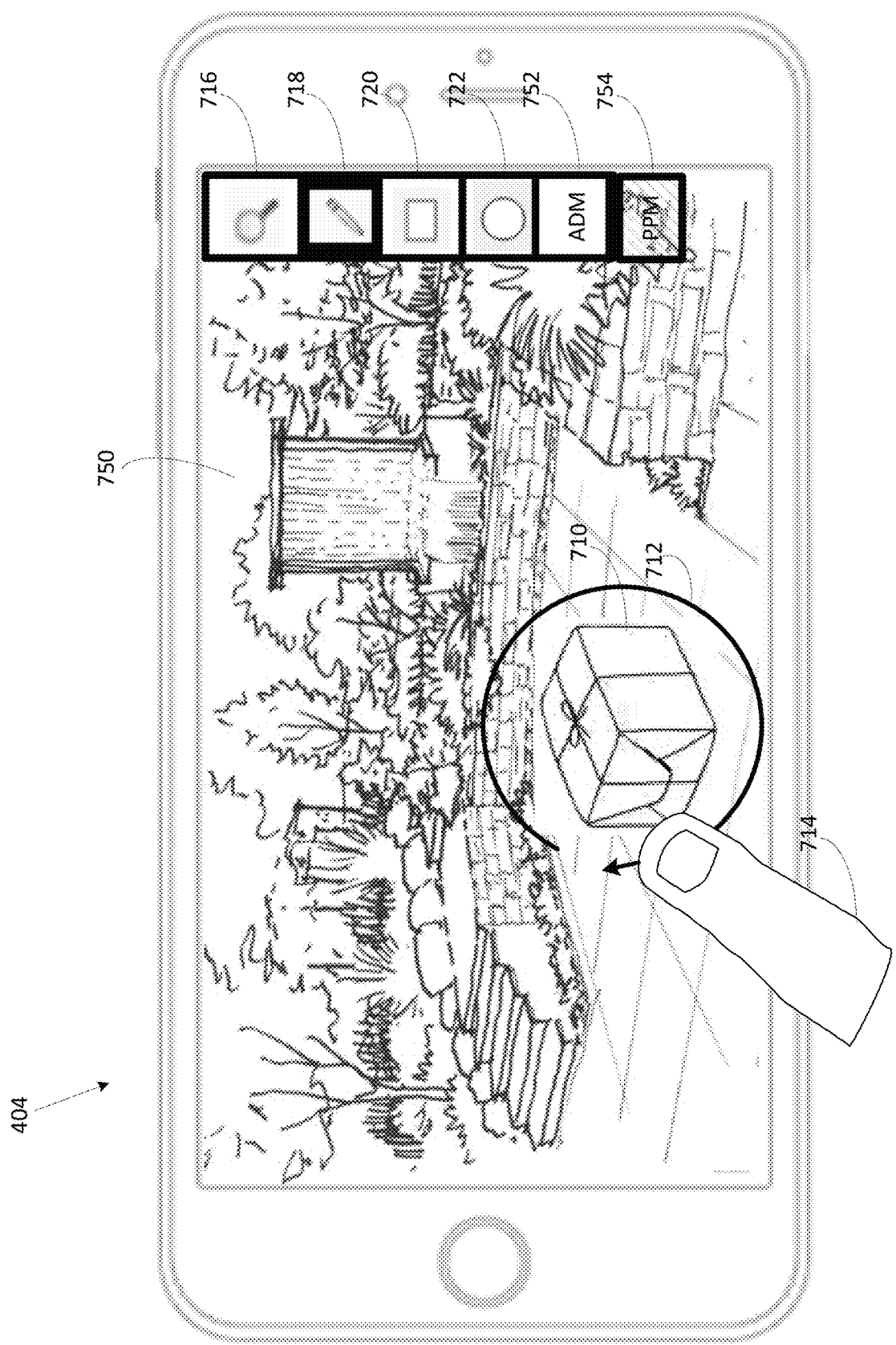
FIGS. 52-54 are example illustrations of graphical user interfaces (GUI) for creating parcel boundaries for deterring parcel theft with an A/V recording and communication device according to various aspects of the present disclosure.

The parcel boundary 475 may be an artificial boundary around a parcel in the image data 460. The parcel boundary 475 may be used in a "parcel protection mode," for example, as described above. In some of the present embodiments, the parcel boundary 475 may be created by the user, such as illustrated in FIG. 52. In FIG. 52, a parcel boundary 712 is created by a user using his or her finger 715 to draw the parcel boundary 712 around the parcel 711 on the display 731 of the client device 404. The user may first select the draw parcel boundary icon 719, and then proceed to draw the parcel boundary 712 on the display 731. In such an embodiment, the parcel boundary 712 may be any shape dictated by the shape drawn by the finger 715 of the user. In some of the present embodiments, when the user draws the parcel boundary 712, the parcel boundary 712 may be uneven, messy, and/or jagged, for example. In such embodiments, the parcel boundary 712 may be adjusted by the processor of the client device 404, 406 to conform to a more recognizable shape. For example, if the user draws a parcel boundary 712 resembling a circle, but uneven and messy, the parcel boundary may be updated to reflect a more conforming and/or seamless circle of similar size to the drawn parcel boundary 712. In some embodiments, the client device 404, 406 may not include a touchscreen. In such embodiments, the user may draw the parcel boundary 712 using any input device, rather than a finger 715. Non-limiting examples of input devices include a mouse, a trackball, a touchpad, a joystick, a pointing stick, a stylus, etc.

Figures 43, 44:
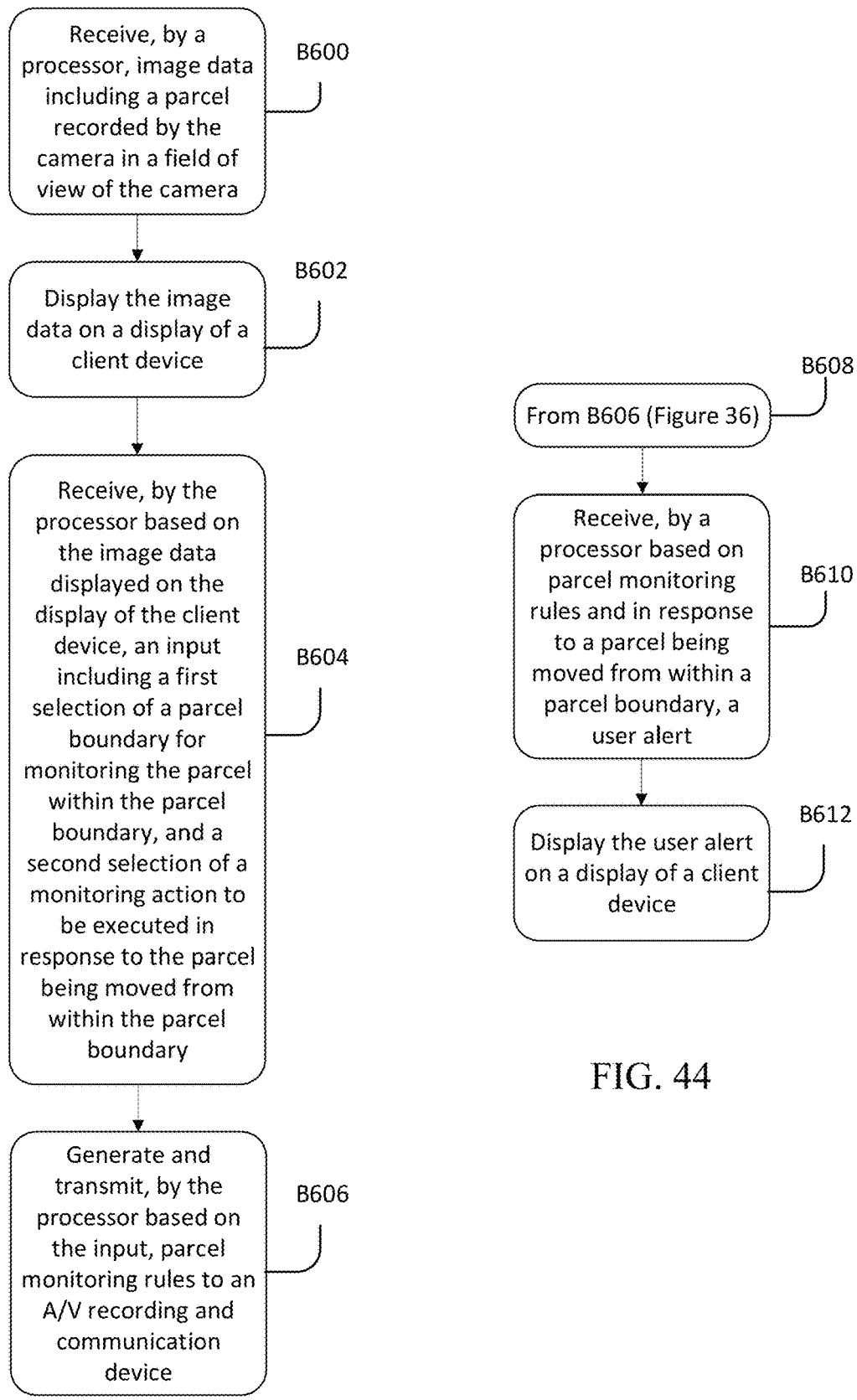
FIGS. 43-51 are flowcharts illustrating various embodiments of processes for deterring parcel theft with an A/V recording and communication device according to various aspects of the present disclosure.

In other embodiments, the user may be able to select a general parcel boundary shape such as a square or circle, for example, as illustrated in FIG. 43. In FIG. 43, the user may first select the circle parcel boundary icon 723 such that a circle may appear on the display 731. The user may then use his or her fingers 715 to maneuver the parcel boundary 712 around the display 731 and/or to adjust the size and/or shape of the parcel boundary 712 (e.g., enlarge the circle, lengthen the circle along an axis to create more of an oval shape, etc.). For example, the user may increase the size of the parcel boundary 712 to the size of the parcel boundary 712-2. The GUI may also include the square parcel boundary icon 721 for creating a square parcel boundary 475, and/or any other shaped parcel boundary icon.

Figure 53:
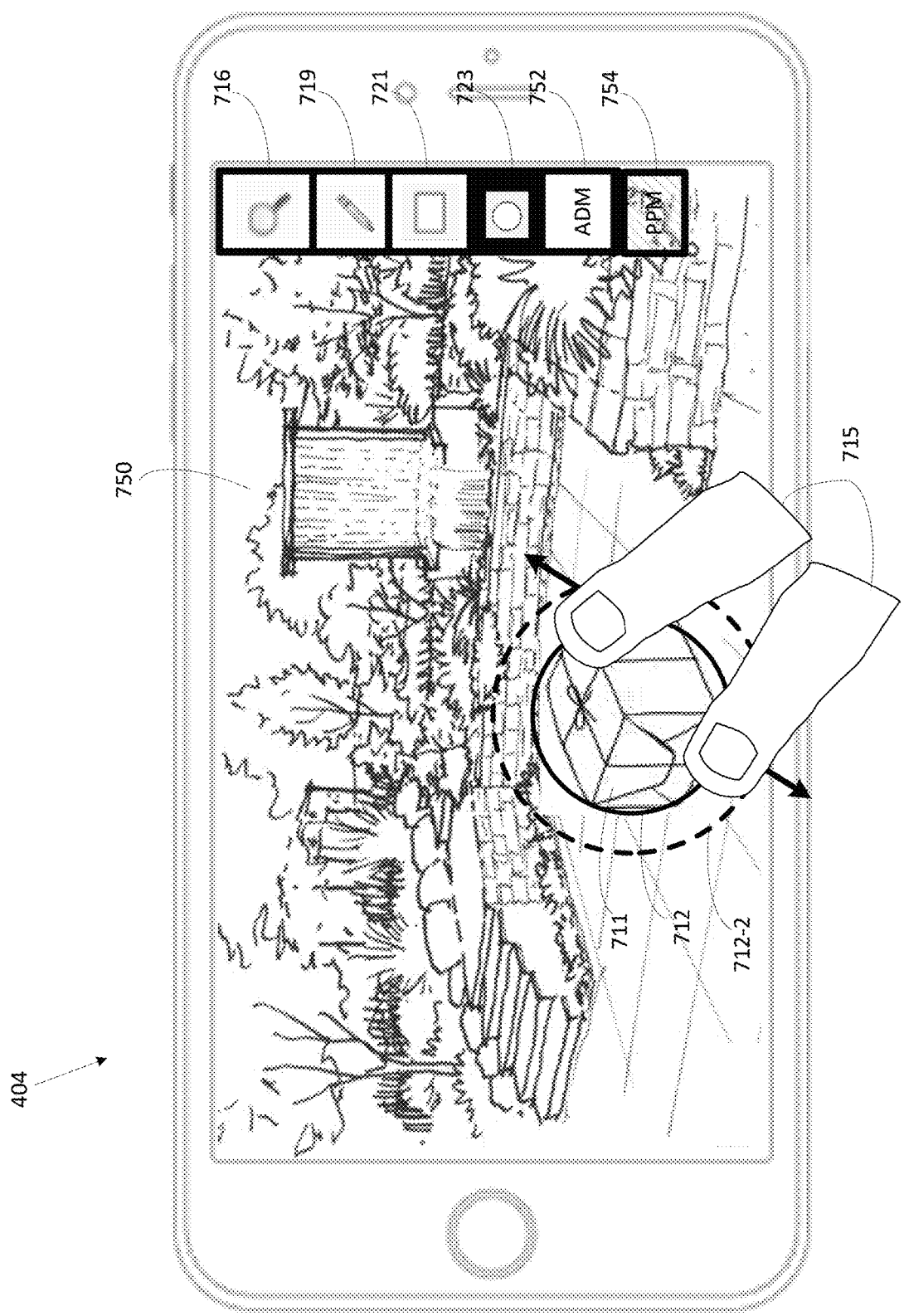
Figure 54:
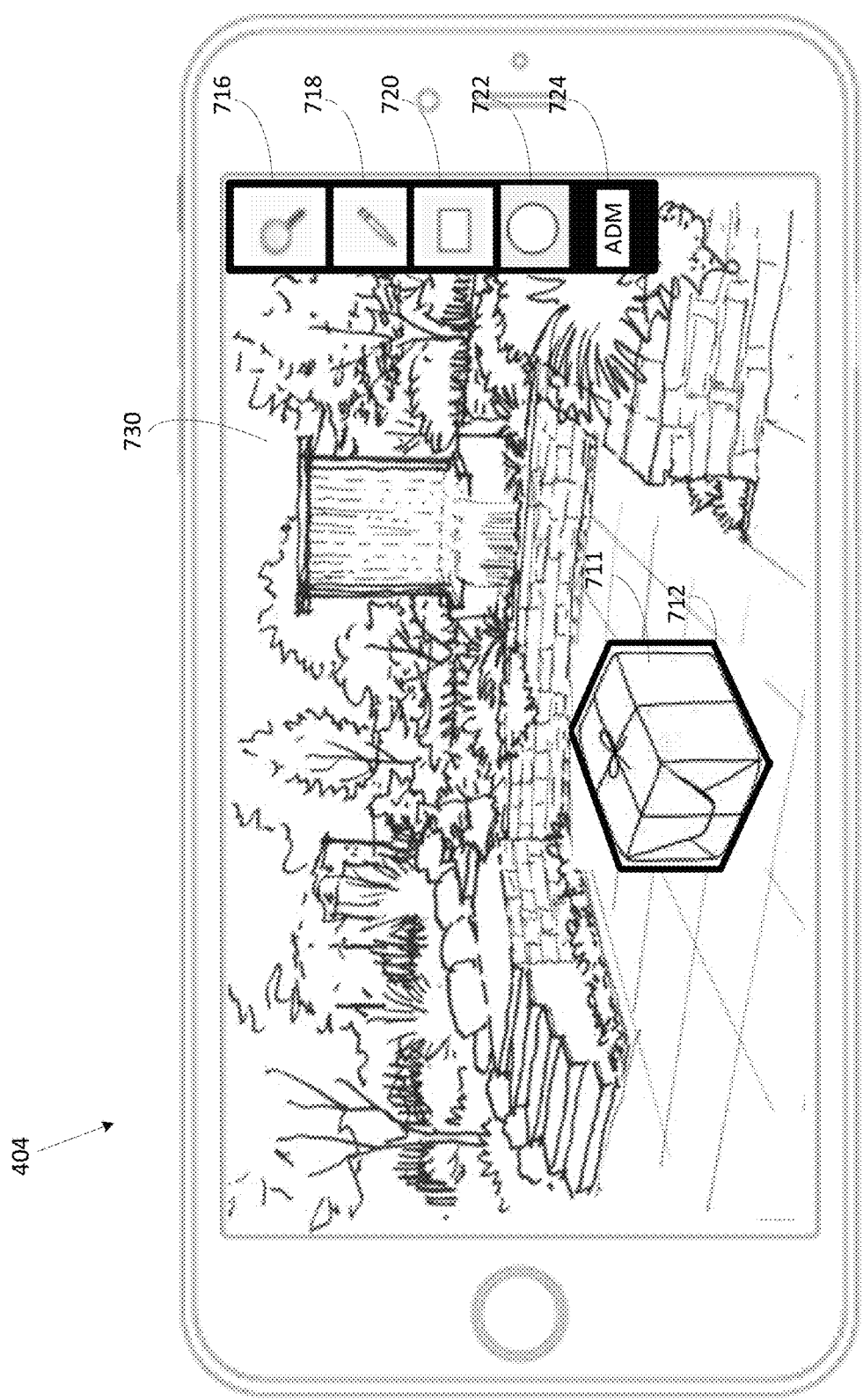

In yet another embodiment, the parcel boundary 475 may be generated automatically. In such embodiments, the user may select the automatic detection mode (ADM) icon 752, for example, as illustrated in FIG. 53. As a result, the processor of the client device 404 may locate, within the image data 460, the parcel 711 and generate the parcel boundary 712 around the parcel 711. The parcel boundary 712 may conform to the shape of the parcel 711, as illustrated in FIG. 53, or may be another shape, such as a circle or square, for example. In addition to selecting an ADM icon 752, the user may also be able to select the size of the parcel boundary 712. For example, the user may be able to select the size of the parcel boundary 712 relative to the parcel 711. In such an example, the user may be able to select a small, medium, or large parcel boundary 712. A small, or standard, parcel boundary 712 may conform substantially to the shape and size of the parcel 711, while medium and large parcel boundaries may be larger than, but substantially the same shape as, the parcel 711. For example, a medium parcel boundary 712 may be 50% to 75% larger than the parcel, and a large parcel boundary 712 may be 100% to 200% larger than the parcel. As such, the sizes of the parcel boundary 712 may correlate to the size of the parcel. In other embodiments, the sizes of the parcel boundary 712 may be the same irrespective of the parcel 711 size.

The automatic detection mode may use computer vision, such as object detection, similar to that described above, to determine the location of the parcel within the field of view of the A/V recording and communication device 1102. Once the location, size, and shape of the parcel is determined, the parcel boundary 475 may be generated around the parcel in the field of view of the A/V recording and communication device 1102.

In some examples, the determination of whether to implement a parcel protection mode may be based on various sensors. In some examples, a parcel protection mode may not be used if the security monitoring service 1126 indicates that a security system is armed or activated. The one or more alarm activation modes may include, but are not limited to, an armed stay mode, an armed away mode, an armed vacation mode, a disarmed mode, and/or other modes, which may be customized by a user. For example, in the armed stay mode, the sensors 1114 inside the property (e.g., the motion sensors) may be disarmed, while the sensors 1114 (e.g., the door sensors, the window sensors, etc.) outside and along a perimeter of the property and/or the A/V recording and communication devices 1102 may be armed. Additionally, during the armed stay mode, at least one of the automation devices 1116 (e.g., an exterior automation system) may be activated between certain hours, such as, but not limited to, 6:00 p.m. and 4:00 a.m. In the armed away mode, the sensors 1114 inside the property, the sensors 1114 outside and along the perimeter of the property, and/or the A/V recording and communication devices 1102 may be armed. Additionally, during the armed away mode, at least one of the automation devices 1116 (e.g., an interior and/or exterior automation system) may be activated between certain hours, such as, but not limited to, 6:00 p.m. and 4:00 a.m. In the armed vacation mode, the sensors 1114, the automation devices 1116, and/or the first A/V recording and communication devices 1102 may be armed and disarmed similar to the armed away mode, however, any alerts and security events may additionally or alternatively be sent to neighbors and/or law enforcement.

In the disarmed mode, all of the sensors 1114 and/or the automation devices 1114 may be disarmed. However, in the disarmed mode, one or more first A/V recording and communication devices 1102 (e.g., security cameras, floodlight cameras, video doorbells, etc.) may be in an active state for detecting motion and/or recording image data 1224 in the field of view of the one or more first A/V recording and communication devices 1102. In the custom mode, the user/owner of the first security system 1120 may configure each of the sensors 1114, the automation devices 1116, and/or the A/V recording and communication devices 1102. For example, in the custom mode, "Summer," the user/owner may arm each of the door sensors but disable the window sensors (e.g., where windows may be left open for air flow). In addition, the user/owner may activate each of the A/V recording and communication devices 1102 in the back yard to record between 8:00 am and 5:00 p.m. (e.g., because the kids may regularly play in the back yard during the Summer months).

If the security system is disarmed, a determination may be made whether or not to place the security system into a package protection mode. One aspect that may be used to make the determination is whether or not the property is unoccupied. Various technologies may be used to make the determination. For example, security system data, such as the image data 460, may be analyzed to determine if a person has entered the property but not left the property. In another example, security system data, such as the motion data 468, may be used to analyze movement of individuals inside or outside of the property and into and out of the property to determine if there are occupants. In a still further example, security system data, such as sensors such as microphones 446 that provide sound data, may be used to pick up sounds inside the property, the presence of which may indicate that there are occupants in the property. Other sensors such as, but not limited to, motion sensors may be used and are considered to be within the scope of the present disclosure.

Another aspect that may be used if the property is determined to be vacant is the amount of time from the exit of the last person from the property to the time the parcel has been delivered. For example, it is not unusual for a person to enter and leave a property multiple times during the day. Sometimes, the duration between when a person leaves and when the person comes back may be minimal, especially if the person is working around the outside of the house. Thus, in occasions in which the amount of time from the exit of the last person from the property to the time the parcel has been delivered is less than a threshold period of time, even though the property may not be occupied and the security system is disarmed, the parcel protection mode may not be entered. Reasons for establishing a threshold period of time may vary from application to application. One reason establishing a threshold period of time may be that if a person is working around the house and a parcel has been delivered, it may not be desirable for the person to constantly receive alerts regarding the parcel protection mode just because the person has not moved the parcel from the outside of the property to the inside of the property while the person is entering and leaving the property. Another reason for establishing a threshold period of time is that after a period of time with no activity in and out of the property, it may be a reasonable assumption that the property is unoccupied. For example, if the motion data 468 or the image data 460 indicates that there are no occupants entering or leaving the property for a period of a week, even if it cannot be determined that the property is unoccupied, that long of time would tend to indicate that the property is unoccupied. Processes and techniques to determine that the property is unoccupied are described below with regard to FIG. 40.

If the property is determined to be unoccupied, or in instances in which the property is occupied but package protection mode may still be desirable, a package protection mode request to place the A/V recording and communication device 1102 in package protection mode is transmitted to the client device 1110 or another device such as the client device 1108. The request may be rendered on the client device 1108, 1110 as an alert or other indication that a parcel has been delivered to the property and, based on various factors, the A/V recording and communication device 1102 is requesting that the A/V recording and communication device 1102 be placed in package protection mode. As described above, when placed in package protection mode, various motion settings are updated.

In some examples, if an input is received at the client device 1108, 1110 to place the A/V recording and communication device 1102 in package protection mode, the operation of the motion sensor 474 and camera 444 is modified, as explained by way of example below. In some examples, if a period of time expires after sending the package protection mode request and no response is received from the client device 1108, 1110, the A/V recording and communication device 1102 may be automatically placed in package protection mode. Having the A/V recording and communication device 1102 automatically enter the package protection mode after a period of time may have several advantages, especially if the client device 1108, 1110 is unattended, busy, or not in communication with a cellular or communication network.

In some examples, various activation rules 478 may be used to determine if the package protection mode request is generated and requested. Some activation rules 478 have been provided above. For example, in some configurations, a package protection mode request is not generated if the security system is disarmed. In other configurations, even if the security system is armed, other factors may be used to determine if package protection mode is desirable. For example, if the security system is disarmed and the parcel is not removed from the delivery location for a period of time as determined by a timer 480, the package protection mode request may be generated and transmitted even though the property may be occupied. For example, a package may have been delivered and the occupant may not be aware of the delivery of the parcel.

In some examples, a second A/V recording and communication device may be placed in package protection mode in addition to the A/V recording and communication device 1102. For example, the second A/V recording and communication device 1102 may be installed in a location that the parcel or package delivered is also visible. To provide redundancy or backup the A/V recording and communication device 1102, the second A/V recording and communication device 1102 may also, or in the alternative, be placed in the package protection mode. In some examples, the second A/V recording and communication device 1102 may not be associated with the security system of the A/V recording and communication device 1102. In these examples, the second A/V recording and communication device 1102 may be associated with a second security system (e.g., of a neighbor).

Figure 40:
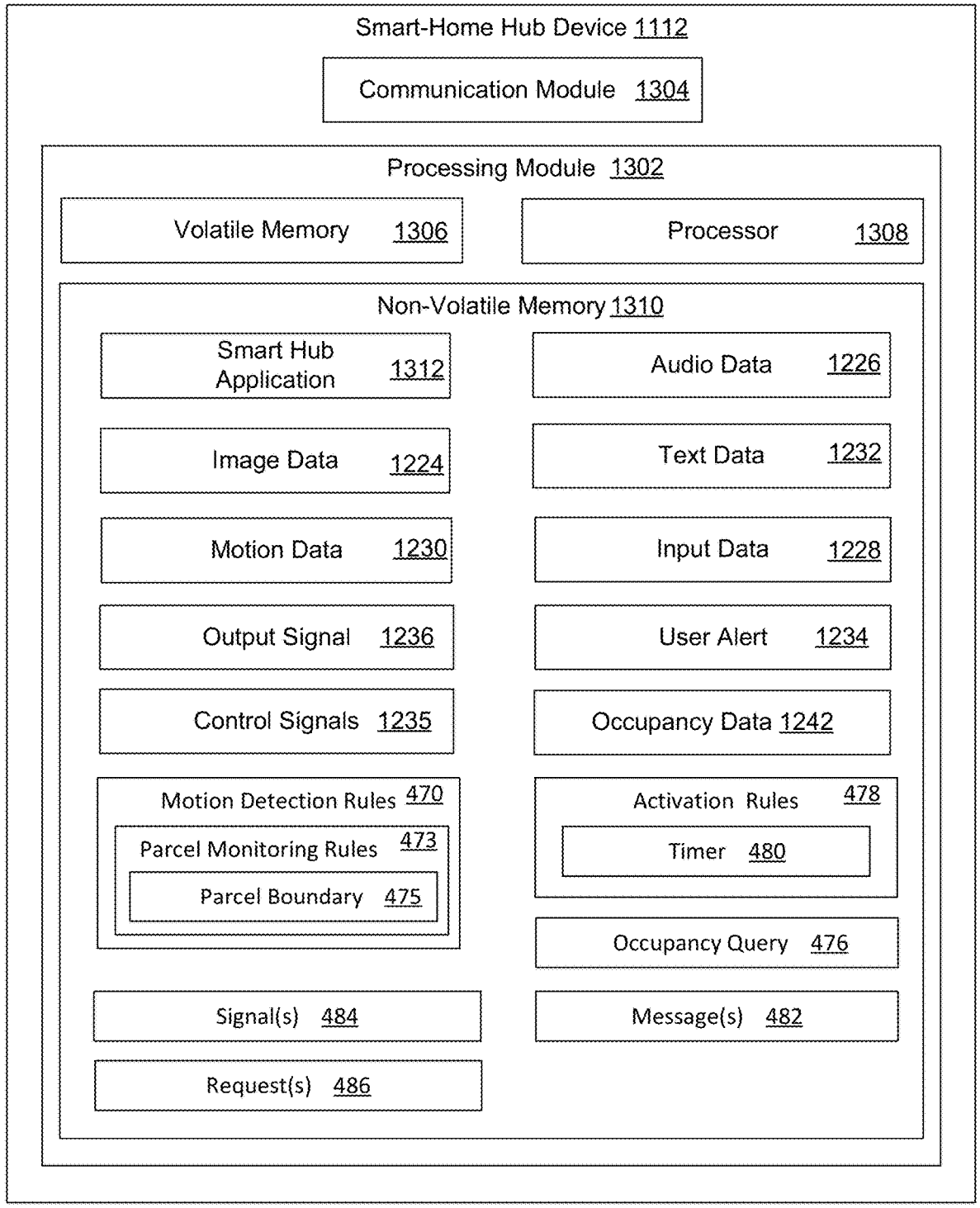
FIG. 40 is a functional block diagram illustrating one example embodiment of a smart-home hub device according to various aspects of the present disclosure.

FIG. 40 is a functional block diagram illustrating an embodiment of the smart-home hub device 1112 (alternatively referred to herein as the "hub device 1112") according to various aspects of the present disclosure. The hub device 1112 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 1106 for enabling remote control of the hub device 1112), and/or another similar device. The hub device 1112 may comprise a processing module 1302 that is operatively connected to a communication module 1304. In some embodiments, the hub device 1112 may comprise one or more of a camera (not shown), a microphone (not shown), and a speaker (not shown). The processing module 1302 may comprise a processor 1306, volatile memory 1308, and non-volatile memory 1310, which includes a smart-home hub application 1312.

In various embodiments, the smart-home hub application 1312 may configure the processor 1306 to receive sensor data from the sensors 1114 and/or the automation devices 1116. For example, the sensor data may include a current state (e.g., opened/closed for door and window sensors, motion detected for motion sensors, living room lights on/off for a lighting automation system, etc.) of each of the sensors 1114 and/or the automation devices 1116. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 1114 and/or the automation devices 1116 as well as any updates to the current state based on sensor triggers.

With further reference to FIG. 40, the smart-home hub application 1312 may configure the processor 1306 to receive the audio data 1226, the text data 1232, the image data 1224, the motion data 1230, the input data 1228, and/or the user alert 1234 from the A/V recording and communication device 1102/1102 (in some embodiments, via the backend server 1122) using the communication module 1304. For example, the hub device 1112 may receive and/or retrieve (e.g., after receiving a signal from the A/V recording and communication device 1102 that the A/V recording and communication device 1102 has been activated) the image data 1224, the input data 1228, and/or the motion data 1230 from the A/V recording and communication device 1102 and/or the backend server 1122 in response to motion being detected by the A/V recording and communication device 1102. In addition, the smart-home hub application 1312 may configure the processor 1306 to receive control signals 1235 from the client device 1108, 1110.

As described herein, at least some of the processes of the A/V recording and communication device 1102/1102, the backend server 1122, and/or the client device 1108, 1110 may be executed by the hub device 1112. For example, without limitation, a user alert 1234 may be generated by the processor 1306 and transmitted, using the communication module 1304, to the client devices 1108, 1110, a client device associated with emergency response personnel, the backend server 1122, and/or the hub device 1112. For example, in response to detecting motion using the camera 1204 and/or the motion sensor 1208, the hub device 1112 may generate and transmit the user alert 1234. In some of the present embodiments, the user alert 1234 may include at least the image data 1224, the audio data 1226, the text data 1232, and/or the motion data 1230. Additionally, or alternatively, in some embodiments, the user alert 1234 may include an indication that the hub device 1112 detected an occupant within a property that the hub device 1112 is monitoring. For example, the user alert 1234 may indicate a number of occupants, an identification of one or more occupants, a property of one or more occupants within the property.

The hub device 1112 further stores occupancy data 1242 in the non-volatile memory 1310. The occupancy data 1242 may be generated by receiving inputs from other data sources. For example, the motion data 1230 of the hub device 1112 may be used to generate, and/or may include, the occupancy data 1242. In other examples, biometric information may be used to generate the occupancy data 1242. For example, information about a person entering or inside a property may be gleaned using technologies such as, but not limited to, fingerprints, palm veins, facial recognition, three-dimensional facial recognition, skin texture analysis, DNA, palm prints, hand geometry, iris recognition, retina recognition, odor/scent recognition, typing rhythm, gait, and voice recognition. The occupancy data 1242 may also be generated using property-based or communication technologies. For a first example, a cellular phone used by an occupant may register or connect with the Bluetooth chip 840, indicating the presence of at least the cellular device within the property. For a second example, the occupancy data 1242 may indicate geographic location(s) of the client device 1108, 1110. In some examples, the occupancy data 1242 may be generated using, or include, the image data 1224 generated by the A/V recording and communication device 1102.

As described herein, at least some of the processes of the A/V recording and communication device 1102, the backend server 1122, and/or the client device 1108, 1110 may be executed by the hub device 1110. For example, the hub device 1110 may be used to control one or more devices, such as the A/V recording and communication device 1102, connected in a system, such as the system 1100. In some examples, there may be reasons for placing the A/V recording and communication device 1102 in a package protection mode if a property to which a parcel is delivered is unoccupied or the occupants are unable to attend to the parcel. In these examples, the hub device 1110 may receive information that a parcel has been delivered to a property and that the property is unoccupied. The hub device 1110 may use the processor 1308 to determine the occupancy or use data, such as the occupancy data 1242, to determine that a property is unoccupied.

In some examples, to determine that the property is unoccupied, the hub device 1112 may analyze the image data 1224 (e.g., occupancy data 1242) to determine that the image data 1224 depicts that occupants are not located at the property (e.g., not located within and/or outside of the property). In some examples, to determine that the property is unoccupied, the hub device 1112 may analyze the image data 1224 (e.g., occupancy data 1242) to determine that the image data 1224 depicts occupants leaving the property, but the image data 1224 does not depict the occupants returning to the property. In some examples, to determine that the property is unoccupied, the hub device 1112 may analyze motion data 1230 (e.g., occupancy data 1242) to determine that motion has not been detected at the property (e.g., motion has not been detected within and/or outside of the property). In some examples, to determine that the property is unoccupied, the hub device 1112 may determine that the security system is operating in one or more specific modes, such as the armed away mode.

In some examples, to determine that the property is unoccupied, the hub device 1112 may analyze audio data (e.g., occupancy data 1242) to determine that sounds at the property indicate that the property is unoccupied. For example, the hub device 1112 may determine, based on the analysis, that the audio data 1226 does not represent user speech at the property. In some examples, to determine that the property is unoccupied, the hub device 1112 may utilize the geographic location(s) of the client devices 1108, 1110 to determine that the client device 1108, 1110 are located outside of the property and/or located a threshold distance from the property. The threshold distance may include, but is not limited to, one hundred feet, five hundred feet, one thousand feet, one mile, and/or the like.

In some examples, to determining that the property is unoccupied, the hub device 1112 may utilize image data 460 and/or motion data 1230 generated by a second A/V recording and communication device 1102. For example, the hub device 1112 may transmit, using the communication module 1304, an occupancy query 476 to the second A/V recording and communication device 1102. The hub device 1112 may then receive, using the communication module 1304, image data 460 and/or motion data 1230 generated by the second A/V recording and communication device 1102. The hub device 1112 may then analyze the image data 460 and/or the motion data 1230 (e.g., occupancy data 1242), using the processes above, to determine that the property is unoccupied.

In some examples, when determining that a property is unoccupied, the hub device 1112 may utilize one or more threshold periods of time. A threshold period of time may include, but is not limited to, one minute, five minutes, ten minutes, thirty minutes, and/or the like. For example, in any of the examples above, based on determining that the parcel is at the property, the hub device 1112 may determine that the occupancy data 1242 indicates that the property has been occupied for a threshold period of time. For a second example, after determining that the parcel is at the property, the hub device 1112 may continue to analyze the occupancy data 1234 to determine that the property remains unoccupied for a threshold period of time.

Based on determining that the parcel is at the property and the property is unoccupied (e.g., for the threshold period of time, the hub device 1112 may transmit, using the communication module 1304, a request 486 to the client device 1108, 1110, where the request 486 is to place the A/V recording and communication device 1102 (and/or another A/V recording and communication device 1102) in the package protection mode. The hub device 1110 may then receive, using the communication module 1304, a message 482 from the client device 1108, 1110, where the message 482 indicates (e.g., instructs the hub device 1112) to place the A/V recording and communication device 1102 in the package protection mode. The hub device 1110 may thereafter place the A/V recording and communication device 1102 in the package protection mode. For example, the hub device 1112 may transmit, using the communication module 450, a signal 484 to the A/V recording and communication device 1112, where the signal 484 is configured to cause the A/V recording and communication device 1102 to operate in the package protection mode.

In some examples, the hub device 1112 may take one or more additional actions based on receiving the message 482. For example, the hub device 1112 may transmit, using the communication module 1304, a second signal 484 to a second A/V recording and communication device 1102. The second signal 484 may be configured to cause the second A/V recording and communication device 1102 to operate in the package protection mode. In some examples, the message 482 may indicate to place the second A/V recording and communication device 1102 in the package protection mode. In some examples, the message 482 may not indicate to place the second A/V recording and communication device 1102 in the package protection mode.

In some examples, if the hub device 1112 does not receive the message 482 from the client device 1108, 1110 for a threshold period of time, then the hub device 1112 may take one or more actions. The threshold period of time may include, but is not limited to, one minute, five minutes, ten minutes, thirty minutes, and/or the like. For a first example, the hub device 1112 may transmit, using the communication module 1304, a second request 486 to a second client device (e.g., a second client device 1108, 1110), where the second request 486 is to place the A/V recording and communication device 1102 in the package protection mode. For a second example, the hub device 1112 may automatically transmit, using the communication module 1304, the signal 484 to the A/V recording and communication device 1102 that causes the A/V recording and communication device 1102 to operate in the package protection mode.

Figure 41:
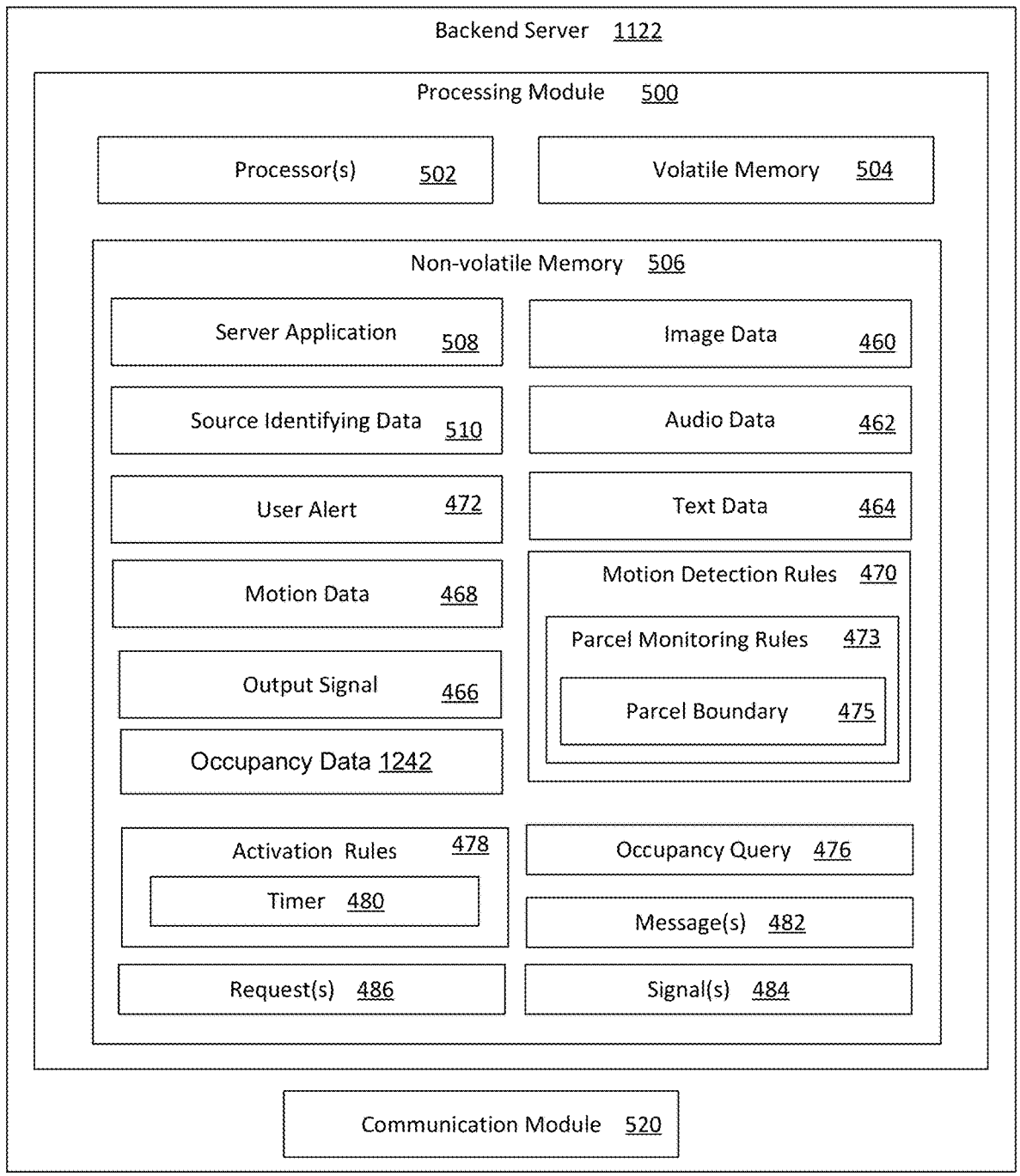
FIG. 41 is a functional block diagram of a backend device on which the present embodiments may be implemented according to various aspects of the present disclosure.

FIG. 41 is a functional block diagram illustrating one embodiment of the backend server(s) 1122 according to various aspects of the present disclosure. The backend server(s) 1122 may comprise a processing module 500 comprising a processor 502, volatile memory 504, a communication module 520, and non-volatile memory 506. The communication module 520 may allow the backend server(s) 1122 to access and communicate with devices connected to the network (Internet/PSTN) 410. The non-volatile memory 506 may include a server application 508 that configures the processor 502 to receive the image data 460, the audio data 462, the text data 464, and/or the motion data 468 received from the A/V recording and communication device 1102 in the output signal 466, for example. In various embodiments, and as described below, the backend server(s) 1122 may be configured to receive, from the client device 404, 406, a first selection of a parcel boundary 475 for monitoring a parcel within the parcel boundary 475, and a second selection of a monitoring action (e.g., generating the user alert 472) to be executed in response to the parcel being moved from within the parcel boundary 475, and generate and transmit, based on the first and second selections, the parcel monitoring rules 473 to the A/V recording and communication device 1102. In various embodiments, the backend server(s) 1122 may be configured to transmit an occupancy query 476 or a package protection mode request from the A/V recording and communication device 1102.

In further reference to FIG. 41, the non-volatile memory 506 may also include source identifying data 510 that may be used to identify the A/V recording and communication device 1102. In some of the present embodiments, identifying the A/V recording and communication device 1102 may include determining the location of the A/V recording and communication device 1102, which location may be used to determine which client device(s) 1108, 1110 will receive the user alert 472 and/or the image data 460. In addition, the source identifying data 510 may be used to determine location(s) of the client device(s) 1108, 1110. In some of the present embodiments, the server application 508 may further configure the processor 502 to generate and transmit a report signal (not shown) to a third-party client device (not shown), which may be associated with a law enforcement agency, for example. The report signal sent to the law enforcement agency may include information indicating an approximate location of where the image data 460 was captured, which may assist the law enforcement agency with apprehending the criminal perpetrator shown in the image data 460.

As described herein, at least some of the processes of the A/V recording and communication device 1102, the hub device 111, and/or the client device 1108, 1110 may be executed by the backend server 1122. For example, the backend server 1122 may be used to control one or more devices, such as the hub device 1112, the A/V recording and communication device 1102, connected in system, such as the system 1100. In some examples, there may be reasons for placing the A/V recording and communication device 1102 in a package protection mode if a property to which a parcel is delivered is unoccupied or the occupants are unable to attend to the parcel. In these examples, the backend server 1122 may determine that parcel has been delivered to the property. In some examples, the backend server 1122 makes the determination based on analyzing image data 460 and, based on the analysis, determines that the image data 460 depicts the parcel at the property. In some examples, the backend server 1122 makes the determination based on receiving information indicating that the parcel is at the property.

The backend server 1112 may then utilize the occupancy data 1242 to determine that the property is unoccupied and/or has been unoccupied for a threshold period of time. Based on the determination, the backend server 1122 may transmit, using the communication module 520 and to the client device 1108, 1110, a request 486 to place the A/V recording and communication device 1102 in the package protection mode. The backend server 1122 may then receive, using the communication module, a message 482 from the client device 1108, 1110, the message 482 indicating (and/or instructing the backend server 1122) to place the A/V recording and communication device 1102 the package protection mode. The backend server 1122 may thereafter place the A/V recording and communication device 1102 in the package protection mode. For example, the backend server 1122 may transmit, using the communication module 520, a signal 484 to the A/V recording and communication device 1122, where the signal 484 is configured to cause the A/V recording and communication device 1122 to operate in the package protection mode.

In the illustrated embodiment of FIGS. 39 and 41, the various components including (but not limited to) the processing modules 446, 500, the communication module 450, and the communication module 520 are represented by separate boxes. The graphical representations depicted in each of FIGS. 23-24 are, however, merely examples, and are not intended to indicate that any of the various components of the A/V recording and communication device 1102 or the backend server(s) 1122 are necessarily physically separate from one another, although in some of the present embodiments they might be. In other embodiments, however, the structure and/or functionality of any or all of the components of A/V recording and communication device 1102 may be combined. In addition, in some of the present embodiments the communication module 450 may include its own processor, volatile memory, and/or non-volatile memory. Further, the structure and/or functionality of any or all of the components of the backend server(s) 1122 may be combined. In addition, in some of the present embodiments the communication module 520 may include its own processor, volatile memory, and/or non-volatile memory.

The hub device 1112 and/or the backend server 1122 may alternatively be referred to herein as "network devices."

Figure 42:
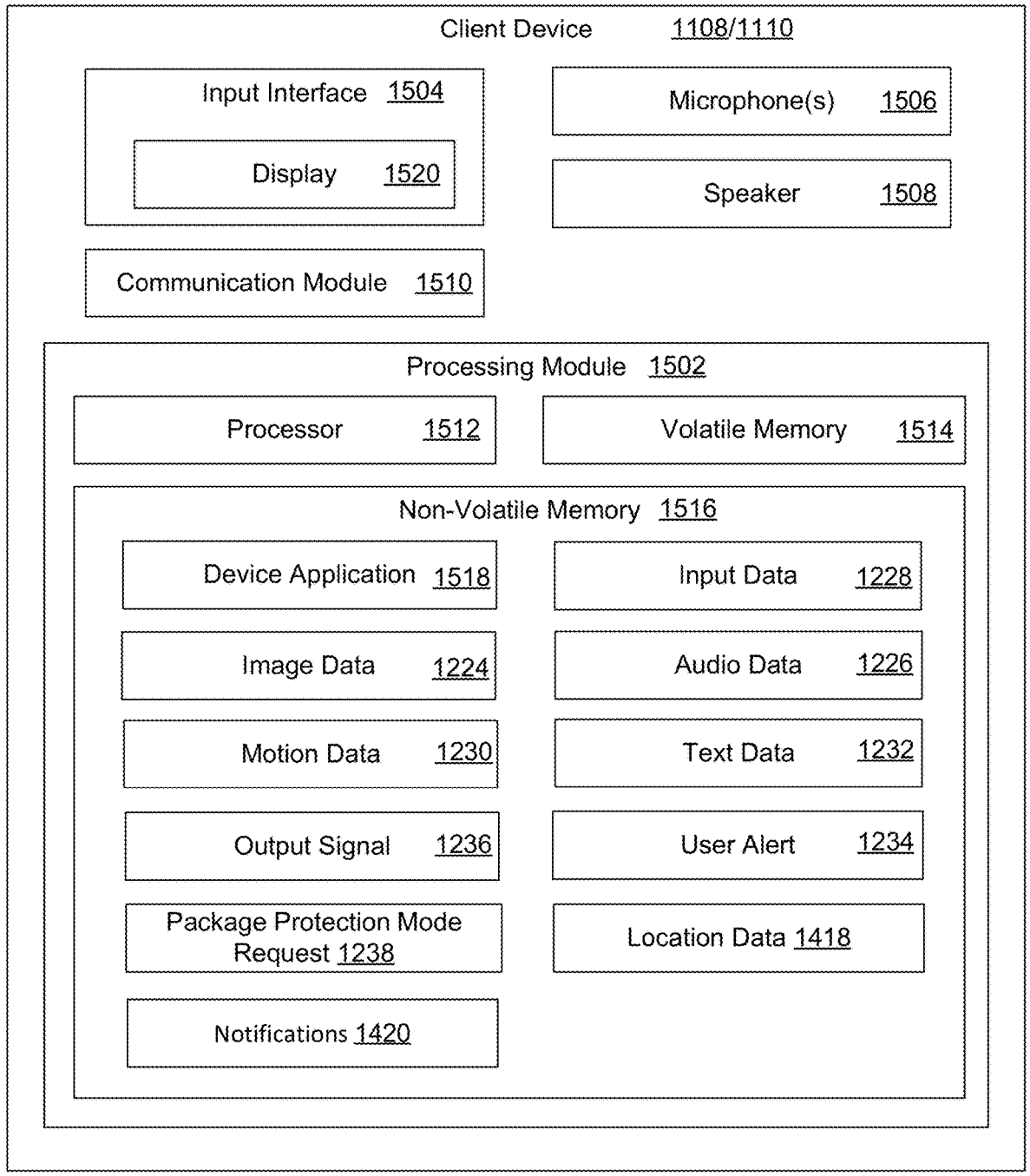
FIG. 42 is a functional block diagram of a client device on which the present embodiments may be implemented according to various aspects of the present disclosure.

Now referring to FIG. 42, FIG. 42 is a functional block diagram illustrating one embodiment of a client device 1108, 1110 according to various aspects of the present disclosure. The client device 1108, 1110 may comprise a processing module 1502 that is operatively connected to an input interface 1504, microphone(s) 1506, a speaker 1508, and a communication module 1510. The client device 1108, 1110 may further comprise a camera (not shown) operatively connected to the processing module 1502. The processing module 1502 may comprise a processor 1512, volatile memory 1514, and non-volatile memory 1516, which includes a device application 1518. In various embodiments, the device application 1518 may configure the processor 1512 to receive input(s) to the input interface 1504 (e.g., requests for access to the A/V recording and communication device 1102) and/or to capture the audio data 1240 using the microphone(s) 1506, for example. In addition, the device application 1518 may configure the processor 1512 to receive the input data 1228, the image data 1224, the audio data 1226, the output signal 1236, and/or the user alert 1234 from one or more of the A/V recording and communication device 1102, the hub device 1112, or the backend server 1122.

With further reference to FIG. 42, the input interface 1504 may include a display 1520. The display 1520 may include a touchscreen, such that the user of the client device 1108, 1110 may provide inputs directly to the display 1520 (e.g., a request for access to the A/V recording and communication device 1102). In some embodiments, the client device 1108, 1110 may not include a touchscreen. In such embodiments, and in embodiments where the client device 1108, 1110 includes the touchscreen, the user may provide an input using any input device, such as, without limitation, a mouse, a trackball, a touchpad, a joystick, a pointing stick, a stylus, etc.

In some of the present embodiments, the processor 1512 of the client device 1108, 1110 may receive, using the communication module 1510, the package protection mode request 1238. The device application 1518 may configure the processor 1512 to cause the display 1520 to display the package protection mode request 1238 (or information describing the package protection mode request 1238) and/or a suggestion. In response to receiving input from the user including an acceptance or a rejection of the package protection mode request 1238, the client device 1108, 1110 may transmit, using the communication module 1510, an indication of acceptance or rejection of the package protection mode request 1238. The indication may be transmitted to the A/V recording and communication device 1102, the hub device 1112, and/or the backend server 1122.

In some embodiments, the device application 1518 may configure the processor 1512 to cause the display 1520 to display the image data 1224 and/or enable a user to indicate a state associated with the object 1128 depicted in the image data 1224. For example, a user may view first image data depicting a garage door that is open and second image data depicting the garage door that is closed. The user may designate the first image data as being associated with an open state (e.g., "open garage door") and designate the second image data as being associated with a closed state (e.g., "closed garage door"). In response to receiving input from the user, the client device 1108, 1110 may transmit, using the communication module 1510, an indication that the first image data is associated with the open state and the second image data as associated with the closed state.

Further, in some embodiments, the device application 1518 may configure the processor 1512 to enable a user to designate a motion zone, such as a package protection mode described below. For example, the device application 1518 may configure the processor 1512 to cause the display 1520 to display the image data 1224. While displaying the image data 1224, a user may provide input (e.g., touch input, mouse input, etc.) that draws or otherwise positions visual representations on the image data 1224 to represent a motion zone. As such, the user may define the motion zone to correspond to a region within the field of view of the camera 1204 of the A/V recording and communication device 1102. In some embodiments, the user may provide a tag (e.g., name) for the motion zone. The client device 1108, 1110 may transmit, using the communication module 1510, the motion zone and/or the tag to the A/V recording and communication device 1102, the hub device 1112, and/or the backend server 1122.

Moreover, in some embodiments, the device application 1518 may configure the processor 1512 to cause the display 1520 to display a dashboard. The dashboard may include information identifying one or more objects 1128 within the field of view of the camera 1204, a state of the object 1128, etc. For example, the dashboard may display a list of objects 1128 within the field of view of the camera 1204 along with a state of each of the objects 1128 (e.g., parcel, garage door open, side gate closed, car parked in driveway, front door open, wood pile full, etc.). In some embodiments, information regarding the objects 1128 and/or states of the objects 1128 are overlaid onto the image data 1224 (e.g., identifying information and/or a state of the object 1128 appears next to the object 1128).

In the illustrated embodiment of FIGS. 39-42, the various components including (but not limited to) the processing modules 1202, 1302, 1404, 1502 and the communication modules 1212, 1304, 11102, 1510 are represented by separate boxes. The graphical representations depicted in each of FIGS. 39-42 are, however, merely examples, and are not intended to indicate that any of the various components of the A/V recording and communication device 1102, the hub device 1112, the backend server 1122, and/or the client device 1108, 1110 are necessarily physically separate from one another, although in some embodiments they might be. In other embodiments, however, the structure and/or functionality of any or all of the components of each of the A/V recording and communication device 1102, the hub device 1112, the backend server 1122, and/or the client device 1108, 1110 may be combined. As an example, the structure and/or functionality of any or all of the components of the A/V recording and communication device 1102 may be combined. In addition, in some embodiments, the communication module 1212 may include its own processor, volatile memory, and/or non-volatile memory. As a second example, the structure and/or functionality of any or all of the components of the hub device 1112 may be combined. In addition, in some embodiments, the communication module 1304 may include its own processor, volatile memory, and/or non-volatile memory. As a third example, the structure and/or functionality of any or all of the components of the backend server 1122 may be combined. In addition, in some embodiments, the communication module 11102 may include its own processor, volatile memory, and/or non-volatile memory. As a fourth example, the structure and/or functionality of any or all of the components of the client device 1108, 1110 may be combined. In addition, in some embodiments, the communication module 1510 may include its own processor, volatile memory, and/or non-volatile memory.

The client device 1108, 1110 may also include location data 1418. The location data 1418 may be the location of the client device, such as the location of the client device 1108, 1110 using global positioning system coordinates or other location technologies. In addition, the location data 1418 may be the location of the client device 1108, 1110 in reference to a property. for example, the location data 1418 may indicate that the client device 1108, 1110 is not at or near the property to which a parcel has been delivered.

Now referring to FIG. 43, FIG. 43 is a flowchart illustrating one embodiment of a process for deterring parcel theft with an A/V recording and communication device according to various aspects of the present disclosure. At block B600, the process receives, by a processor, image data including a parcel recorded by the camera in a field of view of the camera. For example, a processor (e.g., the processor 801 of FIG. 55) of the client device 1108, 1110 may receive the image data 460 including a parcel recorded by the camera 444 in a field of view of the camera 444.

At block B602, the process displays the image data on a display of a client device. For example, the processor of the client device 1108, 1110 may display the image data 460 on the display of the client device 1108, 1110 (e.g. display 1520 of FIG. 42). The image data 460 on the display may be a visual representation of the field of view of the camera 444. The image data 460 may include the parcel, such as the parcel 711 of FIGS. 52-54. The image data 460 displayed on the display may be a still image captured by the camera 444, a live, streaming, and/or recorded video captured by the camera 444, and/or a frame of a video recorded by the camera 444. For example, once the A/V recording and communication device 1102 determines a parcel is present, the camera 444 may capture a still image of the field of view of the camera 444 including the parcel for sending to the client device 1108, 1110 to have the parcel boundary 475 created. In another example, a video feed may be sent to the display of the client device 1108, 1110, and the user may be able to, based on the presence of the parcel, enter the parcel protection mode whereby the user may create the parcel boundary 475. In such an example, the user may be able to freeze the video at a certain frame to create the parcel boundary 475. In another example, the processor of the client device 1108, 1110 may freeze the video at a frame that includes the parcel for the user to create the parcel boundary 475. In yet another example, the user may be able to create the parcel boundary 475 while viewing the live streaming video. This example may be useful where the field of view of the camera 444 does not change.

With further reference to FIG. 43, the process, at block B604, receives, by the processor based on the image data displayed on the display of the client device, an input including a first selection of a parcel boundary for monitoring the parcel within the parcel boundary, and a second selection of a monitoring action to be executed in response to the parcel being moved from within the parcel boundary. For example, the processor of the client device 1108, 1110, based on the image data 460 (e.g., a visual representation of the field of view of the camera 444 including the parcel), receives an input including a first selection of the parcel boundary 475 for monitoring the parcel within the parcel boundary 475, and a second selection of a monitoring action (e.g., generating a user alert) to be executed in response to the parcel being moved from within the parcel boundary 475.

The selection of the parcel boundary 475 may be done by the user using any of the methods described above with respect to FIGS. 42-44. For example, as illustrated in FIG. 52, the user may draw the parcel boundary 712 around the parcel 712 using his or her finger 715 on the display 731 of the client device 1108, 1110. As another example, as illustrated in FIG. 43, the user may fit a parcel boundary 712 of a particular shape, such as a circle, square, rectangle, triangle, or other shape, around the parcel 711 using his or her fingers 715 on the display 731. In yet another example, as illustrated in FIG. 52, the user may select automatic detection mode (ADM) to have the processor of the client device 1108, 1110 automatically generate the parcel boundary 712 around the parcel 711 on the display 731 of the client device 1108, 1110. In such an example, object detection and/or recognition may be used, as described above, to locate the parcel in the image data 460 for generating the parcel boundary 475.

The second selection of the monitoring action to be executed in response to the parcel being moved from within the parcel boundary 475 may include a selection of the generation of a user alert, the sounding of an alarm, and/or the activating of the camera 444 to record image data 460 of the parcel being moved, for example. The user may be presented a list of options for the monitoring action, including those listed above, from which to choose. The user may be presented the list of options before, during, and/or after the selection of the parcel boundary 475.

In embodiments where the monitoring action includes the user alert 472, the user alert 472 may include an indication that the parcel has been removed from the parcel boundary 475. For example, the user may receive the user alert 472 on the display of their client device 1108, 1110 with textual information indicating that the parcel has been removed from within the parcel boundary 475. In some of the present embodiments, the user alert 472 may include information about the person who removed the parcel from within the parcel boundary 475. For example, as discussed above, the image data 460 may be analyzed using computer vision to determine the identity of the person and/or to determine if the person is an authorized person. If the person is authorized and/or the identity of the person may be determined (e.g., by comparing the person in the image data 460 to a database of suspicious person), the identity of the person may be included in the user alert 472. For example, the name of the person and/or an indication of whether the person is authorized or not may be included as textual information in the user alert 472. In some of the present embodiments, the user alert 472 may include at least one frame captured by the camera 444 during the time the parcel is being removed from the parcel boundary 475. For example, the user alert 472 may include the live or pre-recorded video of the parcel being moved from within the parcel boundary 475. For another example, a number of frames may be captured by the camera 444 during the time that the parcel is being moved from within the parcel boundary 475, and the user alert 472 may include at least one of those frames. In some of the present embodiments, each of the frames may be analyzed to determine the frame that is most relevant based on the motion detection rules 470. For example, based on the motion detection rules 470, the frame that is most relevant may be the frame including the parcel and the person who is removing the parcel. In such an example, there may be multiple frames including the person and the parcel, and the frame with the clearest image, such as a facial image, of the person may be the selected frame for including in the user alert 472, for example. In some of the present embodiments, the user alert 472 may be programmed to display as a push-notification on the display of the client device 1108, 1110. The push-notification may include the information discussed above relating to the removal of the parcel and may further include at least one frame from the video and/or a still image, as discussed above.

In some of the present embodiments, the first selection and the second selection may be made in response to entering the parcel protection mode. In such embodiments, the user, similar to that described above, may be able to activate and deactivate (e.g., turn on and off) the parcel protection mode. For example, the user may be aware that his or her spouse is arriving home, and may deactivate the parcel protection mode. In some of the present embodiments, the user may activate, or deactivate, or change the monitoring action, while leaving the parcel monitoring within the parcel boundary 475 in place. This action may be taken, for example, when the user wants to have a record of the parcel being moved, but does not wish to have a monitoring action executed in response to the parcel being moved.

At block B606, the process generates and transmits, by the processor based on the input, parcel monitoring rules to an A/V recording and communication device. For example, the processor of the client device 1108, 1110 may generate and transmit, using the communication module 450, the parcel monitoring rules 473 to the A/V recording and communication device 1102. The parcel monitoring rules 473 may be used by the A/V recording and communication device 1102 to update the motion detection rules 470 of the motion detector (e.g., the camera 444 and/or the motion sensor 474) to monitor the parcel within the parcel boundary 475 and execute the monitoring action in response to the parcel being moved from within the parcel boundary 475.

Now referring to FIG. 44, FIG. 44 is a flowchart illustrating one embodiment of a process for deterring parcel theft with an A/V recording and communication device according to various aspects of the present disclosure. The process of FIG. 44, as indicated at block B608, may continue from block B606 of the process of FIG. 43. At block B610, the process receives, by a processor based on parcel monitoring rules and in response to a parcel being moved from within a parcel boundary, a user alert. For example, the processor (e.g., the processor 801 of the client device 404), based on the parcel monitoring rules 473 and in response to the parcel being moved from within the parcel boundary 475 (e.g., the parcel 711 being moved from within the parcel boundary 712 of FIGS. 52-54), receives the user alert 472.

As discussed above, the user alert 472 may include a notification that the parcel has been moved from within the parcel boundary 475, a notification of who removed the parcel, if the person is an authorized person or a recognized unauthorized person, a live or pre-recorded video of the parcel being moved from within the parcel boundary 475, and/or a frame from the video captured by the camera 444 during the movement of the parcel from within the parcel boundary 475, for example.

At block B612, the process displays the user alert on a display of a client device. For example, the user alert 472 may be displayed on the display of the client device 1108, 1110. The user alert 472, as discussed above, may display on the client device 1108, 1110 as a push-notification. The user may be able to select the push-notification to access video (live or pre-recorded) captured by the camera 444 of the parcel being moved from within the parcel boundary 475. In some of the present embodiments, the user alert 472 may be programmed such that the video from the parcel being removed from the parcel boundary 475 automatically displays on the display of the client device 1108, 1110. In some of the present embodiments, the user alert 472 may be programmed to provide a notification that an alert is pending (e.g., with a number "1" or an "!" overlaid on the application icon on the display of the client device 1108, 1110). In such an embodiment, the user alert 472 may further be programmed to save the video of the parcel being moved from within the parcel boundary 475 for viewing at a future time by the user.

Figures 45, 46:
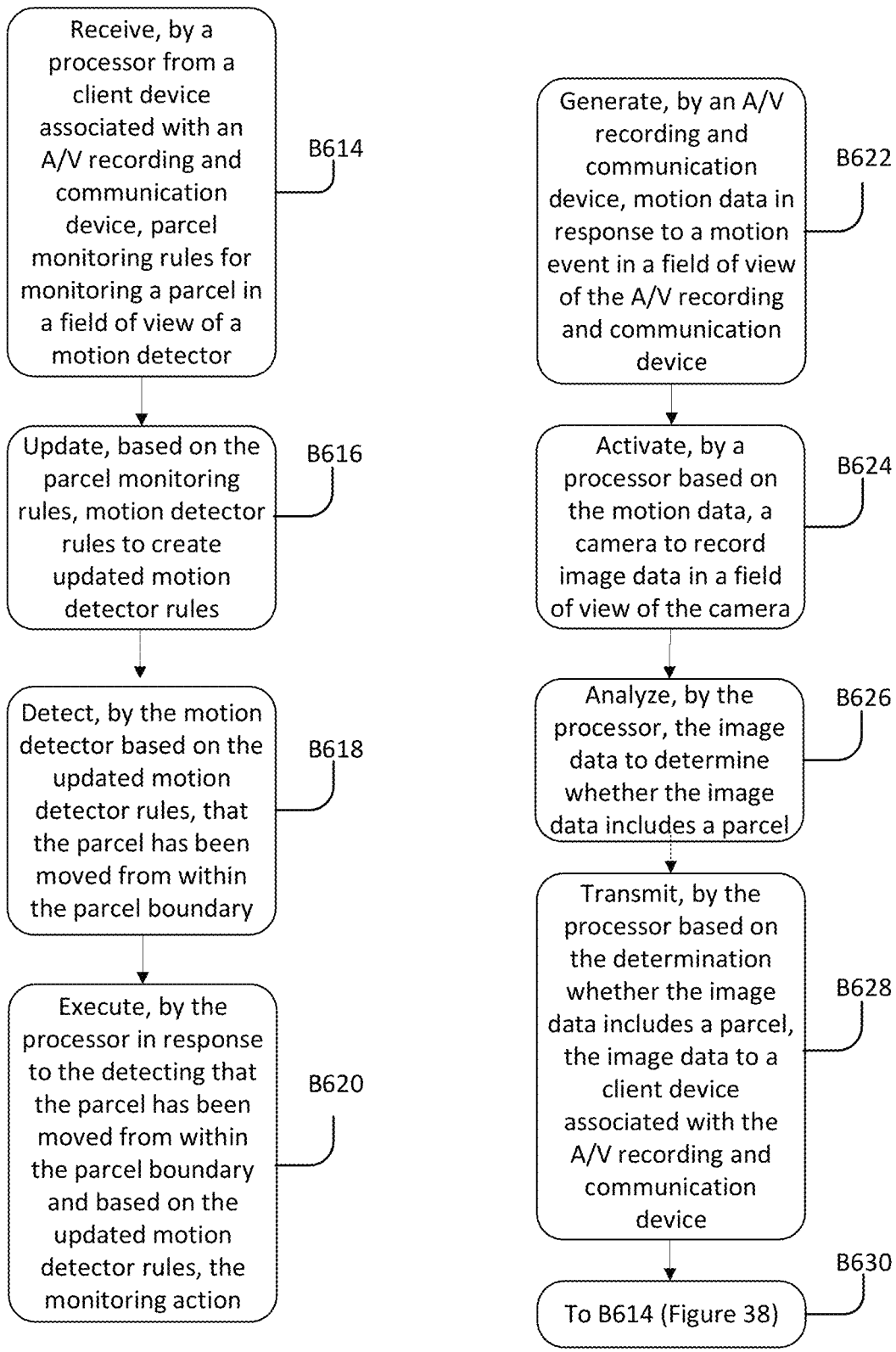

Now referring to FIG. 45, FIG. 45 is a flowchart illustrating one embodiment of a process for deterring parcel theft with an A/V recording and communication device according to various aspects of the present disclosure. At block B614, the process receives, by a processor from a client device associated with an A/V recording and communication device, parcel monitoring rules for monitoring a parcel in a field of view of a motion detector. For example, the processor 452 receives from the client device 1108, 1110 associated with the A/V recording and communication device 1102, the parcel monitoring rules 473 for monitoring the parcel in a field of view of the motion detector (e.g., the camera 444 and/or the motion sensor 474). The parcel monitoring rules 473 may be similar to those described above with respect to FIG. 34 and block B606 of FIG. 43, for example.

At block B616, the process updates, based on the parcel monitoring rules, the motion detection rules to create updated motion detection rules. For example, the processor 452 may update the motion detection rules 470 based on the parcel monitoring rules 473 to create updated motion detection rules 470. The parcel monitoring rules 473 may update the motion detection rules 470 similar to that described above with respect to FIG. 39. For example, the motion detection rules 470 may have an initial setting (e.g., sensitivity level) where the parcel boundary 475 is located. In response to receiving the parcel monitoring rules 473, the motion detection rules 470 may be updated such that the updated motion detection rules 470 have a current setting different than the initial setting within the parcel boundary 475. For example, the current setting may be an increased sensitivity within the parcel boundary 475, as described above. For another example, similar to that described above, successive frames of the image data 460 may be compared within the parcel boundary 475 to determine if any change is detected.

At block B618, the process detects, by the motion detector based on the updated motion detection rules, that the parcel has been moved from within the parcel boundary. For example, the motion detector (e.g., the camera 444 and/or the motion sensor 474) may detect that the parcel has been moved from within the parcel boundary 475 based on the updated motion detection rules 470. Without updating the motion detection rules 470, the removal of the parcel from the parcel boundary 475 may not have been noticed and/or may have been ignored by the user. For example, absent the parcel monitoring rules 473, the A/V recording and communication device 1102 may have detected the motion event of a person entering the field of view of the camera 444 and/or the motion sensor 474, however, the image data 460 generated in response would not have been analyzed in view of the presence of a parcel and/or a parcel boundary 475. As such, the user alert 472, for example, generated in response to the person removing the parcel from the parcel boundary 475 may only indicate the presence of a person, which may go unnoticed, or may be ignored by the user. However, using the updated motion detection rules 470 based on the parcel monitoring rules 473, the user alert 472 may include the information pertaining to the parcel being removed from the parcel boundary 475, and thus may result in the user paying closer attention and/or not overlooking the user alert 472. In another example, the parcel may be located in a zone (e.g., one of Zone 1-5 of FIG. 20), or within a part of the zone where, absent the parcel monitoring rules 473, the removal of the parcel may have gone undetected based on current motion detection rules 470. For example, the user may have disabled motion detection in the zone, or part of the zone. However, with the updated motion detection rules 470 based on the parcel monitoring rules 473, the parcel boundary 475 may trigger enhanced monitoring of the zone, or the part of the zone where the parcel boundary 475 is located.

At block B620, the process executes, by the processor in response to the detecting that the parcel has been moved from within the parcel boundary and based on the updated motion detection rules, the monitoring action. For example, the processor 452 may execute the monitoring action (e.g., generate and transmit, using the communication module 450, the user alert 472) based on the updated motion detection rules in response to detecting that the parcel has been moved from within the parcel boundary 475. The parcel monitoring rules 473 may include the monitoring action to be executed, as discussed above, which may be, for example, generating the user alert 472, activating the camera 444 to record the parcel being moved from within the parcel boundary 475, and/or signaling an alarm using the speaker 448.

Now referring to FIG. 46, FIG. 46 is a flowchart illustrating one embodiment of a process for deterring parcel theft with an A/V recording and communication device according to various aspects of the present disclosure. As indicated at block B630, the process of FIG. 46 may precede the process of FIG. 45, such that the process of FIG. 45, at block B614, continues the process of FIG. 46 after block B628.

At block B622, the process generates, by an A/V recording and communication device, motion data in response to a motion event in a field of view of the A/V recording and communication device. For example, the motion sensor 474 and/or the camera 444 may generate the motion data 468 in response to a motion event in the field of view of the motion sensor 474 and/or the field of view of the camera 444. The motion event may, in some of the present embodiments, be caused by the movement of a person with a parcel in the field of view of the motion detector (e.g., the camera 444 and/or the motion sensor 474). The person may be carrying the parcel, dragging the parcel, pushing the parcel, or the like. The person may be, for example, a mail carrier, a delivery person, etc., as discussed above.

At block B624, the process activates, by a processor based on the motion data, a camera to record image data in a field of view of the camera. For example, the processor 452, based on the image data 460, may activate the camera 444 to record image data 460 in the field of view of the camera 444.

At block B626, the process analyzes, by the processor, the image data to determine whether the image data includes a parcel. For example, the processor 452 may analyze the image data 460 to determine whether the image data 460 includes the parcel. This process may be similar to that described above (e.g., with respect to the process, at block B300, of FIG. 27). In addition, the image data 460 may be analyzed to determine the location of the parcel within the field of view of the camera 444.

At block B628, the process transmits, by the processor based on the determination whether the image data includes a parcel, the image data to a client device associated with the A/V recording and communication device. For example, the processor 452 may transmit, using the communication module 450, the image data 460 to the client device 1108, 1110 based on the determination that the image data 460 includes the parcel. The processor 452, using the communication module 450, may transmit the image data 460 with a user alert 472 indicating to the user of the client device 1108, 1110 that the parcel is present. For example, the user alert 472 may be programmed to allow the user to activate the parcel protection mode whereby the user may be able to create the parcel boundary 475.

The image data 460 transmitted at block B628 may be received by the client device 1108, 1110 at block B600 of FIG. 43, for example. In response, the client device 1108, 1110 may execute the process of FIG. 43 and/or the process of FIG. 44, for example. In response, the A/V recording and communication device 1102 may receive, at block B614, the parcel monitoring rules 473 transmitted by the client device 1108, 1110 at block B606 and execute the process of FIG. 45, for example.

Figures 47, 48:
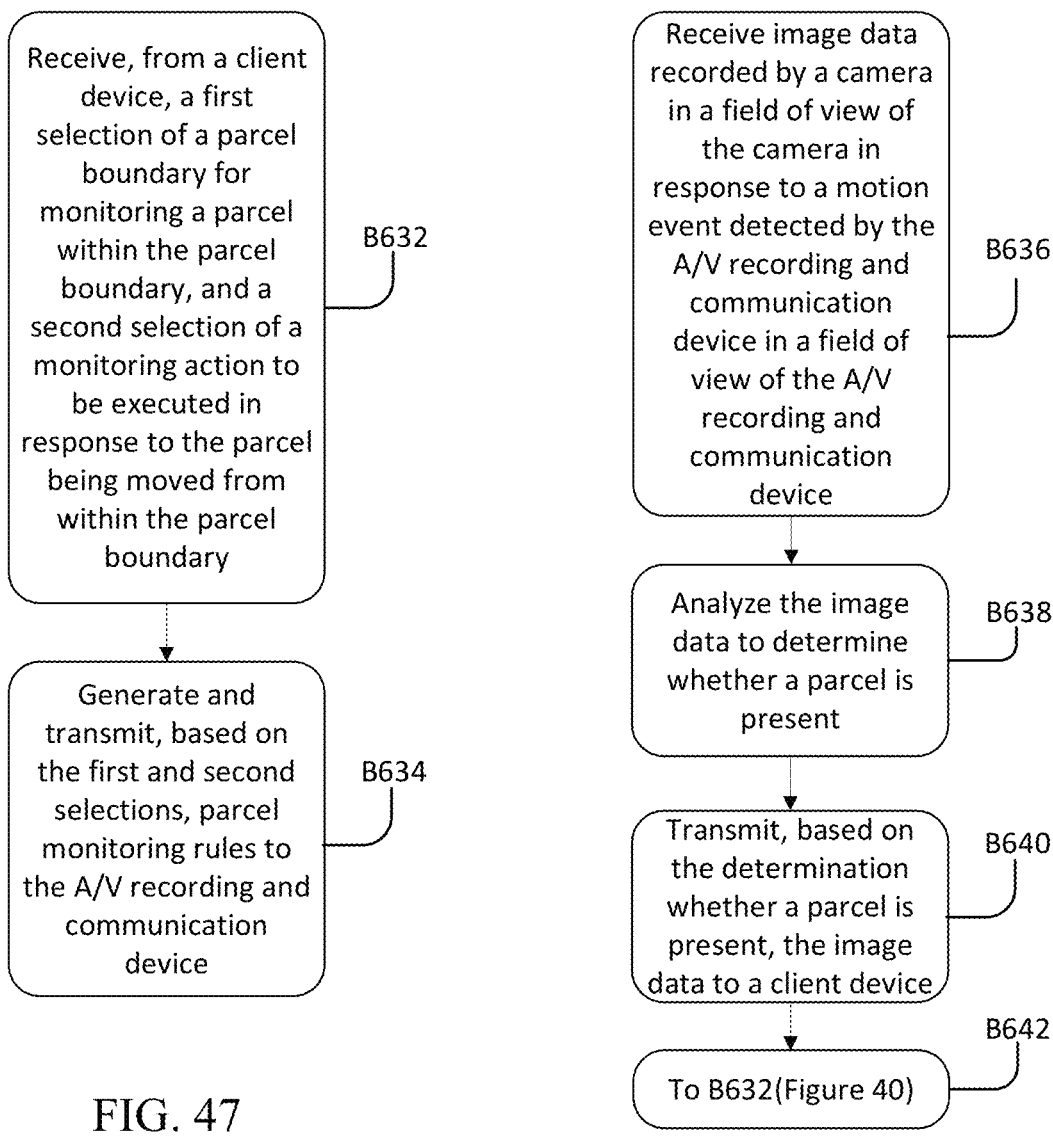

Now referring to FIG. 47, FIG. 47 is a flowchart illustrating one embodiment of a process for deterring parcel theft with an A/V recording and communication device according to various aspects of the present disclosure. At block B632, the process receives, from a client device, a first selection of a parcel boundary for monitoring a parcel within the parcel boundary, and a second selection of a monitoring action to be executed in response to the parcel being moved from within the parcel boundary. For example, the processor 502 of the backend server 1122 may receive, using the communication module 520, from the client device 1108, 1110, a first selection of the parcel boundary 475 for monitoring the parcel within the parcel boundary 475, and a second selection of a monitoring action to be executed in response to the parcel being moved from within the parcel boundary 475. In other words, after the user of the client device 1108, 1110 makes the first selection and the second selection at block B604 of FIG. 43, for example, the processor 502 of the backend server 1122 receives the first selection (e.g., the parcel boundary 475) and the second selection (e.g. the monitoring action such as the user alert 472).

At block B634, the process generates and transmits, based on the first and second selections, parcel monitoring rules to the A/V recording and communication device. For example, the processor 502 may generate and transmit, using the communication module 520, the parcel monitoring rules 473 to the A/V recording and communication device 1102. This process may be similar to that of block B606 of FIG. 43, except it may be executed by the processor 502 of the backend server 1122, for example.

Now referring to FIG. 48, FIG. 48 is a flowchart illustrating one embodiment of a process for deterring parcel theft with an A/V recording and communication device according to various aspects of the present disclosure. As indicated at block B642, the process of FIG. 48 may precede the process of FIG. 47, such that the process of FIG. 47, at block B632, continues the process of FIG. 48 after block B640.

At block B636, the process receives image data recorded by a camera in a field of view of the camera in response to a motion event detected by the A/V recording and communication device in a field of view of the A/V recording and communication device. For example, the processor 502 of the backend server 1122 may receive the image data 460 recorded by the camera 444 in a field of view of the camera 444 in response to a motion event detected by the A/V recording and communication device (e.g., by the camera 444 and/or the motion sensor 474) in a field of view of the A/V recording and communication device 1102 (e.g., a field of view of the camera 444 and/or a field of view of the motion sensor 474). The processor 502 may receive the image data 460 from the A/V recording and communication device 1102 after the A/V recording and communication device 1102 records the image data 460 at block B624, for example.

At block B638, the process analyzes the image data to determine whether a parcel is present. For example, the processor 502 may analyze the image data 460 to determine if a parcel is present. This process may be similar to that of block B626 of FIG. 46, except it may be executed by the processor 502 of the backend server 1122, for example.

At block B640, the process transmits, based on the determination that a parcel is present, the image data to a client device. For example, the processor 502, using the communication module 520, may transmit the image data 460, based on the determination that a parcel is present in the image data 460, to the client device 1108, 1110 associated with the A/V recording and communication device 1102. This process may be similar to that of block B628 of FIG. 46, except it may be executed by the processor 502 of the backend server 1122, for example.

The image data 460 transmitted at block B640 may be received by the client device 1108, 1110 at block B600 of FIG. 43, for example. In response, the client device 1108, 1110 may execute the process of FIG. 43 until block B604, and may transmit the first selection and the second selection from block B604 to the backend server 1122, for example. In response, the backend server 1122 may receive, at block B632, the first selection and the second selection and execute the process of FIG. 47, for example.

Figure 49:
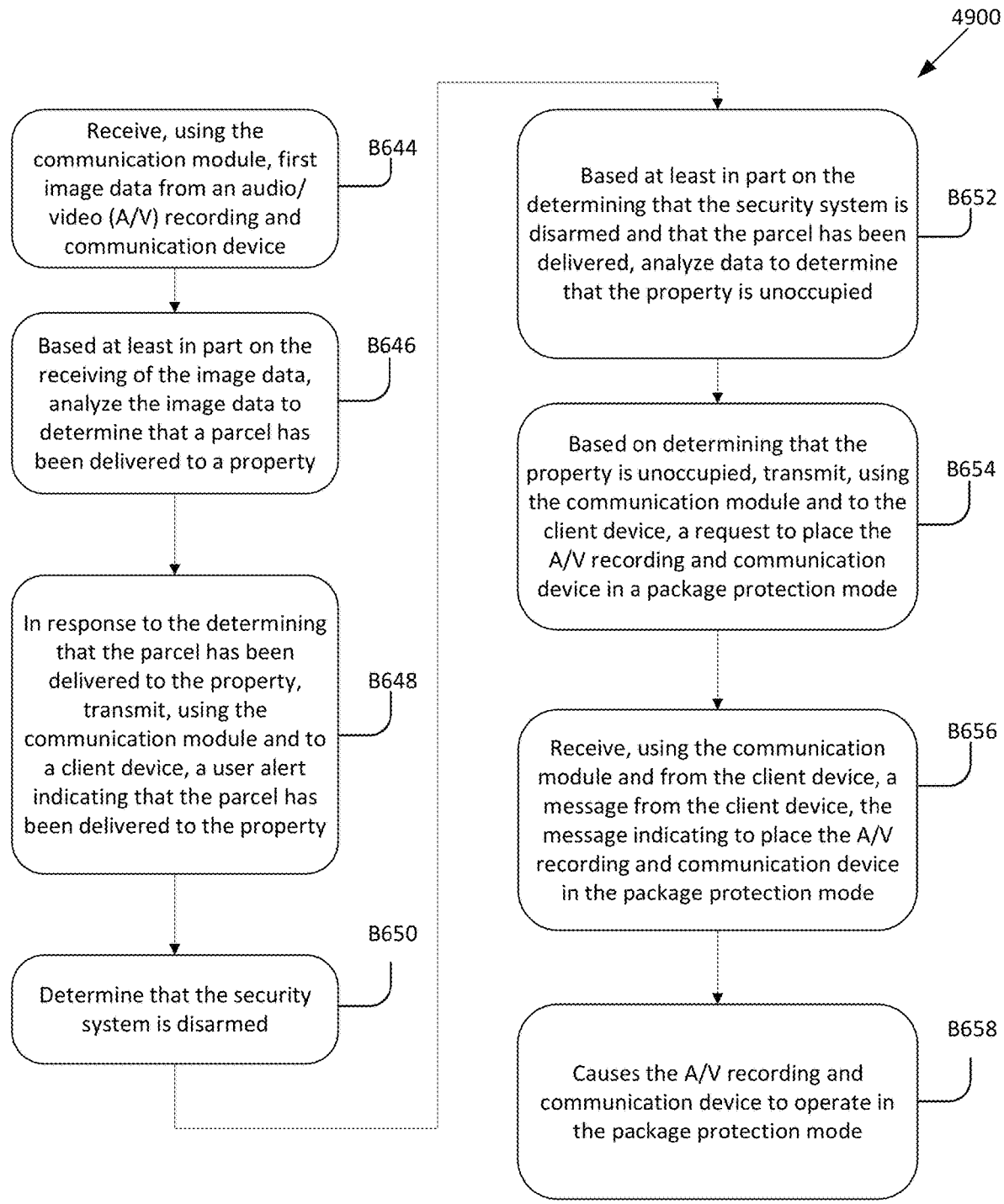

Now referring to FIG. 49, FIG. 49 is a flowchart illustrating one embodiment of a process 4900 for sensor-based prompts to activate package protection mode according to various aspects of the present disclosure.

The process 4900 at block B644, receives, using the communication module, first image data from an audio/video (A/V) recording and communication device. For example, the backend server 1122 may receive, using the communication module 520 (and/or the hub device 1112 may receive, using the communication module 1304), the image data 460 from the A/V recording and communication device 1102. In some examples, the backend server 1122 (and/or the hub device 1112) may further receive other data, such as, but not limited to, the motion data 468.

The process 4900 at block B646, based at least in part on the receiving of the image data, analyzes the image data to determine that a parcel has been delivered to a property. For example, the backend server 1122 (and/or the hub device 1112) may analyze the image data 460 to determine that a parcel has been delivered to a property. In some examples, the backend server 1122 (and/or the hub device 1112) makes the determination based on determining that the image data 460 depicts the parcel. In some examples, the backend server 1122 (and/or the hub device 1112) makes the determination based on determining that the image data 406 depicts a person (e.g., a delivery person) dropping the parcel off at the property.

The process 4900 at block B648, in response to the determination that the parcel has been delivered to the property, transmits, using the communication module and to a client device, a user alert indicating that the parcel has been delivered to the property. For example, the backend server 1122 may transmit, using the communication module 520 (and/or the hub device 1112 may transmit, using the communication module 1304), the user alert 1234 to the client device 1108, 1110. The user alert 1234 may indicate that the parcel has been delivered to the property.

The process 4900 at block B650, determines that the security system is disarmed. For example, the backend server 1122 (and/or the hub device 1112) may determine that the security system is disarmed. In some examples, the backend server 1122 may make the determination based on receiving, using the communication module 520, data from the hub device 1112, where the data indicates that the security system is disarmed. In some examples, the determination that the security system is disarmed may not be performed. For example, the state of the security system may already be known. In other examples, the process may not require that the security system be disarmed.

The process 4900 at block B652, based at least in part on determining that the security system is disarmed and that the parcel has been delivered, analyzes data to determine that the property is unoccupied. For example, the backend server 1122 (and/or the hub device 1112) may obtain and analyze occupancy data 1242 to determine that the property has been unoccupied and/or has been unoccupied for a threshold period of time. are not located at the location (e.g., not located within and/or outside of the location). In some examples, to determine that the location is unoccupied, the backend server 1122 (and/or the hub device 1112) may analyze the image data 1224 (e.g., occupancy data 1242) to determine that the image data 1224 depicts occupants leaving the location, but the image data 1224 does not depict the occupants returning to the location. In some examples, to determine that the location is unoccupied, the backend server 1122 (and/or the hub device 1112) may analyze motion data 1230 (e.g., occupancy data 1242) to determine that motion has not been detected at the location (e.g., motion has not been detected within and/or outside of the property). In some examples, to determine that the location is unoccupied, the backend server 1122 (and/or the hub device 1112) may determine that the security system is operating in one or more specific modes, such as the armed away mode.

In some examples, to determine that the location is unoccupied, the backend server 1122 (and/or the hub device 1112) may analyze audio data (e.g., occupancy data 1242) to determine that sounds at the location indicate that the location is unoccupied. In another example, the backend server 1122 (and/or the hub device 1112) may analyze audio data (e.g., occupancy data 1242) and determine that an absence of sound (or sounds) inside a property do not indicate the presence of an occupant. For example, the backend server 1122 (and/or the hub device 1112) may determine, based on the analysis, that the audio data 1226 does not represent user speech at the location. Still, in some examples, to determine that the location is unoccupied, the backend server 1122 (and/or the hub device 1112) may utilize the geographic location(s) of the client devices 1108, 1110 to determine that the client device 1108, 1110 are located outside of the location and/or located a threshold distance from the location. The threshold distance may include, but is not limited to, one hundred feet, five hundred feet, one thousand feet, one mile, and/or the like.

The process 4900 at block B654, based on determining that the property is unoccupied, transmits, using the communication module and to the client device, a request to place the A/V recording and communication device in a package protection mode. For example, the backend server 1122 may transmit, using the communication module 520 (and/or the hub device 1112 may transmit, using the communication module 1304), a request 486 to the client device 1108, 1110. The request 486 may be to place the A/V recording and communication device 1102 (and/or the security system) in a package protection mode. In some examples, when placed in package protection mode, various motion settings are updated.

The process 4900 at block B656, receives, using the communication module and from the client device, a message from the client device, the message to place the A/V recording and communication device in the package protection mode. For example, the backend server 1122 may receive, using the communication module 520 (and/or the hub device 1112 may receive, using the communication module 1314), a message 482 from the client device 1108, 1110. The message 482 may instruct the backend server 1122 (and/or the hub device 1112) to place the A/V recording and communication device 1102 (and/or the security system) in the package protection mode. In some examples, other modes may be available or used depending on the capabilities of the A/V recording and communication device 1102 (and/or the security system). For example, an activation mode may be used.

The process 4900 at block B658, causes the A/V recording and communication device to operate in the package protection mode. For example, the backend server 1122 (and/or the hub device 1112) may cause the A/V recording and communication device 1102 to operate in the package protection mode. In some examples, to cause the A/V recording and communication device 1102 to operate in the package protection mode, or other modes as discussed above, the backend server 1122 may transmit, using the communication module 530 (and/or the hub device 1112 may transmit, using the communication module 1314), a signal 482 to the A/V recording and communication device 1102, where the signal 482 is configured to cause the A/V recording and communication device 1102 to operate in the package protection mode.

Figure 50:
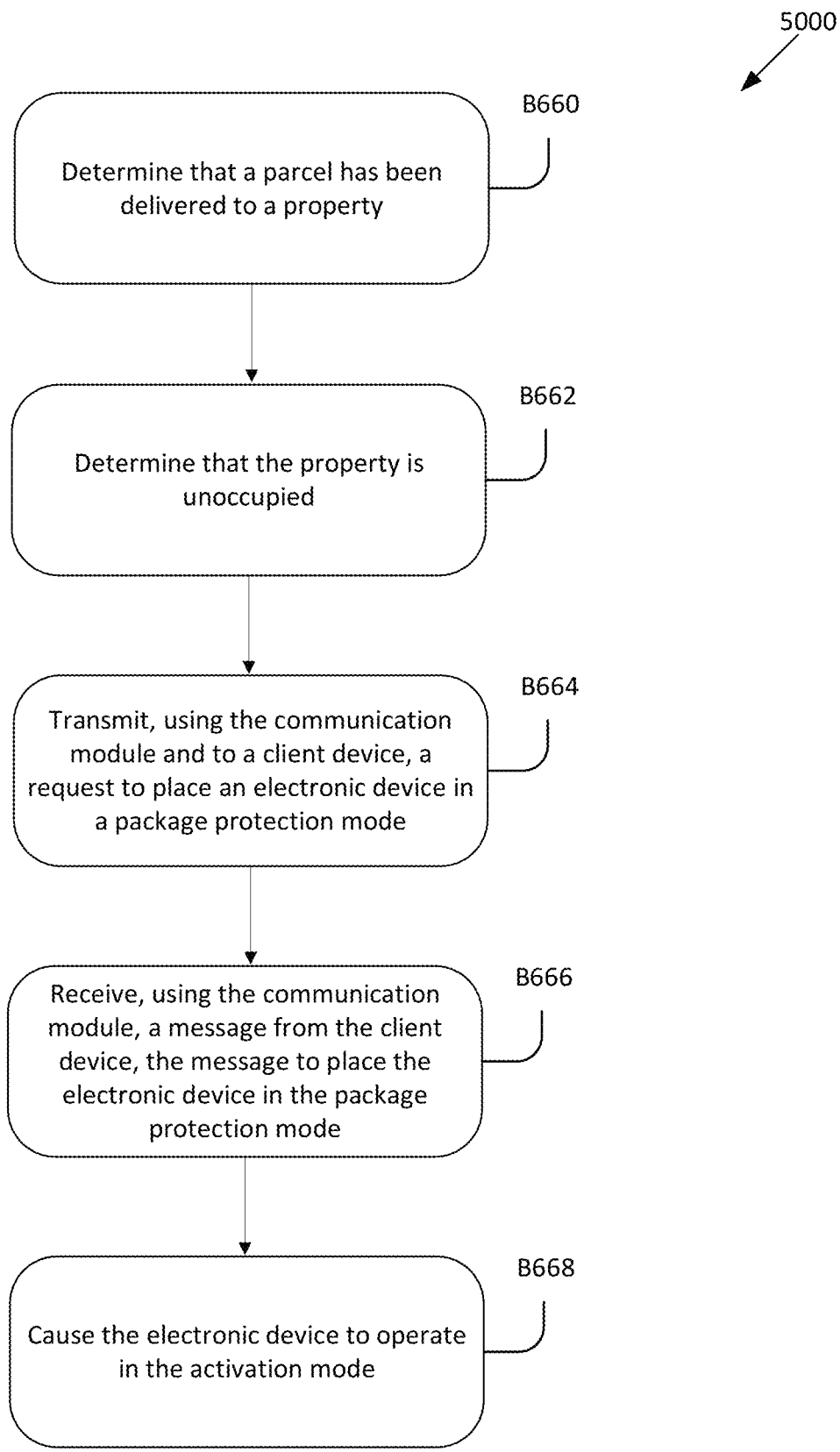

Now referring to FIG. 50, FIG. 50 is a flowchart illustrating another embodiment of a process 5000 for sensor-based prompts to activate package protection mode according to various aspects of the present disclosure.

The process 5000 at block B660, determines that a parcel has been delivered to a property. For example, the backend server 1122 (and/or the hub device 1112) may determine that the parcel has been delivered to the property. In some examples, to make the determination, the backend server 1122 (and/or the hub device 1112) may analyze image data 460 to determine that the image data 460 depicts the parcel. In some examples, to make the determination, the backend server 1122 (and/or the hub device 1112) may analyze the image data 406 to determine that the image data 460 depicts a person (e.g., a delivery person) dropping the parcel off at the property. Still, in some examples, to make the determination, the backend server 1122 (and/or the hub device 1122) may receive a message The process 5000 at block B662, determines that the property is unoccupied. For example, the backend server 1122 (and/or the hub device 1112) may determine that the property is unoccupied. In some examples, to determine that the property is unoccupied, the backend server 1122 (and/or the hub device 1112) may analyze the image data 460 to determine that a person has left the property and has not entered the property. In some examples, to determine that the property is unoccupied, the backend server 1122 (and/or the hub device 1112) may analyze motion data 468 to determine that motion has not been detected inside and/or outside of the property for the threshold period of time. In some examples, to determine that the property is unoccupied, the backend server 1122 (and/or the hub device 1112) may analyze audio data 462 to determine that sounds inside the property indicate that an occupant is not present.

The process 5000 at block B664, transmitting, using the communication module and to a client device, a request to place an electronic device in a package protection mode. For example, the backend server 1122 may transmit, using the communication module 520 (and/or the hub device 1112 may transmit, using the communication module 1304), and to the client device 1108, 1110, a request 486 to place the A/V recording and communication device 1102 in a package protection mode.

The process 5000 at block B666, receives, using the communication module, a message from the client device, the message to place the electronic device in the package protection mode. For example, the backend server 1122 may receive, using the communication module 520 (and/or the hub device 1112 may receive, using the communication module 1314), a message 482 from the client device 1108, 1110. The message 482 may indicate to place the A/V recording and communication device 1102 in the package protection mode.

The process 5000 at block B668, causes the electronic device to operate in the package protection mode. For example, based on receiving the message, the backend server 1122 may transmit, using the communication module 520 (and/or the hub device 1112 may transmit, using the communication module 1314), a signal 484 to the A/V recording and communication device 1102.

Figure 51:
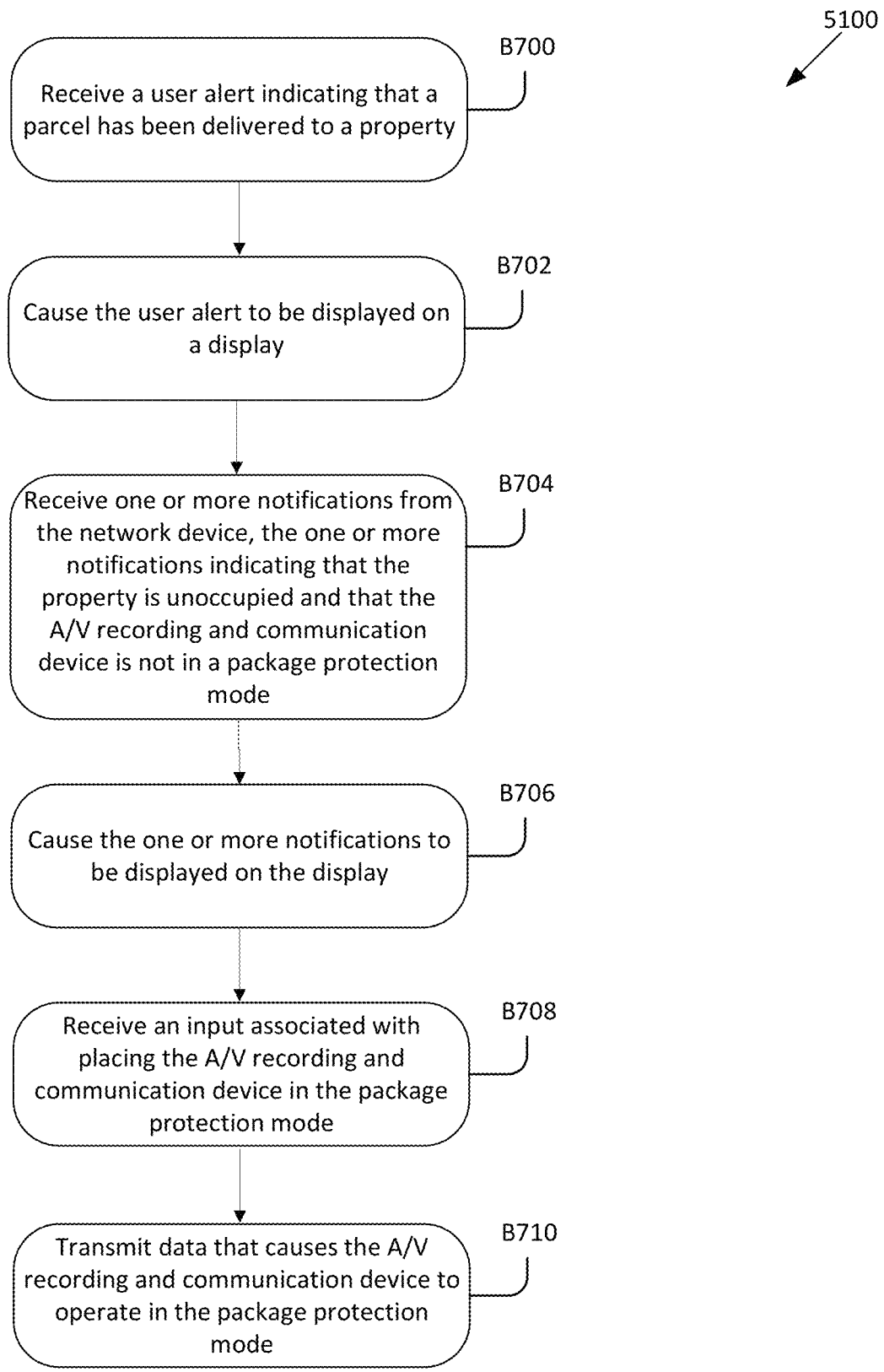

Now referring to FIG. 51, FIG. 51 is a flowchart illustrating another embodiment of a process 5100 for sensor-based prompts to activate package protection mode according to various aspects of the present disclosure.

The process 5100 at block B700 receives a user alert indicating that a parcel has been delivered to a property. For example, client device 1108, 1110 may receive, using the communication module 1510, a user alert 1234 indicating that a parcel 710 has been delivered to a property. In some examples, the user alert 1234 may include image data 460 generated by the A/V recording and communication device 1102, where the image data 460 depicts the parcel 710.

The process 5100 at block B702, causes the user alert to be displayed on a display. For example, the client device 1108, 1110 may cause the user alert 1234 to be displayed on the display 1520.

The process 5100 at block B704, receives one or more notifications from the network device, the one or more notifications indicating that the property is unoccupied and that the A/V recording and communication device is not in a package protection mode. For example, the client device 1108, 1110 may receive, using the communication module 1510, one or more notifications 1420 indicating that the property is unoccupied and that the A/V recording and communication device 1102 is not operating in the package protection mode.

The process 5100 at block B706, causes the one or more notifications to be displayed on the display. For example, the client device 1108, 1110 may cause the one or more notifications 1420 to be displayed on the display 1520. In some examples, the client device 1108, 1110 may further cause one or more graphical elements to be displayed on the display 1520. The one or more graphical elements may include at least a first graphical element for placing the A/V recording and communication device 1102 in the package protection mode and a second graphical element for not placing the A/V recording and communication device 1102 in the package protection mode.

The process 5100 at block B708, receives an input associated with placing the A/V recording and communication device in the package protection mode. For example, the client device 1108, 1110 may receive, using the input interface 1504, input associated with placing the A/V recording and communication device 1102 in the package protection mode. In some examples, the input may correspond to a selection of the first graphical element associated with placing the A/V recording and communication device 1102 in the package protection mode. In some examples, the client device 1108, 1110 may further receive, using the input interface 1504, a second input associated with placing a second A/V recording and communication device 1102 in the package protection mode.

The process 5100 at block B710, transmitting data that causes the A/V recording and communication device to operate in the package protection mode. For example, based on receiving the input, the client device 1108, 1110 may transmit, using the communication module 1510, data (e.g., a package protection mode request 1238) that is configured to cause the A/V recording and communication device 1102 to operate in the package protection mode. In some examples, the client device 1108, 1110 transmits the data to the A/V recording and communication device. In some examples, the client device 1108, 1110 transmits the data to the backend server 1122, which then transmits the data to the A/V recording and communication device 1102.

In various embodiments, techniques as disclosed herein may protect against parcel theft and/or may aid in apprehending perpetrators of parcel theft. In particular, as described above, the present embodiments advantageously leverage the functionality of A/V recording and communication devices to deter parcel theft and/or to identify and apprehend parcel thieves. Various embodiments may determine when one or more parcels have been left within and/or removed from the area about the A/V recording and communication device. When one or more parcels are removed from the area about the A/V recording and communication device, various embodiments may determine whether such removal was authorized and, if desired, generate an alert. The user may then determine what, if anything, to do in response to the alert, such as notifying law enforcement and/or sharing video footage of the parcel theft, such as via social media.

Figure 55:
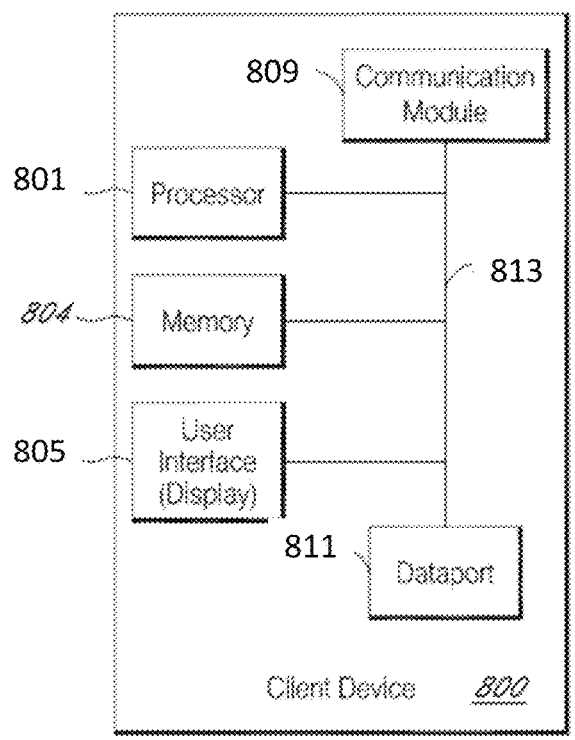
FIG. 55 is a functional block diagram of a client device on which the present embodiments may be implemented according to various aspects of the present disclosure.

FIG. 55 is functional block diagrams of a client device 404 on which the present embodiments may be implemented according to various aspects of the present disclosure. The user's client device 114 described with reference to FIG. 1 may include some or all of the components and/or functionality of the client device 404. The client device 404 may comprise, for example, a smartphone.

With reference to FIG. 55, the client device 404 includes a processor 801, a memory 804, a user interface 805, a communication module 809, and a dataport 811. These components are communicatively coupled together by an interconnect bus 813. The processor 801 may include any processor used in smartphones and/or portable computing devices, such as an ARM processor (a processor based on the RISC (reduced instruction set computer) architecture developed by Advanced RISC Machines (ARM)). In some of the present embodiments, the processor 801 may include one or more other processors, such as one or more conventional microprocessors, and/or one or more supplementary co-processors, such as math co-processors.

The memory 804 may include both operating memory, such as random-access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some of the present embodiments, the memory 804 may comprise a combination of magnetic, optical, and/or semiconductor memory, and may include, for example, RAM, ROM, flash drive, and/or a hard disk or drive. The processor 801 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 801 may be connected to the memory 804 via the dataport 811.

The user interface 805 may include any user interface or presentation elements suitable for a smartphone and/or a portable computing device, such as a keypad, a display screen, a touchscreen, a microphone, and a speaker. The communication module 809 is configured to handle communication links between the client device 800 and other, external devices or receivers, and to route incoming/outgoing data appropriately. For example, inbound data from the dataport 811 may be routed through the communication module 809 before being directed to the processor 801, and outbound data from the processor 801 may be routed through the communication module 809 before being directed to the dataport 811. The communication module 809 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 811 may be any type of connector used for physically interfacing with a smartphone and/or a portable computing device, such as a mini-USB port or an IPHONE®/IPOD® 30-pin connector or LIGHTNING® connector. In other embodiments, the dataport 811 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 801 in accordance with the present embodiments. The instructions also may include program elements, such as an operating system. While execution of sequences of instructions in the program causes the processor 801 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 56:
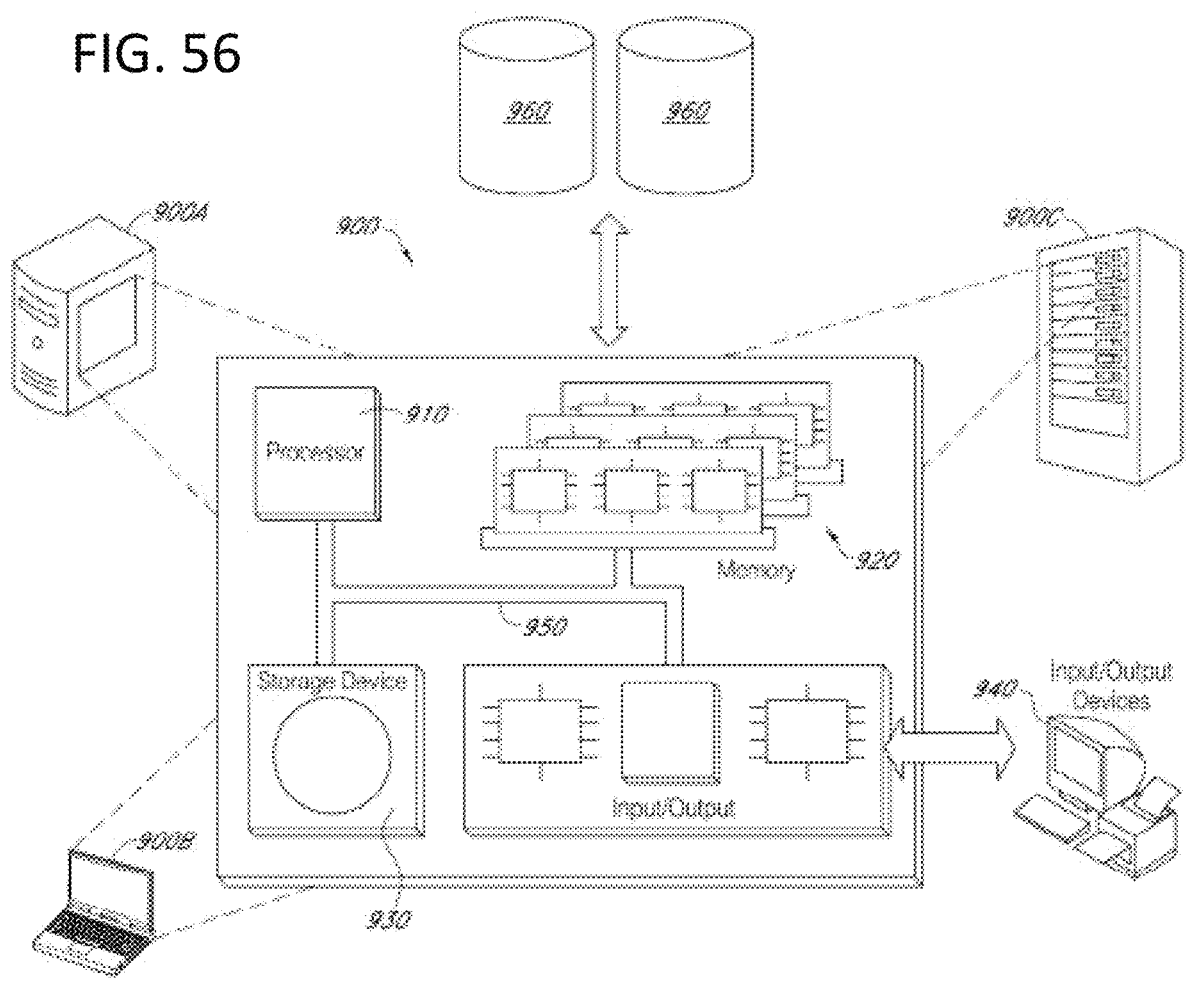
FIG. 56 is a functional block diagram of a general-purpose computing system on which the present embodiments may be implemented according to various aspects of the present disclosure.

FIG. 56 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a backend component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. One or more network devices comprising:
one or more communication components;
one or more processors; and
one or more non-transitory computer-readable media storing instructions that, when executed by the one or more processors, cause the one or more network devices to perform operations comprising:
receiving, using the one or more communication components, first image data generated by an audio/video recording and communication device (A/V device);
determining that a portion of the first image data represents a parcel;
determining, based at least in part on the portion of the first image data, a first portion of a field of view (FOV) of the A/V device that is associated with the parcel, the first portion of the FOV being less than the entire FOV; and
sending, using the one or more communication components and to the A/V device, first data indicating the first portion of the FOV.

2. The one or more network devices as recited in claim 1, the one or more non-transitory computer-readable media storing further instructions that, when executed by the one or more processors, cause the one or more network devices to perform further operations comprising: determining that a security system associated with a property is operating in a mode, wherein the sending of the first data is based at least in part on the determining that the security system is operating in the mode.

3. The one or more network devices as recited in claim 1, the one or more non-transitory computer-readable media storing further instructions that, when executed by the one or more processors, cause the one or more network devices to perform further operations comprising sending, using the one or more communication components, second data to the A/V device, the second data representing an action to be executed in response to the parcel being moved.

4. The one or more network devices as recited in claim 1, the one or more non-transitory computer-readable media storing further instructions that, when executed by the one or more processors, cause the one or more network devices to perform further operations comprising sending, using the one or more communication components, second data that causes a motion detection sensitivity associated with the A/V device to change from a first value to a second value.

5. The one or more network devices as recited in claim 1, wherein the first data comprises second image data, the second image data representing: the parcel; and a boundary located around the parcel, the boundary corresponding to the first portion of the FOV.

6. The one or more network devices as recited in claim 1, wherein the first data indicates pixels associated with a camera of the A/V device, the pixels corresponding to the first portion of the FOV.

7. The one or more network devices as recited in claim 1, wherein the portion of the first image data is a first portion of the first image data, and wherein the determining the first portion of the FOV of the camera that is associated with the parcel comprises:
determining a second portion of the first image data, the second portion of the first image data including at least the first portion of the first image data that represents the parcel; and determining that the first portion of the FOV corresponds to the second portion of the first image data.

8. The one or more network devices as recited in claim 1, wherein:
the portion of the first image data is a first portion of the first image data;
the determining the first portion of the FOV of the A/V device that is associated with the parcel comprises determining a second portion of the first image data that includes at least the first portion of the first image data, the second portion of the first image data corresponding to the first portion of the FOV of the A/V device; and
the first data indicates the second portion of the first image data.

9. The one or more network devices as recited in claim 1, wherein the first portion of the FOV of the A/V device comprises at least one of:
a portion of a first FOV associated with a camera of the A/V device; or
a second FOV associated with a motion sensor from motion sensors of the A/V device, the motion sensors including a third FOV.

10. The one or more network devices as recited in claim 1, wherein:
the portion of the first image data is a first portion of the first image data;
the determining the first portion of the FOV of the A/V device that is associated with the parcel comprises:
determining a second portion of the first image data, the second portion of the first image data including at least the first portion of the first image data that represents the parcel and a third portion of the first image data that represents an area at least partly surrounding the parcel; and
determining that the first portion of the FOV corresponds to the second portion of the first image data; and
wherein the first data indicates the second portion of the first image data.

11. The one or more network devices of claim 1, wherein determining that the portion of the first image data represents the parcel comprises determining a plurality of pixels of the first image data that represent the parcel.

12. The one or more network devices of claim 1, wherein determining that the portion of the first image data represents the parcel comprises segmenting the first image data into multiple image regions; and classifying a first image region of the multiple image regions as a parcel, the first image region corresponding to the portion of the first image data.

13. The one or more network devices of claim 1, wherein determining the first portion of the FOV of the A/V device that is associated with the parcel comprises determining a set of pixel locations for images generated by a camera of the A/V device that correspond to pixel locations of the portion of the first image data.

14. The one or more network devices of claim 1, wherein the FOV of the A/V device comprises an FOV of a passive infrared sensor of the A/V device.

15. The one or more network devices of claim 1, wherein determining that the portion of the first image data represents the parcel comprises determining a boundary around the portion of the first image data.

16. The one or more network devices of claim 1, wherein determining that the portion of the first image data represents the parcel comprises generating, based on the first image data and using a computer vision model, feature data; determining, based on the feature data using a computer vision model, one or more image regions; determining, for each image region of the one or more images regions, based on the feature data and using a computer vision model, a class; and wherein the determining a class for each image region comprises, for at least one of the image regions, determining a class corresponding to a package.

17. The one or more network devices of claim 1, wherein determining that the portion of the first image data represents the parcel comprises generating, based on the first image data and using a computer vision model, feature data; determining a plurality of image regions; determining, for each image region of the plurality of image regions based on the feature data and using a computer vision model, a class; and wherein the determining a class for each image region comprises, for at least one of the image regions, determining a class corresponding to a package.

18. A method comprising:
   storing first data indicating that an audio/video recording and communication device (A/V device) is associated with a property;
   receiving image data generated by the A/V device, the image data representing a parcel;
   sending the image data to a user device;
   determining that the parcel has been delivered to the property;
   based at least in part on the determining that the parcel has been delivered to the property, sending, to the user device, a request associated with monitoring the parcel using the A/V device;
   receiving, from the user device, an instruction to monitor the parcel using the A/V device; and
   based at least in part on the receiving of the instruction, sending, to the A/V device, second data representing at least one of:
   a portion of a field of view (FOV) of the A/V device; or
   a command to change a motion detection sensitivity from a first value to a second value.

19. The method as recited in claim 18, wherein the determining that the parcel has been delivered to the property comprises determining that the image data represents the parcel.

20. The method as recited in claim 18, wherein the determining that the parcel has been delivered to the property comprises receiving, from at least one of an electronic device or the A/V device, third data indicating that the parcel has been delivered to the property.

21. The method as recited in claim 18, further comprising: determining that the property is unoccupied, wherein the sending of the request is further based at least in part on the determining that the property is unoccupied.

22. The method as recited in claim 18, further comprising: determining that a security system associated with the property is operating in a security mode, wherein the sending of the request is further based at least in part on the determining that the security system is operating in the security mode.

23. The method as recited in claim 18, further comprising sending, to A/V the device, third data representing an action to perform based at least in part on detecting motion.

24. The method as recited in claim 18, further comprising: determining that the A/V device is operating in a first mode, wherein: the request associated with monitoring the parcel using the A/V device comprises the request to operate the A/V device in a second mode, the second mode associated with monitoring the parcel using the A/V device; and the instruction to monitor the parcel using the A/V device comprises the instruction the operate the A/V device in the second mode.

25. The method as recited in claim 24, wherein: the A/V device performs one or more first processes when operating in the first mode, the one or more first processes including at least one of: detecting first motion within the FOV; setting the motion detection setting to the First value; or performing a first action when the first motion is detected; and the A/V device performs one or more second processes when operating in the second mode, the one or more second processes including at least one of: detecting second motion within the portion of the FOV; setting the motion detection setting to the second value; or performing a second action when the second motion is detected within the portion of the FOV.

26. The method of claim 18, wherein the method further comprises receiving a notification generated by the A/V device based at least in part on the second data.

27. A method comprising:
   storing, by one or more computing devices, first data indicating that an audio/video recording and communication device (A/V device) is associated with a property;
   receiving, by the one or more computing devices, image data generated by a camera of the A/V device;
   sending, by the one or more computing devices, the image data to a user device; receiving, by the one or more computing devices, an indication that the image data represents a parcel;
   based at least in part on the receiving of the indication, determining, by the one or more computing devices, a first portion of a field of view (FOV) of the camera that is associated with the parcel, the first portion of the FOV being less than the entire FOV; and
   sending, by the one or more computing devices and to the A/V device, second data indicating the first portion of the FOV.

28. The method of claim 27, wherein the method further comprises receiving, by the one or more computing devices from the A/V device, a notification generated by the A/V device based at least in part on the second data.

29. The method of claim 27, wherein the method further comprises receiving, by the one or more computing devices from the A/V device, a notification generated by the A/V device based at least in part on analysis of a portion of an image corresponding to the first portion of the FOV.

30. The method of claim 27, wherein the method further comprises receiving, by the one or more computing devices from the A/V device, a notification generated by the A/V device based at least in part on detection of motion within the first portion of the FOV of the A/V device.

* * * * *